US010196517B2

(12) United States Patent
van der Mee et al.

(10) Patent No.: US 10,196,517 B2
(45) Date of Patent: *Feb. 5, 2019

(54) INTERIOR TRAIN COMPONENTS HAVING LOW SMOKE AND LOW HEAT RELEASE, AND METHODS OF THEIR MANUFACTURE

(71) Applicant: SABIC GLOBAL TECHNOLOGIES B.V., Bergen op Zoom (NL)

(72) Inventors: Mark Adrianus Johannes van der Mee, Breda (NL); Roland Sebastian Assink, Middelburg (NL); Robert Dirk van de Grampel, Tholen (NL); Paul Dean Sybert, Evansville, IN (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 950 days.

This patent is subject to a terminal disclaimer.

(21) Appl. No.: 13/874,700

(22) Filed: May 1, 2013

(65) Prior Publication Data
US 2014/0329940 A1 Nov. 6, 2014

(51) Int. Cl.
C08L 69/00 (2006.01)
C08L 79/08 (2006.01)
C08K 5/523 (2006.01)
C08L 83/10 (2006.01)
C08K 5/00 (2006.01)
C08G 77/448 (2006.01)

(52) U.S. Cl.
CPC ............. C08L 69/005 (2013.01); C08L 79/08 (2013.01); C08L 83/10 (2013.01); C08G 77/448 (2013.01); C08K 5/0066 (2013.01); C08K 5/523 (2013.01)

(58) Field of Classification Search
CPC ........ C08K 5/523; C08L 69/00–69/005; C08L 79/08
See application file for complete search history.

(56) References Cited

U.S. PATENT DOCUMENTS

| | | | |
|---|---|---|---|
| 3,972,902 A | 8/1976 | Heath et al. | |
| 4,387,193 A | 6/1983 | Giles, Jr. | |
| 4,430,484 A * | 2/1984 | Quinn | 525/425 |
| 4,455,410 A | 6/1984 | Giles, Jr. | |
| 4,548,997 A | 10/1985 | Mellinger et al. | |
| 5,387,639 A | 2/1995 | Sybert et al. | |
| 7,767,738 B2 | 8/2010 | Gaggar et al. | |
| 7,790,292 B2 | 9/2010 | Colborn et al. | |
| 9,994,709 B2 * | 6/2018 | van der Mee | C09K 21/14 |
| 2002/0099160 A1 * | 7/2002 | Shiping | C08K 5/523 528/10 |
| 2005/0159577 A1 | 7/2005 | Davis et al. | |
| 2005/0288406 A1 * | 12/2005 | Gallucci | C08L 67/03 524/115 |
| 2006/0125143 A1 | 6/2006 | Donea et al. | |
| 2007/0048527 A1 * | 3/2007 | Agarwal | B32B 27/08 428/412 |
| 2007/0049706 A1 | 3/2007 | Siripurapu et al. | |
| 2007/0066737 A1 | 3/2007 | Gallucci et al. | |
| 2007/0129492 A1 | 6/2007 | Colborn et al. | |
| 2008/0119631 A1 | 5/2008 | Mullen | |
| 2009/0306258 A1 * | 12/2009 | Siripurapu et al. | 524/147 |
| 2009/0318629 A1 | 12/2009 | Adoni et al. | |
| 2011/0229704 A1 | 9/2011 | Grcev et al. | |

FOREIGN PATENT DOCUMENTS

| | | | |
|---|---|---|---|
| CA | 2157082 A * | 5/1996 | |
| DE | 3844183 A1 | 6/1990 | |
| EP | 0158733 A1 * | 10/1985 | ............ C08L 69/005 |
| JP | 09183893 | 7/1997 | |
| WO | WO 9410245 A1 * | 5/1994 | |
| WO | 2013130809 A1 | 9/2013 | |

OTHER PUBLICATIONS

Schartel, B. Phosphorus-based Flame Retardancy Mechanisms—Old Hat or a Starting Point for Future Development?. Materials, 2010, vol. 3, pp. 4710-4745.*
Bhandari, Y. J., Gallucci, R. R., Sanner, M., and Singh, R. K. Polyetherimide-Polyestercarbonate Blends with Low Heat Release. ANTEC 2008 Plastics: Annual Technical Conference Proceedings. pp. 1791-1795. 2008.*
Perret et al. Fire retardancy mechanisms of arylphosphates in polycarbonate (PC) and PC/acrylonitrile-butadiene-styren: The key role of decomposition temperature. J. Therm. Anal. Calorim. 2009, 97, 949-958. (Year: 2009).*
U.S. Appl. No. 13/724,780, filed Dec. 12, 2012.
U.S. Appl. No. 13/780,355, filed Feb. 28, 2013.
U.S. Appl. No. 13/780,430, filed Feb. 28, 2013.
U.S. Appl. No. 13/874,746, filed May 1, 2013.
U.S. Appl. No. 13/874,896, filed May 1, 2013.
U.S. Appl. No. 13/915,710, filed Jun. 12, 2013.
Gallucci et al., "New High Impact Miscible Polycarbonate Polyimide Blends", ANTEC conference proceedings, vol. 7, 2005, 6 pages.
Heat Release, Currenta GmbH & Co. OHG information sheet: "prCEN/TS 45545-2 (Feb. 2008)—Fire protection on railway vehicles: Heat Release", Feb. 2008, 3 pages.
Lateral Flame Spread, Currenta GmbH & Co. OHG information sheet: "CEN TS 45545-2 (Feb. 2008)—Fire protection on railway vehicles: Lateral Flame Spread", Feb. 2008, 2 pages.
(Continued)

Primary Examiner — Stephen E Rieth
(74) Attorney, Agent, or Firm — Cantor Colburn LLP

(57) ABSTRACT

Interior railway components (seat components and claddings) comprise a thermoplastic composition comprising: a first polymer comprising bisphenol A carbonate units and monoaryl arylate units, or a second polymer comprising bisphenol A carbonate units, monoaryl arylate units, and siloxane units, or a combination comprising at least one of the foregoing; and a polyetherimide; wherein a sample of the thermoplastic composition has: a smoke density after 4 minutes (Ds-4) of ≤150 measured in accordance with ISO 5659-2 on a 3 mm thick plaque, an integral of the smoke density as a function of time up to 4 minutes (VOF4)≤300 measured in accordance with ISO 5659-2, a maximum average heat release (MAHRE) of ≤300 90 kW/m² measured in accordance with ISO 5660-1 on a 3 mm thick plaque, and a ductility in multiaxial impact of 80 to 100%, measured in accordance with ISO 6603.

39 Claims, 2 Drawing Sheets

(56) References Cited

OTHER PUBLICATIONS

Lin et al., "Polymers with Improved Flammability chracteristics. I.Phenolphthalein-Related Homopolymers", Journal of Polymer Science: Polymer Chemistry Edition, Vo. 19, pp. 2659-2670, 1981, XP009050158.
Smoke Optical Density and Toxicity, Currenta GmbH & Co. OHG information sheet: "prCEN/TS 45545-2 (Feb. 2008)—Fire protection on railway vehicles: Smoke optical desnity and toxicity", Feb. 2008, 4 pages.
International Search Report for International Application No. PCT/US201/035660, Application Filing Date: Apr. 28, 2014, dated Aug. 21, 2014, 4 pages.
Written Opinion for International Application No. PCT/US201/035660, Application Filing Date: Apr. 28, 2014, dated Aug. 21, 2014, 4 pages.

\* cited by examiner

INTERIOR TRAIN COMPONENTS HAVING LOW SMOKE AND LOW HEAT RELEASE, AND METHODS OF THEIR MANUFACTURE

BACKGROUND

This disclosure is directed to components for the interior of trains, and in particular seat components and claddings having low smoke density and low heat release.

Standards for flame retardancy properties such as flame spread, heat release, and smoke generation upon burning have become increasingly stringent for articles used in mass transportation such as trains. The European Union has approved the introduction of a new harmonized fire standard for rail applications, namely EN-45545, to replace all currently active different standards in each member state. This standard imposes stringent requirements on heat release, smoke density, and toxicity and flame spread properties allowed for materials used in these applications. Smoke density (Ds-4) in EN-45545 is the smoke density after four minutes determined in accordance with ISO 5659-2, and heat release in EN-45545 is the maximum average rate of heat emission (MAHRE) determined in accordance with ISO5660-1 and flame spread in EN-45545 is the critical heat flux at extinguishment (CFE) determined in accordance with ISO 5658-2.

"Hazard Levels" (HL1 to HL3) have been designated, reflecting the degree of probability of personal injury as the result of a fire. The levels are based on dwell time and are related to operation and design categories. HL1 is the lowest hazard level and is typically applicable to vehicles that run under relatively safe conditions (easy evacuation of the vehicle). HL3 is the highest hazard level and represents most dangerous operation/design categories (difficult and/or time-consuming evacuation of the vehicle, e.g. in underground rail cars). For each application type, different test requirements for the hazard levels are defined.

For R6 applications, covering seat components, requirements on smoke density after four minutes determined in accordance with ISO 5659-2 (Ds-4) are Ds-4 values at or below 300 measured at 50 kW/m$^2$ for HL2 and at or below 150 measured at 50 kW/m$^2$ for HL3. Requirements on the maximum average rate of heat emission (MAHRE) determined in accordance with ISO5660-1 are at or below 90 kW/m$^2$ determined at 50 kW/m$^2$ for HL2 and at or below 60 kW/m$^2$ determined at 50 kW/m$^2$ for HL3. For R6 applications, no requirements on flame spread measured according to ISO 5658-2 exist.

Typical applications falling under R1 applications include interior vertical surfaces, such as side walls, front walls, end-walls, partitions, room dividers, flaps, boxes, hoods and louvres; interior doors and linings for internal and external doors; window insulations, kitchen interior surfaces, interior horizontal surfaces, such as ceiling paneling, flaps, boxes, hoods and louvres; luggage storage areas, such as overhead and vertical luggage racks, luggage containers and compartments; driver's desk applications, such as paneling and surfaces of driver's desk; interior surfaces of gangways, such as interior sides of gangway membranes (bellows) and interior linings; window frames (including sealants and gaskets); (folding) tables with downward facing surface; interior and exterior surface of air ducts, and devices for passenger information (such as information display screens). For R1 applications, requirements on smoke density after four minutes determined in accordance with ISO 5659-2 (Ds-4) are Ds-4 values at or below 300 measured at 50 kW/m$^2$ for HL2 and at or below 150 measured at 50 kW/m$^2$ for HL3. Requirements on the maximum average rate of heat emission (MAHRE) determined in accordance with ISO5660-1 are at or below 90 kW/m$^2$ determined at 50 kW/m$^2$ for HL2 and at or below 60 kW/m$^2$ determined at 50 kW/m$^2$ for HL3. Requirements on the critical heat flux at extinguishment (CFE) determined in accordance with ISO 5658-2 are at or above 20 kW/m$^2$ for both HL2 and HL3.

It is exceptionally challenging to manufacture interior articles for trains that meet stringent smoke density standards, heat release standards and/or flame spread standards in addition to other material requirements. It is particularly challenging to manufacture articles that meet these standards and that have good mechanical properties (especially impact/scratch resistance) and processability. Accordingly there remains a need for interior articles for trains, and in particular seat components and claddings that have a combination of low smoke, low heat release, and good flame spread properties. It would be a further advantage if the articles could be rendered low smoke, low heat release, and/or low flame spread without a significant detrimental effect on one or more of material cost, manufacturing ease, and mechanical properties. It would be a still further advantage if the materials could be readily thermoformed or injection molded. It would be a still further advantage if such materials were in compliance with European Railway standard EN-45545, for example, without having a detrimental effect on material cost, ease of manufacture, and mechanical properties.

SUMMARY

Disclosed herein is a railway component wherein the component is a seat component, and wherein the railway component is molded or formed from a thermoplastic polymer composition comprising 58 to 95 wt. % of a first polymer comprising bisphenol A carbonate units and monoaryl arylate units, or a second polymer comprising bisphenol A carbonate units, monoaryl arylate units, and siloxane units, or a combination comprising at least one of the foregoing polymer; 5 to 30 wt. % of a polyetherimide; and optionally an organophosphorus compound in an amount effective to provide 0.1 to 1.0 wt. % of phosphorus, based on the total weight of the thermoplastic polymer composition, and optionally, up to 5 wt. % of an additive selected from a processing aid, a heat stabilizer, an ultra violet light absorber, a colorant, or a combination comprising at least one of the foregoing, wherein an article having a thickness of 0.5 to 10 mm molded from the composition has a Ds-4 smoke density of less than or equal to 150 measured according to ISO 5659-2 on a 3 mm thick plaque at 50 kW/m$^2$, and a MAHRE of less than or equal to 90 kW/m$^2$ measured according to ISO 5660-1 on a 3 mm thick plaque at 50 kW/m$^2$, a multiaxial impact energy at or above 100 J and a ductility of 80 to 100%, measured at +23° C. at an impact speed of 4.4 m/second in accordance with ISO 6603 on 3.2 mm thick discs, and optionally, a melt volume flow rate of greater than 4 cc/10 min measured at 300° C. under 1.2 kg force measured according to ISO 1133.

Also disclosed herein is a railway component wherein the component is a seat component, and wherein the railway component is molded or formed from a thermoplastic polymer composition comprising, 58 to 95 wt. % of a first polymer comprising bisphenol A carbonate units and monoaryl arylate units, or a second polymer comprising bisphenol A carbonate units, monoaryl arylate units, and siloxane units, or a combination comprising at least one of the foregoing polymer; 5 to 30 wt. % of a polyetherimide; and an organophosphorus compound in an amount effective to provide 0.1 to 1.0 wt. % of phosphorus, based on the total weight of the thermoplastic polymer composition, and optionally, up to 5 wt. % of an additive selected from a processing aid, a heat stabilizer, an ultra violet light absorber, a colorant, or a combination comprising at least one of the foregoing, wherein an article having a thickness of 0.5 to 10 mm molded from the composition has a Ds-4 smoke density of less than or equal to 150 measured according to ISO 5659-2 on a 3 mm thick plaque at 50 kW/m$^2$, and a MAHRE of less than or equal to 60 kW/m$^2$ measured according to ISO 5660-1 on a 3 mm thick plaque at 50 kW/m$^2$, a multiaxial impact energy at or above 100 J and a ductility of 80 to 100%, measured at +23° C. at an impact speed of 4.4 m/second in accordance with ISO 6603 on 3.2 mm thick discs, and optionally, a melt volume flow rate of greater than 4 cc/10 min measured at 300° C. under 1.2 kg force measured according to ISO 1133.

Also described herein is a railway component wherein the component is an interior vertical surface, such as side walls, front walls, end-walls, partitions, room dividers, flaps, boxes, hoods and louvres; an interior door or lining for internal and external doors; a window insulation, a kitchen interior surface, an interior horizontal surface, such as ceiling paneling, flaps, boxes, hoods and louvres; a luggage storage area, such as overhead and vertical luggage racks, luggage containers and compartments; a driver's desk application, such as paneling and surfaces of driver's desk; an interior surface of gangways, such as interior sides of gangway membranes (bellows) and interior linings; a window frame (including sealants and gaskets); a (folding) table with downward facing surface; an interior or exterior surface of air ducts, or a device for passenger information, such as information display screens, and wherein the railway component is molded or formed from a thermoplastic polymer composition comprising, 58 to 95 wt. % of a first polymer comprising bisphenol A carbonate units and monoaryl arylate units, or a second polymer comprising bisphenol A carbonate units, monoaryl arylate units, and siloxane units, or a combination comprising at least one of the foregoing polymers; 5 to 30 wt. % of a polyetherimide; and optionally an organophosphorus compound in an amount effective to provide 0.1 to 1.0 wt. % of phosphorus, based on the total weight of the thermoplastic polymer composition, and optionally, up to 5 wt. % of an additive selected from a processing aid, a heat stabilizer, an ultra violet light absorber, a colorant, or a combination comprising at least one of the foregoing, wherein an article having a thickness of 0.5 to 10 mm molded from the composition has a Ds-4 smoke density of less than or equal to 150 measured according to ISO 5659-2 on a 3 mm thick plaque at 50 kW/m$^2$, and a MAHRE of less than or equal to 90 kW/m$^2$ measured according to ISO 5660-1 on a 3 mm thick plaque at 50 kW/m$^2$, a critical heat flux at extinguishment (CFE) of equal to or more than 20 kW/m$^2$ measured according to ISO 5658-2 at a 3 mm thick plaque, and a multiaxial impact energy at or above 100 J and a ductility of 80 to 100%, measured at +23° C. at an impact speed of 4.4 m/second in accordance with ISO 6603 on 3.2 mm thick discs, and optionally, a melt volume flow rate of greater than 4 cc/10 min measured at 300° C. under 1.2 kg force measured according to ISO 1133.

Also described herein is a railway component wherein the component is an interior vertical surface, such as side walls, front walls, end-walls, partitions, room dividers, flaps, boxes, hoods and louvres; an interior door or lining for internal and external doors; a window insulation, a kitchen interior surface, an interior horizontal surface, such as ceiling paneling, flaps, boxes, hoods and louvres; a luggage storage area, such as overhead and vertical luggage racks, luggage containers and compartments; a driver's desk application, such as paneling and surfaces of driver's desk; an interior surface of gangways, such as interior sides of gangway membranes (bellows) and interior linings; a window frame (including sealants and gaskets); a (folding) table with downward facing surface; an interior or exterior surface of air ducts, or a device for passenger information, such as information display screens, and wherein the railway component is molded or formed from a thermoplastic polymer composition comprising, 58 to 95 wt. % of a first polymer comprising bisphenol A carbonate units and monoaryl arylate units, or a second polymer comprising bisphenol A carbonate units, monoaryl arylate units, and siloxane units, or a combination comprising at least one of the foregoing polymers; 5 to 30 wt. % of a polyetherimide; and an organophosphorus compound in an amount effective to provide 0.1 to 1.0 wt. % of phosphorus, based on the total weight of the thermoplastic polymer composition, and optionally, up to 5 wt. % of an additive selected from a processing aid, a heat stabilizer, an ultra violet light absorber, a colorant, or a combination comprising at least one of the foregoing, wherein an article having a thickness of 0.5 to 10 mm molded from the composition has a Ds-4 smoke density of less than or equal to 150 measured according to ISO 5659-2 on a 3 mm thick plaque at 50 kW/m$^2$, and a MAHRE of less than or equal to 60 kW/m$^2$ measured according to ISO 5660-1 on a 3 mm thick plaque at 50 kW/m$^2$, a critical heat flux at extinguishment (CFE) of equal to or more than 20 kW/m$^2$ measured according to ISO 5658-2 at a 3 mm thick plaque, and a multiaxial impact energy at or above 100 J and a ductility of 80 to 100%, measured at +23° C. at an impact speed of 4.4 m/second in accordance with ISO 6603 on 3.2 mm thick discs, and optionally, a melt volume flow rate of greater than 4 cc/10 min measured at 300° C. under 1.2 kg force measured according to ISO 1133.

In another embodiment, a railway component, wherein the component is a molded or extruded seat component, comprises a thermoplastic composition comprising, based on the total weight of the composition: 48 to 95 wt. % of a first polymer comprising bisphenol A carbonate units and monoaryl arylate units, or a second polymer comprising bisphenol A carbonate units, monoaryl arylate units, and siloxane units, or a combination comprising at least one of the foregoing polymers; 5 to 40 wt. % of a polyetherimide; optionally, up to 5 wt. % of an additive selected from a processing aid, a heat stabilizer, an ultra violet light absorber, a colorant, or a combination comprising at least one of the foregoing; and optionally, 2 to 12 wt. % of an organophosphorus compound in an amount effective to provide 0.1 to 1.0 wt. % of phosphorus, based on the total weight of the thermoplastic polymer composition; wherein a sample of the thermoplastic composition has: a smoke density after 4 minutes (Ds-4) of equal to or less than 150 measured in accordance with ISO 5659-2 on a 3 mm thick plaque at 50 kW/m$^2$, an integral of the smoke density as a function of time up to 4 minutes (VOF4) of equal to or less than 300 measured in accordance with ISO 5659-2 on a 3 mm thick plaque at 50 kW/m$^2$, a maximum average heat release (MAHRE) of equal to or less than 90 kW/m$^2$ measured in accordance with ISO 5660-1 on a 3 mm thick plaque at 50 kW/m$^2$, and a ductility in multiaxial impact of 80% to 100%, measured at 23° C. at an impact speed of 4.4 m/second in accordance with ISO 6603 on 3.2 mm thick discs.

In still another embodiment a railway component, wherein the component is an extruded or molded interior train cladding, comprises a thermoplastic composition comprising, based on the total weight of the composition: 48 to 95 wt. % of a first polymer comprising bisphenol A carbonate units and monoaryl arylate units, or a second polymer comprising bisphenol A carbonate units, monoaryl arylate units, and siloxane units, or a combination comprising at least one of the foregoing polymers; 5 to 40 wt. % of a polyetherimide; optionally, up to 5 wt. % of an additive selected from a processing aid, a heat stabilizer, an ultra violet light absorber, a colorant, or a combination comprising at least one of the foregoing; and optionally 2 to 12 wt. % of an organophosphorus compound in an amount effective to provide 0.1 to 1.0 wt. % of phosphorus, based on the total weight of the thermoplastic polymer composition, wherein a sample of the thermoplastic composition has: a smoke density after 4 minutes (Ds-4) of equal to or less than 150 measured in accordance with ISO 5659-2 on a 3 mm thick plaque at 50 kW/m$^2$, an integral of the smoke density as a function of time up to 4 minutes (VOF4) of equal to or less than 300 measured in accordance with ISO 5659-2 on a 3 mm thick plaque at 50 kW/m$^2$, a maximum average heat release (MAHRE) of equal to or less than 90 kW/m$^2$ measured in accordance with ISO 5660-1 on a 3 mm thick plaque at 50 kW/m$^2$, a critical heat flux at extinguishment (CFE) of equal to or greater than 20 kW/m$^2$ measured in accordance with ISO 5658-2 on a 3 mm thick plaque, and a ductility in multiaxial impact of 80% to 100%, measured at 23° C. at an impact speed of 4.4 m/second in accordance with ISO 6603 on 3.2 mm thick discs.

In yet another embodiment, a method of manufacture of the transportation component comprises molding or extruding the above-described compositions to form the component.

The above described and other features are exemplified by the following Figures, Detailed Description, and Examples.

BRIEF DESCRIPTION OF THE DRAWINGS

A description of the figures, which are meant to be exemplary and not limiting, is provided in which.

Figure 1:
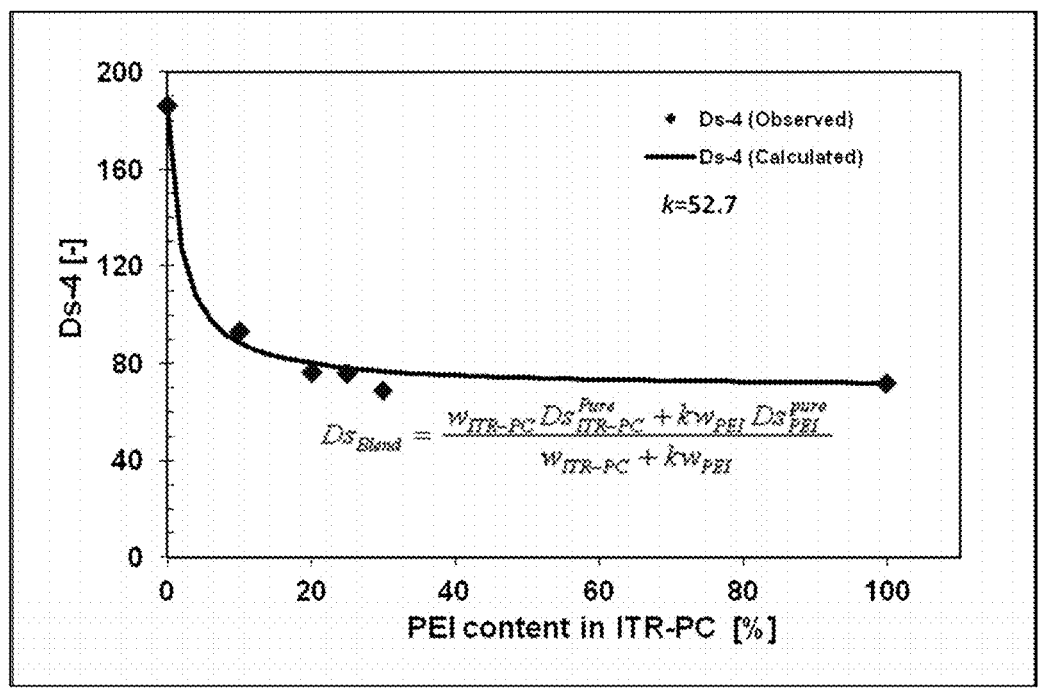
FIG. 1 shows the effect of an increase in fractional concentration (wt. %) of a polyetherimide in an ITR-PC copolymer on smoke density (Ds-4), indicating an interaction behavior.

The above described and other features are exemplified by the following detailed description and Examples.

DETAILED DESCRIPTION

The inventors hereof have developed articles for use in train interiors, including seat components and claddings. The articles have very low smoke characteristics, in particular improved smoke density measured according to ISO 5659-2 at 50 kW/m$^2$ and low heat release characteristics, in particular improved MAHRE measured according to ISO5660-1 at 50 kW/m$^2$, and can unexpectedly be obtained by use of specific thermoplastic polycarbonate compositions. Thus, it has been discovered that that the combination of the small amount of polyetherimide to certain polycarbonate copolymers results in a non-linear decrease in the smoke density (Ds-4) of the copolymers measured according to ISO 5659-2 at 50 kW/m$^2$, in addition to decreasing the heat release (MAHRE) measured according to ISO 5660-1 at 50 kW/m$^2$. The results are particularly surprising because only relatively small amounts of polyetherimides are used, but the resulting smoke densities can be as low as those obtained from polyetherimide alone. For example, the thermoplastic composition can have a smoke density (Ds-4) of less than 150 measured according to ISO 5659-2 at 50 kW/m$^2$, despite the much higher Ds-4 of the composition without polyetherimide. The thermoplastic compositions can further have a heat release (MAHRE) of less than 90 kW/m$^2$ measured according to ISO 5660-1 at 50 kW/m$^2$. Furthermore, these compositions can also have good flame spread properties, with critical heat flux to extinguishment (CFE) values above 20 kW/m$^2$ measured according to ISO 5658-2 on 3 mm thick samples. With this discovery, it is now possible to manufacture seat components and claddings having one or more of good impact properties, low color, and high flow of polycarbonates, with the very low smoke densities (Ds-4) measured according to ISO5659-2 on 3 mm thick samples at 50 kW/m$^2$ and low heat release (MAHRE) measured according to ISO 5660-1 on 3 mm thick samples at 50 kW/m$^2$, and optionally critical heat flux to extinguishment (CFE) values above 20 kW/m$^2$ measured according to ISO 5658-2 on 3 mm thick samples properties of polyetherimides.

The addition of the organophosphorus compounds to these compositions can result in a further improved balance of properties compared to the same compositions without the organophosphorus compounds, namely significantly reduced heat release (MAHRE) measured according to ISO 5660-1 at 50 kW/m$^2$, an equal or reduced smoke density (Ds-4) measured according to ISO 5659-2 at 50 kW/m$^2$, and improved flow (MVR) measured according to ISO 1133, without significantly compromising practical impact properties (MAI) measured according to ISO 6603.

In a particularly advantageous feature, the thermoplastic compositions can have very low smoke density with Ds-4 values at or below 150 measured according to ISO 5659-2 on a 3 mm thick plaque at 50 kW/m$^2$, a low maximum average heat release (MAHRE) at or below 90 kJ/m$^2$ measured according to ISO 5660-1 on a 3 mm thick plaque at 50 kW/m$^2$, while allowing sufficient melt flow for injection molding of relatively large parts, while simultaneously retaining sufficient practical impact resistance characteristics.

In a particularly more advantageous feature, the thermoplastic compositions can have very low smoke density with Ds-4 values at or below 150 measured according to ISO 5659-2 on a 3 mm thick plaque at 50 kW/m$^2$, a low maximum average heat release (MAHRE) at or below 60 kJ/m$^2$ measured according to ISO 5660-1 on a 3 mm thick plaque at 50 kW/m$^2$, while allowing sufficient melt flow for injection molding of relatively large parts, while simultaneously retaining sufficient practical impact resistance characteristics.

Optionally, the compositions can have a critical heat flux at extinguishment (CFE) at or above 20 kW/m² determined in accordance to ISO 5658-2 on a 3 mm thick plaque.

Thus, the thermoplastic compositions can further have excellent impact strength. The thermoplastic compositions can also be formulated to have low melt viscosities, which renders them suitable for injection molding. The compositions can further have very low color, and in particular white compositions can be obtained. Such compositions are especially useful in the manufacture of seat components and claddings.

In particular, the seat components and claddings molded or extruded from thermoplastic compositions containing a polycarbonate copolymer comprising first carbonate units and second units that are different from the first carbonate units. The first carbonate units are bisphenol carbonate units derived from a bisphenol-type compound. The second units can be bisphenol carbonate units different from the first units, siloxane units, arylate ester units, or a combination comprising at least one of the foregoing types of units. For example, a combination of first bisphenol carbonate units, arylate ester units, and siloxane units can be present as the second units. The thermoplastic compositions further contain 5 to 30 wt. % of a polyetherimide, present in an amount effective to provide a smoke density (Ds-4) of less than 150 measured according to ISO 5659-2 on 3 mm thick plaques at 50 kW/m².

Accordingly, provided herein are seat components and claddings molded or extruded from a composition comprising a poly(carbonate-arylate ester), that is a copolymer comprising repeating carbonate units and repeating arylate ester units. As described in more detail below, the copolymers can additionally contain siloxane units. The repeating structural carbonate units of are of formula (1)

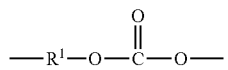

(1)

in which at least 75%, at least 90%, at least 95%, of the total number of $R^1$ groups contain aromatic moieties and the balance thereof are aliphatic, alicyclic, or aromatic groups. In an embodiment each $R^1$ is an aromatic group, for example a $C_{6-30}$ aromatic group that contains at least one aromatic moiety, to provide optimal flammability performance of the poly(carbonate-arylate ester)s. $R^1$ can be derived from a dihydroxy compound of the formula HO—$R^1$—OH, in particular a group of formula (2)

HO-A$^1$-Y$^1$-A$^2$-OH  (2)

wherein each of A$^1$ and A$^2$ is a monocyclic divalent aromatic group and Y$^1$ is a single bond or a bridging group having one or more atoms that separate A$^1$ from A$^2$. For example, one atom separates A$^1$ from A$^2$. Specifically, each $R^1$ can be derived from an aromatic dihydroxy compound, in particular a bisphenol of formula (3)

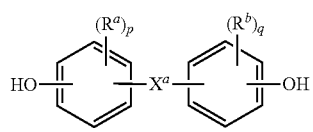

(3)

wherein $R^a$ and $R^b$ are each independently a $C_{1-12}$ alkyl; and p and q are each independently integers of 0 to 4. It will be understood that $R^a$ is hydrogen when p is 0, and likewise $R^b$ is hydrogen when q is 0. In an embodiment, no halogen is present.

Also in formula (3), $X^a$ is a bridging group connecting the two hydroxy-substituted aromatic groups, where the bridging group and the hydroxy substituent of each $C_6$ arylene group are disposed ortho, meta, or para (specifically para) to each other on the $C_6$ arylene group. The bridging group $X^a$ can be a single bond, —O—, —S—, —S(O)—, —S(O)$_2$—, —C(O)—, or a $C_{1-18}$ organic group. The $C_{1-18}$ organic bridging group can be cyclic or acyclic, aromatic or non-aromatic, and can further comprise heteroatoms such as halogens, oxygen, nitrogen, sulfur, silicon, or phosphorus. The $C_{1-18}$ organic group can be disposed such that the $C_6$ arylene groups connected thereto are each connected to a common alkylidene carbon or to different carbons of the $C_{1-18}$ organic bridging group. p and q can each be 1, and $R^a$ and $R^b$ can each be a $C_{1-3}$ alkyl group, specifically methyl, disposed meta to the hydroxy group on each arylene group.

$X^a$ can be a substituted or unsubstituted $C_{3-18}$ cycloalkylidene, a $C_{1-25}$ alkylidene of formula —C(R$^c$)(R$^d$)— wherein R$^c$ and R$^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, or a group of the formula —C(=R$^e$)— wherein R$^e$ is a divalent $C_{1-12}$ hydrocarbon group. Exemplary groups of this type include methylene, cyclohexylmethylene, ethylidene, neopentylidene, and isopropylidene, as well as 2-[2.2.1]-bicycloheptylidene, cyclohexylidene, cyclopentylidene, cyclododecylidene, and adamantylidene. A specific example wherein $X^a$ is a substituted cycloalkylidene is the cyclohexylidene-bridged, alkyl-substituted bisphenol of formula (4)

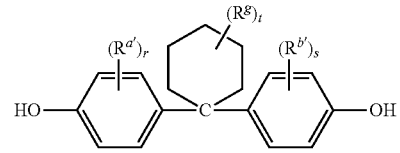

(4)

wherein $R^{a'}$ and $R^{b'}$ are each independently $C_{1-12}$ alkyl, $R^g$ is $C_{1-12}$ alkyl or halogen, r and s are each independently 1 to 4, and t is 0 to 10. Specifically, at least one of each of $R^{a'}$ and $R^{b'}$ are disposed meta to the cyclohexylidene bridging group. The substituents $R^{a'}$, $R^{b'}$, and $R^g$ can, when comprising an appropriate number of carbon atoms, be straight chain, cyclic, bicyclic, branched, saturated, or unsaturated. $R^{a'}$ and $R^{b'}$ can each independently be $C_{1-4}$ alkyl, $R^g$ is $C_{1-4}$ alkyl, r and s are each 1, and t is 0 to 5. Likewise, $R^{a'}$, $R^{b'}$ and $R^g$ can each be methyl, where r and s can each be 1, and t is 0 or 3. The cyclohexylidene-bridged bisphenol can be the reaction product of two moles of o-cresol with one mole of cyclohexanone. In another example, the cyclohexylidene-bridged bisphenol is the reaction product of two moles of a cresol with one mole of a hydrogenated isophorone (e.g., 1,1,3-trimethyl-3-cyclohexane-5-one). Such cyclohexane-containing bisphenols, for example the reaction product of two moles of a phenol with one mole of a hydrogenated isophorone, are useful for making polycarbonate polymers with high glass transition temperatures and high heat distortion temperatures.

$X^a$ can also be a $C_{1-18}$ alkylene group, a $C_{3-18}$ cycloalkylene group, a fused $C_{6-18}$ cycloalkylene group, or a group of the formula —B$^1$-Q-B$^2$— wherein B$^1$ and B$^2$ are the same or different $C_{1-6}$ alkylene group and Q is a $C_{3-12}$ cycloalkylidene group or a $C_{6-16}$ arylene group.

$X^a$ can also be a substituted $C_{3-18}$ cycloalkylidene of formula (5)

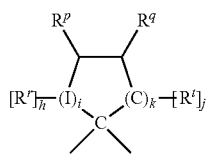
(5)

wherein $R^r$, $R^P$, $R^q$, and $R^t$ are each independently hydrogen, halogen, oxygen, or $C_{1-12}$ organic groups; I is a direct bond, a carbon, or a divalent oxygen, sulfur, or —N(Z)— where Z is hydrogen, halogen, hydroxy, $C_{1-12}$ alkyl, $C_{1-12}$ alkoxy, or $C_{1-12}$ acyl; h is 0 to 2, j is 1 or 2, i is an integer of 0 or 1, and k is an integer of 0 to 3, with the proviso that at least two of $R^r$, $R^P$, $R^q$, and $R^t$ taken together are a fused cycloaliphatic, aromatic, or heteroaromatic ring. It will be understood that where the fused ring is aromatic, the ring as shown in formula (5) will have an unsaturated carbon-carbon linkage where the ring is fused. When k is one and i is 0, the ring as shown in formula (5) contains 4 carbon atoms, when k is 2, the ring as shown in formula (5) contains 5 carbon atoms, and when k is 3, the ring contains 6 carbon atoms. The two adjacent groups (e.g., $R^q$ and $R^t$ taken together) can form an aromatic group, and likewise, $R^q$ and $R^t$ taken together can form one aromatic group and $R^r$ and $R^P$ taken together can form a second aromatic group. When $R^q$ and $R^t$ taken together form an aromatic group, $R^P$ can be a double-bonded oxygen atom, i.e., a ketone.

Other useful aromatic dihydroxy compounds of the formula HO—$R^1$—OH include monoaryl dihydroxy compounds of formula (6)

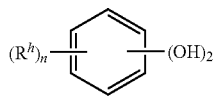
(6)

wherein each $R^h$ is independently a halogen atom, a $C_{1-10}$ hydrocarbyl such as a $C_{1-10}$ alkyl group, a halogen-substituted $C_{1-10}$ alkyl group, a $C_{6-10}$ aryl group, or a halogen-substituted $C_{6-10}$ aryl group, and n is 0 to 4. The halogen is usually bromine. In an embodiment, no halogen is present.

Some illustrative examples of specific aromatic dihydroxy compounds include 4,4'-dihydroxybiphenyl, 1,6-dihydroxynaphthalene, 2,6-dihydroxynaphthalene, bis(4-hydroxyphenyl)methane, bis(4-hydroxyphenyl) diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantane, alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis (4-hydroxyphenyl)ether, bis(4-hydroxyphenyl)ether, bis(4-hydroxyphenyl)sulfide, bis(4-hydroxyphenyl)sulfoxide, bis (4-hydroxyphenyl)sulfone, 9,9-bis(4-hydroxyphenyl) fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalimide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like, or combinations comprising at least one of the foregoing dihydroxy compounds.

Specific examples of bisphenol compounds of formula (3) include 1,1-bis(4-hydroxyphenyl)methane, 1,1-bis(4-hydroxyphenyl)ethane, 2,2-bis(4-hydroxyphenyl)propane (hereinafter "bisphenol-A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-2-methylphenyl)propane, 1,1-bis(4-hydroxy-t-butylphenyl)propane, 3,3-bis(4-hydroxyphenyl) phthalimidine, 2-phenyl-3,3-bis(4-hydroxyphenyl) phthalimidine (PPPBP), and 1,1-bis(4-hydroxy-3-methylphenyl)cyclohexane (DMBPC). Combinations comprising at least one of the foregoing dihydroxy compounds can also be used.

In a specific embodiment, the polycarbonate units are of the formula (1a)

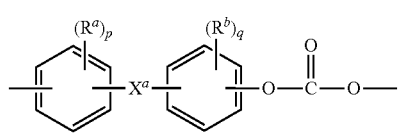
(1a)

wherein $R^a$ and $R^b$ are each independently are each independently $C_{1-12}$ alkyl, p and q are each independently integers of 0 to 4, and $X^a$ is a single bond, —O—, —S—, —S(O)—, —S(O)$_2$—, —C(O)—, or a $C_{1-18}$ organic group. Alternatively, $R^a$ and $R^b$ are each independently a $C_{1-3}$alkyl, p and q are each independently 0 or 1, and $X^a$ is alkylidene of formula —C($R^c$)($R^d$)— wherein $R^c$ and $R^d$ are each $C_{1-6}$ alkyl. Specifically, the carbonate units are derived from bisphenol-A, in which each of $A^1$ and $A^2$ is p-phenylene and $Y^1$ is isopropylidene in formula (1a). Such units are referred to herein as "bisphenol A carbonate units."

In addition to carbonate units (1), specifically carbonate units (1a), more specifically bisphenol-A carbonate units, the poly(carbonate-arylate ester) copolymers contain repeating arylate ester units of formula (7)

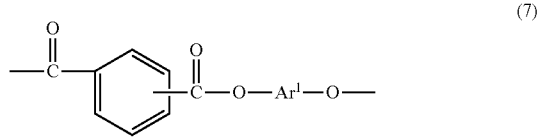

wherein $Ar^1$ is a $C_{6-32}$ hydrocarbyl group containing at least one aromatic group, e.g., a phenyl, naphthalene, anthracene, or the like. In an embodiment, $Ar^1$ is derived from a bisphenol (3), a monoaryl dihydroxy compound (6), or a combination comprising different bisphenol or monoaryl dihydroxy compounds. Thus, arylate ester units (7) can be derived by reaction of isophthalic acid, terephthalic acid, or a combination comprising at least one of the foregoing (referred to herein as a "phthalic acid"), with an aromatic bisphenol (3), a monoaryl dihydroxy compound (6), or a combination thereof. The molar ratio of isophthalate to terephthalate can be 1:99 to 99:1, or 80:20 to 20:80, or 60:40 to 40:60.

The poly(carbonate-arylate ester) copolymers comprising carbonate units (1), specifically bisphenol-A carbonate units, and arylate ester units (7) can be alternating or block copolymers of formula (8)

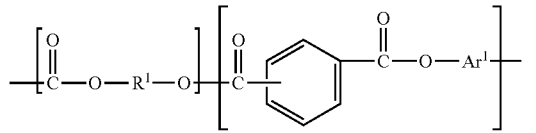

wherein $R^1$ and $Ar^1$ are as defined in formulas (1) and (7), respectively.

In general, the copolymers are block copolymers containing carbonate blocks and ester blocks. The weight ratio of total ester units to total carbonate units in the copolymers can vary broadly, for example from 99:1 to 1:99, or from 95:5 to 5:95, specifically from 90:10 to 10:90, or more specifically from 90:10 to 50:50, depending on the desired properties of the thermoplastic composition. The molar ratio of isophthalate to terephthalate in the ester units of the copolymers can also vary broadly, for example from 0:100 to 100:0, or from 92:8 to 8:92, more specifically from 98:2 to 45:55, depending on the desired properties of the thermoplastic composition. For example, the weight ratio of total ester units to total carbonate can be 99:1 to 40:60, or 90:10 to 50:40, wherein the molar ratio of isophthalate to terephthalate is from 99:1 to 40:50, more specifically 98:2 to 45:55, depending on the desired properties of the thermoplastic composition.

Additional carbonate units derived from the dihydroxy compound used to form the arylate ester units (7) can also be present in the copolymers, for example in amounts of less than 20 mole %, less than 10 mole %, less than 5 mole %, or less than 1 mole % based on the total moles of units in the copolymer. It is also possible to have additional arylate ester units present derived from reaction of the phthalic acid with the dihydroxy compound used to form the carbonate units, for example in amounts of less than 20 mole %, less than 10 mole %, less than 5 mole %, or less than 1 mole % based on the total moles of units in the copolymer. In an embodiment, the combination of such additional carbonate units and such additional arylate ester units are present in an amount of less than 20 mole %, less than 10 mole %, less than 5 mole %, or less than 1 mole % based on the total moles of units in the copolymer.

A specific poly(carbonate-arylate ester) is a poly(carbonate-bisphenol arylate ester) comprising carbonate units (1), specifically bisphenol carbonate units, even more specifically bisphenol-A carbonate units and repeating bisphenol arylate ester units. Bisphenol arylate units comprise residues of phthalic acid and a bisphenol, for example a bisphenol (3). In an embodiment the bisphenol arylate ester units are of formula (7a)

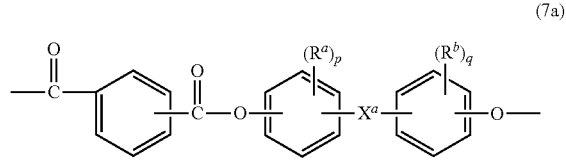

wherein $R^a$ and $R^b$ are each independently $C_{1-12}$ alkyl, p and q are each independently 0 to 4, and $X^a$ is a bridging group between the two arylene groups, and is a single bond, —O—, —S—, —S(O)—, —S(O)$_2$—, —C(O)—, or a $C_{1-18}$ organic group. In an embodiment $X^a$ can be a substituted or unsubstituted $C_{3-18}$ cycloalkylidene, a $C_{1-25}$ alkylidene of formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, or a group of the formula —C(=$R^e$)— wherein $R^e$ is a divalent $C_{1-12}$ hydrocarbon group. For example, $R^a$ and $R^b$ are each independently a $C_{1-3}$ alkyl, p and q are each independently 0 or 1, and $X^a$ is alkylidene of formula —C($R^c$)($R^d$)— wherein $R^c$ and $R^d$ are each $C_{1-6}$ alkyl. In an embodiment, p and q is each 1, and $R^a$ and $R^b$ are each a $C_{1-3}$ alkyl group, specifically methyl, disposed meta to the oxygen on each ring. The bisphenol can be bisphenol-A, where p and q are both 0 and $X^a$ is isopropylidene. In an embodiment, the ratio of the weight percent of ester units to weight percent carbonate units in the copolymers is 50:50 to 99:1, or 55:45 to 90:10, or 75:25 to 95:5.

A specific example of a poly(carbonate-bisphenol arylate ester) is a poly(bisphenol-A carbonate)-co-poly(bisphenol-A phthalate ester) of formula (8a)

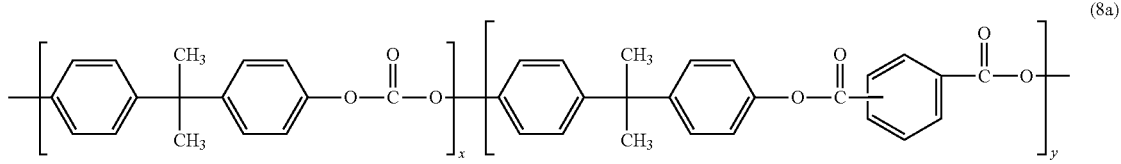

wherein x and y represent the weight percent of bisphenol-A carbonate units and arylate-bisphenol-A ester units, respectively. Generally, the units are present as blocks. In an embodiment, the ratio of the weight percent carbonate units x to ester units y in the copolymers is 50:50 to 1:99, or 45:55 to 35:65, or 25:75 to 15:85. Thus, copolymers of formula (8a) comprising 35 to 45 wt. % of carbonate units and 55 to 65 wt. % of ester units, wherein the ester units have a molar ratio of isophthalate to terephthalate of 45:55 to 55:45 are often referred to as poly(carbonate-ester)s (PCE) and copolymers comprising 15 to 25 wt. % of carbonate units and 75 to 85 wt. % of ester units having a molar ratio of isophthalate to terephthalate from 98:2 to 88:12 are often referred to as poly(phthalate-carbonate)s (PPC).

In another embodiment, a specific poly(carbonate-arylate ester) is a poly(carbonate-monoaryl arylate ester) comprising carbonate units (1), specifically bisphenol carbonate units, even more specifically bisphenol-A carbonate units, and repeating monoaryl arylate-ester units of formula (7b)

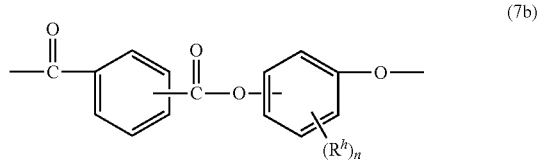

(7b)

wherein each $R^h$ is independently a halogen atom, a $C_{1-10}$ hydrocarbyl such as a $C_{1-10}$ alkyl group, a halogen-substituted $C_{1-10}$ alkyl group, a $C_{6-10}$ aryl group, or a halogen-substituted $C_{6-10}$ aryl group, and n is 0 to 4. Specifically, each $R^h$ is independently a $C_{1-4}$ alkyl, and n is 0 to 3, 0 to 1, or 0. These poly(carbonate-monoaryl arylate) copolymers are of formula (8b)

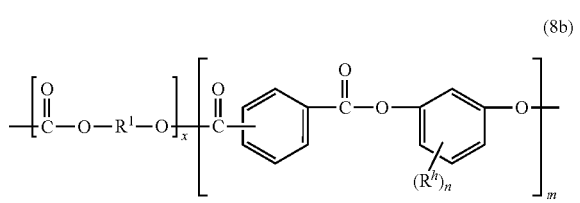

(8b)

wherein $R^1$ is as defined in formula (1) and $R^h$, and n are as defined in formula (7b), and the mole ratio of x:m is 99:1 to 1:99, specifically 80:20 to 20:80, or 60:40 to 40:60.

A specific example of monoaryl ester unit (7b) is derived from the reaction of a phthalic diacid (or a derivative thereof) with resorcinol (or a reactive derivative thereof) to provide isophthalate-terephthalate-resorcinol ("ITR" ester units) of formula (7c).

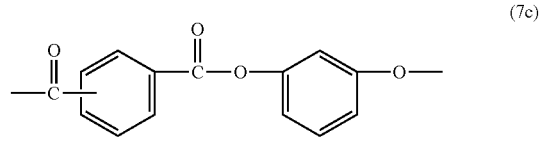

(7c)

In an embodiment, the ITR ester units are present in the poly(carbonate-arylate ester) copolymer in an amount greater than or equal to 95 mol %, specifically greater than or equal to 99 mol %, and still more specifically greater than or equal to 99.5 mol % based on the total moles of ester units in the copolymer. Such (isophthalate-terephthalate-resorcinol)-carbonate copolymers ("ITR-PC") can possess many desired features, including toughness, transparency, and weatherability. ITR-PC copolymers can also have desirable thermal flow properties. In addition, ITR-PC copolymers can be readily manufactured on a commercial scale using interfacial polymerization techniques, which allow synthetic flexibility and composition specificity in the synthesis of the ITR-PC copolymers.

As described above, the ITR-PC polymers can further optionally comprise small amounts of other carbonate units, for example 1 to 20 mole % of other carbonate units, based on the total moles of units in the copolymers. In an embodiment, the other carbonate unit arises from carbonylation of the monoaryl dihydroxy compound (6). Other arylate ester units can optionally be present, for example 1 to 20 mole % of bisphenol arylate ester units (7b), based on the total moles of units in the copolymers. The bisphenol arylate units can arise from the presence of a bisphenol used to form the carbonate units. In an embodiment, wherein the total amount of the combination is other carbonate units and other arylate ester units is 1 to 20 mole %, based on the total moles of units in the copolymers.

A specific example of a poly(carbonate)-co-poly(monoaryl arylate ester) is a poly(bisphenol-A carbonate)-co-poly(isophthalate-terephthalate-resorcinol ester) of formula (8c)

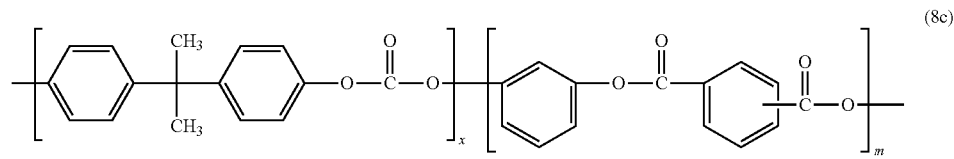

(8c)

wherein m is 4 to 100, 4 to 90, 5 to 70, more specifically 5 to 50, or still more specifically 10 to 30, and the mole ratio of x:m is 99:1 to 1:99, specifically 90:10 to 10:90. The ITR ester units are present in the poly(carbonate-arylate ester) copolymer in an amount greater than or equal to 95 mol %, specifically greater than or equal to 99 mol %, and still more specifically greater than or equal to 99.5 mol % based on the total moles of ester units. Other carbonate units, other ester units, or a combination comprising at least one of the foregoing can be present, in a total amount of 1 to 20 mole % based on the total moles of units in the copolymers, for example resorcinol carbonate units of the formula

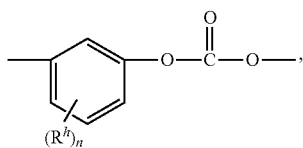

and bisphenol-A phthalate ester units of the formula

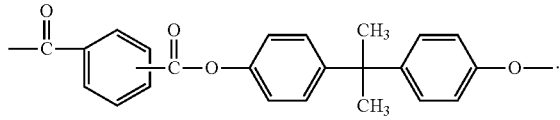

In an embodiment, poly(bisphenol-A carbonate)-co-poly (isophthalate-terephthalate-resorcinol ester) (8c) comprises 1 to 20 mol % of bisphenol-A carbonate units, 60-98 mol % of isophthalic acid-terephthalic acid-resorcinol ester units, and optionally 1 to 20 mol % of resorcinol carbonate units, isophthalic acid-terephthalic acid-bisphenol-A phthalate ester units, or a combination thereof.

The poly(carbonate-arylate ester) copolymers can be prepared by methods known in the art. For example, the copolymers are units can be prepared from polycarbonate blocks and polyester blocks. Polycarbonate blocks and polyester blocks can be obtained by interfacial polymerization or melt polymerization.

Polycarbonate blocks can be manufactured by processes such as interfacial polymerization and melt polymerization. Although the reaction conditions for interfacial polymerization can vary, an exemplary process generally involves dissolving or dispersing the dihydroxy reactant in aqueous caustic soda or potash, adding the resulting mixture to a water-immiscible solvent medium, and contacting the reactants with a carbonate precursor in the presence of a catalyst such as triethylamine and/or a phase transfer catalyst, under controlled pH conditions, e.g., 8 to 12. The most commonly used water immiscible solvents include methylene chloride, 1,2-dichloroethane, chlorobenzene, toluene, and the like. Exemplary carbonate precursors include a carbonyl halide such as carbonyl bromide or carbonyl chloride or a haloformate such as a bishaloformates of a dihydric phenol (e.g., the bischloroformates of bisphenol-A, hydroquinone, or the like) or a glycol (e.g., the bishaloformate of ethylene glycol, neopentyl glycol, polyethylene glycol, or the like). Combinations comprising at least one of the foregoing types of carbonate precursors can also be used. In an exemplary embodiment, an interfacial polymerization reaction to form carbonate linkages uses phosgene as a carbonate precursor, and is referred to as a phosgenation reaction.

Among the phase transfer catalysts that can be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Exemplary phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is Cl$^-$, Br$^-$, a $C_{1-8}$ alkoxy group or a $C_{6-18}$ aryloxy group. An effective amount of a phase transfer catalyst can be 0.1 to 10 wt. % based on the weight of bisphenol in the phosgenation mixture. In another embodiment an effective amount of phase transfer catalyst can be 0.5 to 2 wt. % based on the weight of bisphenol in the phosgenation mixture.

Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl)alpha,alpha-dimethylbenzyl)phenol), 4-chloroformyl phthalic anhydride, trimesic acid, and benzophenone tetracarboxylic acid. The branching agents can be added at a level of 0.05 to 2.0 wt. %. Combinations comprising linear and branched polycarbonate blocks can be used.

For the polyester blocks, rather than using the dicarboxylic acid or diol per se, the reactive derivatives of the acid or diol, such as the corresponding acid halides, in particular the acid dichlorides and the acid dibromides can be used. Thus, for example instead of using isophthalic acid, terephthalic acid, or a combination comprising at least one of the foregoing acids, isophthaloyl dichloride, terephthaloyl dichloride, or a combination comprising at least one of the foregoing dichlorides can be used. The polyesters can also be obtained by melt-process condensation as described above, by solution phase condensation, or by transesterification polymerization wherein, for example, a dialkyl ester such as dimethyl terephthalate can be transesterified with the dihydroxy reactant using acid catalysis, to generate the polyester blocks. Branched polyester blocks, in which a branching agent, for example, a glycol having three or more hydroxyl groups or a trifunctional or multifunctional carboxylic acid has been incorporated, can be used. Furthermore, it can be desirable to have various concentrations of acid and hydroxyl end groups on the polyester blocks, depending on the ultimate end use of the composition.

The poly(carbonate-arylate ester)s can have a weight average molecular weight (Mw) of 2,000 to 100,000 g/mol, specifically 3,000 to 75,000 g/mol, more specifically 4,000 to 50,000 g/mol, more specifically 5,000 to 35,000 g/mol, and still more specifically 17,000 to 30,000 g/mol. Molecular weight determinations are performed using GPC using a cross linked styrene-divinyl benzene column, at a sample concentration of 1 milligram per milliliter, and as calibrated with polycarbonate standards. Samples are eluted at a flow rate of 1.0 ml/min with methylene chloride as the eluent.

In another embodiment, the poly(carbonate-arylate ester) copolymers further comprise siloxane units (also known as "diorganosiloxane units"). In a specific embodiment these copolymers comprises carbonate units (1) derived from a bisphenol (3), specifically bisphenol-A; monoaryl arylate ester units (7b), and siloxane units. Still more specifically, the poly(carbonate-arylate ester) copolymers comprises bisphenol-A carbonate units, ITR ester units (7c), and siloxane units (9). For convenience, these polymers, poly(bisphenol-A carbonate)-co-poly(isophthalate-terephthalate-resorcinol ester)-co-poly(siloxane), are referred to herein as "ITR-PC-siloxane" copolymers.

The polysiloxane units are of formula (9)

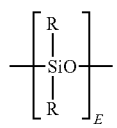

(9)

wherein each R is independently a $C_{1-13}$ monovalent hydrocarbyl group. For example, each R can independently be a $C_{1-13}$ alkyl group, $C_{1-13}$ alkoxy group, $C_{2-13}$ alkenyl group, $C_{2-13}$ alkenyloxy group, $C_{3-6}$ cycloalkyl group, $C_{3-6}$ cycloalkoxy group, $C_{6-14}$ aryl group, $C_{6-10}$ aryloxy group, $C_{7-13}$ arylalkyl group, $C_{7-13}$ arylalkoxy group, $C_{7-13}$ alkylaryl group, or $C_{7-13}$ alkylaryloxy group. The foregoing groups can be fully or partially halogenated with fluorine, chlorine, bromine, or iodine, or a combination thereof. In an embodiment no halogens are present. Combinations of the foregoing R groups can be used in the same copolymer. In an embodiment, the polysiloxane comprises R groups that have minimal hydrocarbon content. In a specific embodiment, an R group with a minimal hydrocarbon content is a methyl group.

The average value of E in formula (9) can vary widely depending on the type and relative amount of each component in the thermoplastic composition, whether the polymer is linear, branched or a graft copolymer, the desired properties of the composition, and like considerations. In an embodiment, E has an average value of 2 to 500, 2 to 200, or 2 to 90, 2 to 50, 2 to 30, 2 to 20, or 10 to 80. In an embodiment E has an average value of 16 to 50, more specifically 20 to 45, and even more specifically 25 to 45. In another embodiment, E has an average value of 4 to 50, 4 to 15, specifically 5 to 15, more specifically 6 to 15, and still more specifically 7 to 12.

In an embodiment, the polysiloxane units are structural units of formula (9a)

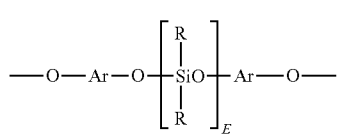

(9a)

wherein E is as defined above; each R can independently be the same or different, and is as defined above; and each Ar can independently be the same or different, and is a substituted or unsubstituted $C_{6-30}$ compound containing an aromatic group, wherein the bonds are directly connected to the aromatic moiety. The Ar groups in formula (9a) can be derived from a $C_{6-30}$ dihydroxy aromatic compound, for example a bisphenol compound as described above or a monoaryl dihydroxy compound (6) above. Combinations comprising at least one of the foregoing dihydroxy aromatic compounds can also be used. Exemplary dihydroxy aromatic compounds are resorcinol (i.e., 1,3-dihydroxybenzene), 4-methyl-1,3-dihydroxybenzene, 5-methyl-1,3-dihydroxybenzene, 4,6-dimethyl-1,3-dihydroxybenzene, 1,4-dihydroxybenzene, 1,1-bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxyphenyl)cyclohexane, bis(4-hydroxyphenyl sulfide), and 1,1-bis(4-hydroxy-t-butylphenyl)propane. Combinations comprising at least one of the foregoing dihydroxy compounds can also be used. In an embodiment, the dihydroxy aromatic compound is unsubstituted, or is does not contain non-aromatic hydrocarbyl substituents such as alkyl, alkoxy, or alkylene substituents.

In a specific embodiment, where Ar is derived from resorcinol, the polysiloxane units are of the formula (9a-1)

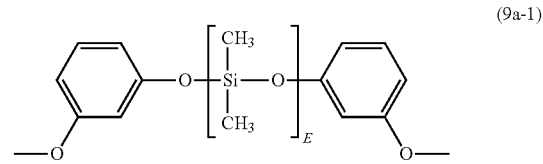

(9a-1)

or, where Ar is derived from bisphenol-A, the polysiloxane has the formula (9a-2)

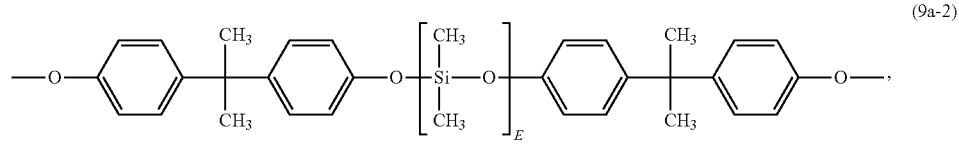

(9a-2)

or a combination comprising at least one of the foregoing can be used, wherein E has an average value as described above, specifically an average value of 2 to 200, 2 to 100, 2 to 90, 2 to 50, 2 to 30, or 10-80.

In another embodiment, polydiorganosiloxane units are units of formula (9b)

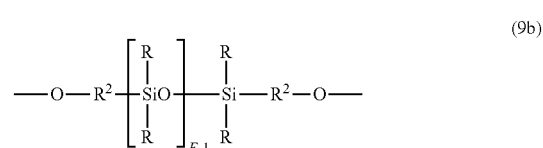

(9b)

wherein R and E are as described for formula (9), and each $R^2$ is independently a divalent $C_{1-30}$ alkylene or $C_{7-30}$ arylene-alkylene. In a specific embodiment, where $R^2$ is $C_{7-30}$ arylene-alkylene, the polydiorganosiloxane units are of formula (9b-1)

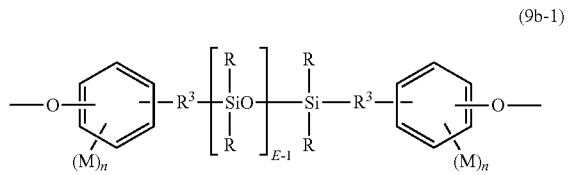

(9b-1)

wherein R and E are as defined for formula (9), and each $R^3$ is independently a divalent $C_{2-8}$ aliphatic group. Each M in formula (25) can be the same or different, and can be a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy group, $C_{3-8}$ cycloalkyl, $C_{3-8}$ cycloalkoxy, $C_{6-10}$ aryl, $C_{6-10}$ aryloxy, $C_{7-12}$ arylalkyl, $C_{7-12}$ arylalkoxy, $C_{7-12}$ alkylaryl, or $C_{7-12}$ alkylaryloxy, wherein each n is independently 0, 1, 2, 3, or 4. In an embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^3$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a combination of methyl and trifluoropropyl, or a combination of methyl and phenyl. In still another embodiment, M is methoxy, n is 0 or 1, $R^3$ is a divalent $C_{1-3}$ aliphatic group, and R is methyl. The foregoing poly(carbonate-siloxane) copolymers can be manufactured by the methods described in U.S. Pat. No. 6,072,011 to Hoover, for example.

In a specific embodiment, the polysiloxane units are eugenol-capped polysiloxane units of formula (9b-2)

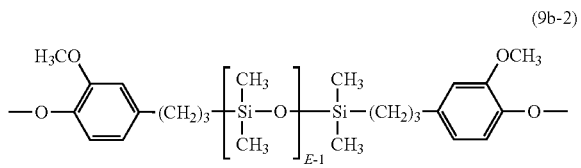

(9b-2)

where E has an average value as described above, specifically 5 to 90, more specifically 2 to 30. In another specific embodiment, the polysiloxane units are of formula (9b-3) or (9b-4)

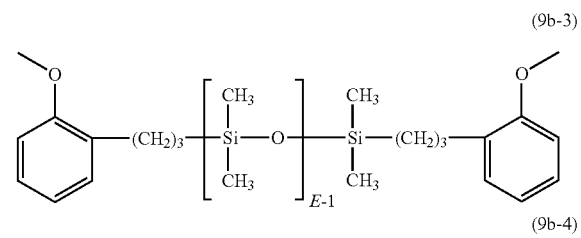

(9b-3)

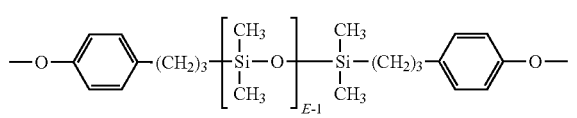

(9b-4)

where E has an average value as defined above, specifically an average value of 2 to 90, 2 to 80, 2 to 60, 2 to 50, 2 to 30, or an average value of 2 to 20.

The relative mount polysiloxane units (9) in the ITR-PC-siloxane copolymers depends on the desired properties of the thermoplastic composition, such as impact, smoke density, heat release, and melt viscosity. In particular the poly(carbonate-arylate ester) is selected to have an average value of E that provides good impact and/or transparency properties, as well as to provide the desired weight percent of siloxane units in the thermoplastic composition. For example, the poly(carbonate-arylate ester)s can comprise siloxane units in an amount of 0.3 to 30 weight percent (wt. %), specifically 0.5 to 25 wt. %, or 0.5 to 15 wt. %, based on the total weight of the polymers in the thermoplastic composition, with the proviso that the siloxane units are provided by polysiloxane units covalently bonded in the polymer backbone of the poly(carbonate-arylate ester).

In an embodiment, the PC-ITR-siloxane copolymers comprise 1 to 40 mol %, or 1 to 20 mol % of bisphenol-A carbonate units, 50 to 95 mol % of ITR ester units (7c), and an amount of polysiloxane units (9b), specifically (9b-1), even more specifically (9b-2), (9b-3), (9b-4) or a combination comprising at least one of the foregoing (specifically of formula 9b-2) in an amount effective to provide 0.1 to 10 wt. % of siloxane units, each based on the total copolymer. For example, the PC-ITR-siloxane copolymers can comprise 1 to 20 mol % of bisphenol-A carbonate units, 60 to 90 mole % of ITR ester units, and an amount of polysiloxane units (9b-2), (9b-3), (9b-4) or a combination comprising at least one of the foregoing (specifically of formula 9b-2) effective to provide 0.1 to 10 wt. % of siloxane units, each based on the total copolymer.

Other carbonate units, other ester units, or a combination comprising at least one of the foregoing can be present in the PC-ITR-siloxane copolymers, in a total amount of 1 to 20 mole % based on the total moles of units in the copolymers, for example resorcinol carbonate units, and bisphenol-A phthalate ester units of the formula. In an embodiment, the ITR-PC-siloxane comprises 1 to 20 mol % of bisphenol-A carbonate units, 60-98 mol % of isophthalic acid-terephthalic acid-resorcinol ester units, and optionally 1 to 20 mol % of resorcinol carbonate units (10), isophthalic acid-terephthalic acid-bisphenol-A ester units (11), or a combination thereof, together with the siloxane units.

Methods for the manufacture of the ITR-PC-siloxane copolymers are known. The ITR-PC-siloxane copolymers can have an intrinsic viscosity, as determined in chloroform at 25° C., of 0.3 to 1.5 deciliters per gram (dl/g), specifically 0.45 to 1.0 dl/g. The PC-siloxane copolymers can have a weight average molecular weight ($M_w$) of 10,000 to 100,000 g/mol, measured according to gel permeation chromatography (GPC) using a cross linked styrene-divinyl benzene column, at a sample concentration of 1 milligram per milliliter, and as calibrated with polycarbonate standards.

The low smoke density thermoplastic compositions comprise the above-described polycarbonate copolymers, alone or in combination, and 5 to 30 wt. % of a polyetherimide, based on the total weight of the thermoplastic composition. The polyetherimide is of formula (10)

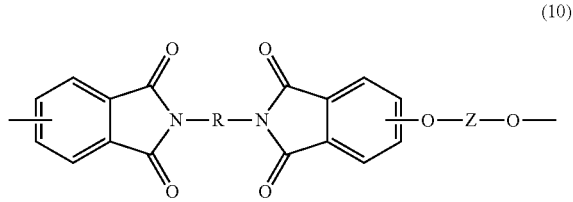

(10)

wherein R is a substituted or unsubstituted divalent organic group having 2 to 20 carbon atoms, for example a substituted or unsubstituted aromatic hydrocarbon group having 6 to 20 carbon atoms or a halogenated derivative thereof, a substituted or unsubstituted, straight or branched chain alkylene group having 2 to 20 carbon atoms, a substituted or unsubstituted cycloalkylene groups having 3 to 20 carbon atoms, or a divalent group of formula (11)

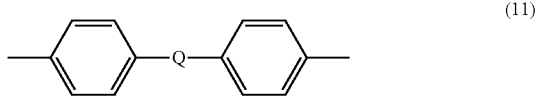

(11)

wherein Q is —O—, —S—, —C(O)—, —SO$_2$—, —SO—, or —C$_y$H$_{2y}$— wherein y is an integer from 1 to 5 or a halogenated derivative thereof.

The group Z in formula (10) is an aromatic C$_{6-24}$ monocyclic or polycyclic group optionally substituted with 1 to 6 C$_{1-8}$ alkyl groups, 1 to 8 halogen atoms, or a combination thereof, wherein the divalent bonds of the —O—Z—O— group are in the 3,3',3,4', 4,3', or the 4,4' positions. In a specific embodiment, R is m-phenylene and Z is 2,2-bis(1', 4'-phenylene)isopropylidene.

In an embodiment, R in formula (10) is a divalent radical of one of the following formulas

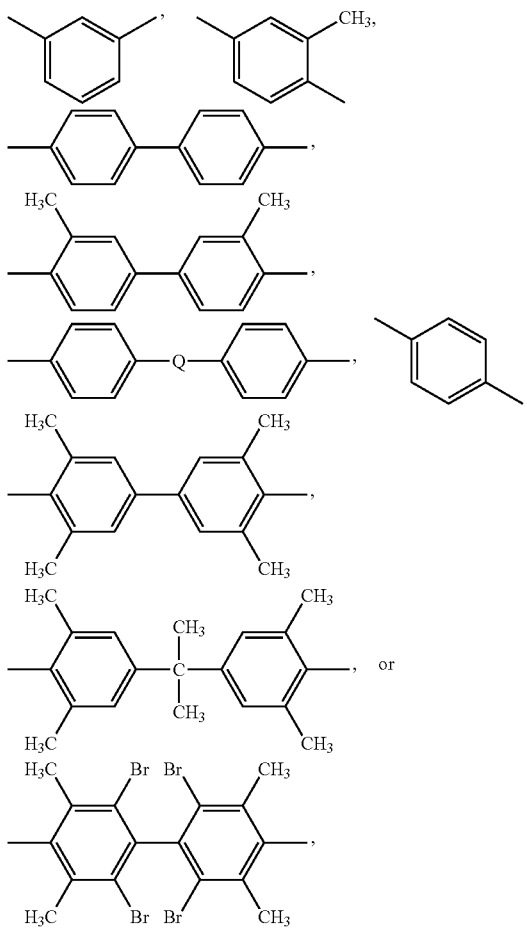

wherein Q is —O—, —S—, —C(O)—, —SO$_2$—, —SO—, or —C$_y$H$_{2y}$— wherein y is an integer from 1 to 5 or and a halogenated derivative thereof; and Z is a divalent group of formula (12)

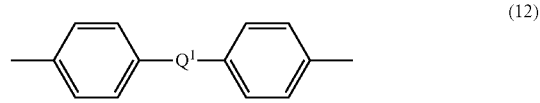

(12)

wherein Q$^1$ is —O—, —S—, —C(O)—, —SO$_2$—, —SO—, or —C$_y$H$_{2y}$— wherein y is an integer from 1 to 5. In an embodiment no halogen substituents are present in the polyetherimide.

Polyetherimides can be obtained by polymerization of an aromatic bisanhydride of formula (13)

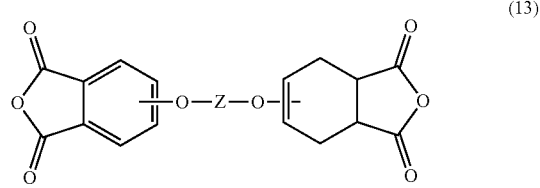

(13)

wherein Z is as described in formula (10), with a diamine of the formula H$_2$N—R—NH$_2$ wherein R is as described in formula (10). Examples of specific aromatic bisanhydrides and organic diamines are disclosed, for example, in U.S. Pat. Nos. 3,972,902 and 4,455,410 incorporated herein by reference in their entirety. Illustrative examples of aromatic bisanhydrides (38) include 3,3-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis[4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy)benzophenone dianhydride and 4-(2,3-dicarboxyphenoxy)-4'-(3,4-dicarboxyphenoxy)diphenyl sulfone dianhydride, as well as various mixtures comprising at least one of the foregoing.

Illustrative examples of diamines H$_2$N—R—NH$_2$ include ethylenediamine, propylenediamine, trimethylenediamine, diethylenetriamine, triethylenetetramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis(3-aminopropyl)amine, 3-methoxyhexamethylenediamine, 1,2-bis(3-aminopropoxy)ethane, bis(3- aminopropyl)sulfide, 1,4-cyclohexanediamine, bis-(4-aminocyclohexyl)methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl)methane, bis(2-chloro-4-amino-3,5-diethylphenyl)methane, bis(4-aminophenyl)propane, 2,4-bis(amino-t-butyl)toluene, bis(p-amino-t-butylphenyl)ether, bis(p-methyl-o-aminophenyl)benzene, bis(p-methyl-o-aminopentyl)benzene, 1,3-diamino-4-isopropylbenzene, bis(4-aminophenyl)sulfide, bis(4-aminophenyl)sulfone, bis(4-aminophenyl)ether and 1,3-bis(3-aminopropyl) tetramethyldisiloxane. Combinations comprising at least one of the foregoing aromatic bisanhydrides can be used. Aromatic diamines are often used, especially m- and p-phenylenediamine, sulfonyl dianiline, and combinations thereof.

The thermoplastic compositions can include various other polymers to adjust the properties of the thermoplastic compositions, with the proviso that the other polymers are selected so as to not adversely affect the desired properties of the thermoplastic composition significantly, in particular low smoke density and low heat release. For example, combination of a polycarbonate copolymer as described above and a homopolycarbonate such as a bisphenol-A homopolycarbonate can still provide thermoplastic compositions having the required low smoke density. Other polymers include an impact modifier such as natural rubber, fluoroelastomers, ethylene-propylene rubber (EPR), ethylene-butene rubber, ethylene-propylene-diene monomer rubber (EPDM), acrylate rubbers, hydrogenated nitrile rubber (HNBR) silicone elastomers, and elastomer-modified graft copolymers such as styrene-butadiene-styrene (SBS), styrene-butadiene rubber (SBR), styrene-ethylene-butadiene-styrene (SEBS), acrylonitrile-butadiene-styrene (ABS), acrylonitrile-ethylene-propylene-diene-styrene (AES), styrene-isoprene-styrene (SIS), methyl methacrylate-butadiene-styrene (MBS), high rubber graft (HRG), and the like can be present. In general such other polymers provide less than 50 wt. %, less than 40 wt. %, less than 30 wt. %, less than 20 wt. %, or less than 10 wt. % of the total composition. In an embodiment, no other polymers are present. In a specific embodiment, no polymers containing halogen are present in the thermoplastic compositions.

The thermoplastic compositions can include various additives ordinarily incorporated into flame retardant compositions having low smoke density and low heat release, with the proviso that the additive(s) are selected so as to not adversely affect the desired properties of the thermoplastic composition significantly, in particular low smoke density and low heat release. Such additives can be mixed at a suitable time during the mixing of the components for forming the composition. Exemplary additives include fillers, reinforcing agents, antioxidants, heat stabilizers, light stabilizers, ultraviolet (UV) light stabilizers, plasticizers, lubricants, processing aids such as mold release agents, antistatic agents, colorants such as such as titanium dioxide, carbon black, and organic dyes, surface effect additives, light diffuser additives, radiation stabilizers, additional flame retardants, and anti-drip agents. A combination of additives can be used. In general, the additives are used in the amounts generally known to be effective. The total amount of additives (other than any filler or reinforcing agents) is generally 0.01 to 25, 0.01 to 10 parts per parts per hundred parts by weight of the polymers (PHR).

Examples of inorganic pigments are white pigments such as titanium dioxide in its three modifications of rutile, anatase or brookite, lead white, zinc white, zinc sulfide or lithopones; black pigments such as carbon black, black iron oxide, iron manganese black or spinel black; chromatic pigments such as chromium oxide, chromium oxide hydrate green, cobalt green or ultramarine green, cobalt blue, iron blue, Milori blue, ultramarine blue or manganese blue, ultramarine violet or cobalt and manganese violet, red iron oxide, cadmium sulfoselenide, molybdate red or ultramarine red; brown iron oxide, mixed brown, spinel phases and corundum phases or chromium orange; yellow iron oxide, nickel titanium yellow, chromium titanium yellow, cadmium sulfide, cadmium zinc sulfide, chromium yellow, zinc yellow, alkaline earth metal chromates, Naples yellow; bismuth vanadate, and effect pigments such as interference pigments and luster pigments. Other specific inorganic pigments include Pigment White 6, Pigment White 7, Pigment Black 7, Pigment Black 11, Pigment Black 22, Pigment Black 27/30, Pigment Yellow 34, Pigment Yellow 35/37, Pigment Yellow 42, Pigment Yellow 53, Pigment Brown 24, Pigment Yellow 119, Pigment Yellow 184, Pigment Orange 20, Pigment Orange 75, Pigment Brown 6, Pigment Brown 29, Pigment Brown 31, Pigment Yellow 164, Pigment Red 101, Pigment Red 104, Pigment Red 108, Pigment Red 265, Pigment Violet 15, Pigment Blue 28/36, Pigment Blue 29, Pigment Green 17, and Pigment Green 26/50. A combination comprising at least one of the foregoing pigments can be used.

Exemplary dyes are generally organic materials and include coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly($C_{2-8}$)olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1, 3,4-oxadiazole; 2,5-bis-(4-biphenylyl)-oxazole; 2,2'-dimethyl-p-quaterphenyl; 2,2-dimethyl-p-terphenyl; 3,5,3"", 5""-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene, chrysene, rubrene, coronene, or the like; or combinations comprising at least one of the foregoing dyes. Dyes can be used in amounts of 0.001 to 5 PHR.

It has been found that the compositions can have good smoke density and heat release properties irrespective of the colorants used. Thus compositions comprising a range of colorants can be suitable for EN-45545 class R6 (or R1 applications provided CFE values are above 20 kW/m$^2$) HL-2 or HL-3 applications. For example, a railway component manufactured from the composition can have a practical range of colors such as grey, opaque blue, natural, black and orange, which are typically employed in rail applications while at the same time, meet the requirements for EN-45545 class R6 (or R1 applications provided CFE values are above 20 kW/m$^2$) HL-2 or HL-3 applications. In a specific embodiment, the composition can comprise colorants such as coated or uncoated titanium dioxide, pigment blue 29, solvent blue 104, pigment green 7, solvent red 52, and disperse orange 47.

The use of pigments such as titanium dioxide produces white compositions, which are commercially desirable. Pigments such as titanium dioxide (or other mineral fillers) can be present in the thermoplastic compositions in amounts of 0 to 12 PHR, 0.00002 to 9 PHR, 0.1 to 9 PHR, 0.0002 to 5, 0.5 to 5 PHR, 0.0002 to 3, or 0.5 to 3 PHR.

Compositions used to form light-diffusive articles, for example light-diffusive train components, can further comprise a light diffuser additive, i.e., a plurality of light-diffusive particles to provide the light-diffusive effect. Such particles are generally insoluble in the polymers of the thermoplastic compositions. Light-diffuser additives include silicone particles, e.g., polymethylsilsesquioxanes available from GE Silicones under the trade name Tospearl*, cross-linked poly(methyl methacrylate) (PMMA) and other organic polymer particles, e.g., methyl methacrylate/ethyleneglycol dimethacrylate copolymers available from Sekisui Plastics Co. under the trade name TECHPOLYMER MBS*, and low levels of TiO$_2$. A combination comprising at least one of the foregoing types of light diffuser additives can be used. Such diffuser particles can be added to high clarity or medium clarity compositions to provide light-diffusive compositions, for example in an amount of 0.05 to 10.0 wt. %, 0.2 to 8 wt. %, 0.5 to 6 wt. %, or 0.5 to 5 wt. % of the light diffuser additives, based on the total weight of the polymers in the in the thermoplastic compositions. In general, greater amounts of light diffuser additive is used in the manufacture of thinner articles to obtain the same degree of light diffusion. In an embodiment the light diffuser additives are silicone particles. The light diffuser additives can also be PMMA. Likewise, the light diffuser additives can be a combination of silicone particles and PMMA particles.

Exemplary antioxidant additives include organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite; alkylated monophenols or polyphenols; alkylated reaction products of polyphenols with dienes, such as tetrakis[methylene(3,5-di-tert-butyl-4-hydroxyhydrocinnamate)]methane; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl) propionate; amides of beta-(3,5-di-tert-butyl-4-hydroxyphenyl)-propionic acid, or combinations comprising at least one of the foregoing antioxidants. Antioxidants are used in amounts of 0.01 to 0.1 PHR.

Exemplary heat stabilizer additives include organophosphites such as triphenyl phosphite, tris-(2,6-dimethylphenyl) phosphite, and tris-(mixed mono- and di-nonylphenyl)phosphite; phosphonates such as dimethylbenzene phosphonate, phosphates such as trimethyl phosphate; or combinations comprising at least one of the foregoing heat stabilizers. Heat stabilizers are used in amounts of 0.01 to 0.1 PHR.

Light stabilizers and/or ultraviolet light (UV) absorbing additives (also referred to as "ultraviolet light absorber") can also be used. Exemplary light stabilizer additives include benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or combinations comprising at least one of the foregoing light stabilizers. Light stabilizers are used in amounts of 0.01 to 5 PHR.

Exemplary UV absorbing additives include hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB® 5411); 2-hydroxy-4-n-octyloxybenzophenone (CYASORB® 531); 2-[4,6-bis(2,4-dimethylphenyl)-1,3,5-triazin-2-yl]-5-(octyloxy)-phenol (CYASORB® 1164); 2,2'-(1,4-phenylene)bis(4H-3,1-benzoxazin-4-one) (CYASORB® UV-3638); 1,3-bis[(2-cyano-3,3-diphenylacryloyl) oxy]-2,2-bis[[(2-cyano-3,3-diphenylacryloyl)oxy]methyl] propane (UVINUL® 3030); 2,2'-(1,4-phenylene)bis(4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with particle size less than or equal to 100 nanometers; or combinations comprising at least one of the foregoing UV absorbers. In a specific embodiment, the UV absorbing additive is selected from 2,2'-(1,4-phenylene)bis-2,2'-(1,4-phenylene)bis(4H-3,1-benzoxazin-4-one); 2-(2'hydroxy-5-t-octylphenyl)-benzotriazole; 2-(2H-benzotriazol-2-yl)4,6-bis(1-ethyl-1-phenylethylphenol; or a combination comprising at least one of the forgoing. UV absorbers are used in amounts of 0.01 to 5 PHR.

Plasticizers, lubricants, and/or mold release agents can also be used. There is considerable overlap among these types of materials, which include phthalic acid esters such as dioctyl-4,5-epoxy-hexahydrophthalate; tris-(octoxycarbonylethyl)isocyanurate; tristearin; poly-alpha-olefins; epoxidized soybean oil; silicones, including silicone oils; esters, for example, fatty acid esters such as alkyl stearyl esters, e.g., methyl stearate, stearyl stearate, pentaerythritol tetrastearate, and the like; combinations of methyl stearate and hydrophilic and hydrophobic nonionic surfactants comprising polyethylene glycol polymers, polypropylene glycol polymers, poly(ethylene glycol-co-propylene glycol) copolymers, or a combination comprising at least one of the foregoing glycol polymers, e.g., methyl stearate and polyethylene-polypropylene glycol copolymer in a solvent; waxes such as beeswax, montan wax, and paraffin wax. Such materials are used in amounts of 0.1 to 1 PHR.

Flame retardant salts are not needed to obtain the desired low smoke and low heat release properties. Examples of flame retardant salts include of $C_{1-16}$ alkyl sulfonate salts such as potassium perfluorobutane sulfonate (Rimar salt), potassium perfluorooctane sulfonate, tetraethylammonium perfluorohexane sulfonate, and potassium diphenylsulfone sulfonate (KSS); salts such as $Na_2CO_3$, $K_2CO_3$, $MgCO_3$, $CaCO_3$, and $BaCO_3$, phosphate salts, or fluoro-anion complexes such as $Li_3AlF_6$, $BaSiF_6$, $KBF_4$, $K_3AlF_6$, $KAlF_4$, $K_2SiF_6$, and/or $Na_3AlF_6$. In an embodiment, no flame retardant salts are present. When present, flame retardant salts are present in amounts of 0.01 to 10 PHR, more specifically 0.02 to 1 PHR.

Organic flame retardants can be present, for example organic compounds that include phosphorus, nitrogen, bromine, and/or chlorine. However, halogenated flame retardants are generally avoided, such that the thermoplastic composition can be essentially free of chlorine and bromine. "Essentially free of chlorine and bromine" as used herein means having a bromine and/or chlorine content of less than or equal to 100 parts per million by weight (ppm), less than or equal to 75 ppm, or less than or equal to 50 ppm, based on the total parts by weight of the composition, excluding any filler.

In certain embodiments the thermoplastic compositions can further comprise an organophosphorus flame retardant in an amount effective to provide 0.1 to 1.0 wt. % phosphorus, based on the weight of the composition. For example, the organophosphorus compound, specifically BPADP or RDP can be present in an amount of 2 to 10 wt. %, which is effective to provide 0.1 to 1.0 wt. % phosphorus based on the total weight of the composition. Organophosphorus compounds include aromatic organophosphorus compounds having at least one organic aromatic group and at least one phosphorus-containing group, as well as organic compounds having at least one phosphorus-nitrogen bond.

In the aromatic organophosphorus compounds that have at least one organic aromatic group, the aromatic group can be a substituted or unsubstituted $C_{3-30}$ group containing one or more of a monocyclic or polycyclic aromatic moiety (which can optionally contain with up to three heteroatoms (N, O, P, S, or Si)) and optionally further containing one or more nonaromatic moieties, for example alkyl, alkenyl, alkynyl, or cycloalkyl. The aromatic moiety of the aromatic group can be directly bonded to the phosphorus-containing group, or bonded via another moiety, for example an alkylene group. The aromatic moiety of the aromatic group can be directly bonded to the phosphorus-containing group, or bonded via another moiety, for example an alkylene group. In an embodiment the aromatic group is the same as an aromatic group of the polycarbonate backbone, such as a bisphenol group (e.g., bisphenol-A), a monoarylene group (e.g., a 1,3-phenylene or a 1,4-phenylene), or a combination comprising at least one of the foregoing.

The phosphorus-containing group can be a phosphate ($P(=O)(OR)_3$), phosphite ($P(OR)_3$), phosphonate ($RP(=O)(OR)_2$), phosphinate ($R_2P(=O)(OR)$), phosphine oxide ($R_3P(=O)$), or phosphine ($R_3P$), wherein each R in the foregoing phosphorus-containing groups can be the same or different, provided that at least one R is an aromatic group. A combination of different phosphorus-containing groups can be used. The aromatic group can be directly or indirectly bonded to the phosphorus, or to an oxygen of the phosphorus-containing group (i.e., an ester).

In an embodiment the aromatic organophosphorus compound is a monomeric phosphate. Representative monomeric aromatic phosphates are of the formula $(GO)_3P=O$, wherein each G is independently an alkyl, cycloalkyl, aryl, alkylarylene, or arylalkylene group having up to 30 carbon atoms, provided that at least one G is an aromatic group. Two of the G groups can be joined together to provide a cyclic group. In some embodiments G corresponds to a monomer used to form the polycarbonate, e.g., resorcinol. Exemplary phosphates include phenyl bis(dodecyl)phosphate, phenyl bis(neopentyl)phosphate, phenyl bis(3,5,5'-trimethylhexyl)phosphate, ethyl diphenyl phosphate, 2-ethylhexyl di(p-tolyl)phosphate, bis(2-ethylhexyl)p-tolyl phosphate, tritolyl phosphate, bis(2-ethylhexyl)phenyl phosphate, tri(nonylphenyl)phosphate, bis(dodecyl)p-tolyl phosphate, dibutyl phenyl phosphate, 2-chloroethyl diphenyl phosphate, p-tolyl bis(2,5,5'-trimethylhexyl)phosphate, 2-ethylhexyl diphenyl phosphate, and the like. A specific aromatic phosphate is one in which each G is aromatic, for example, triphenyl phosphate, tricresyl phosphate, isopropylated triphenyl phosphate, and the like.

Di- or polyfunctional aromatic phosphorus-containing compounds are also useful, for example, compounds of formula (14)

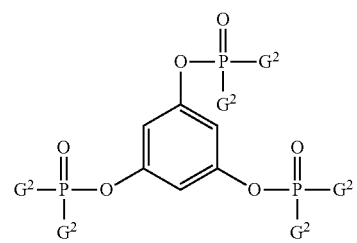

(14)

wherein each $G^2$ is independently a hydrocarbon or hydrocarbonoxy having 1 to 30 carbon atoms. In some embodiments G corresponds to a monomer used to form the polycarbonate, e.g., resorcinol.

Specific aromatic organophosphorus compounds have two or more phosphorus-containing groups, and are inclusive of acid esters of formula (15)

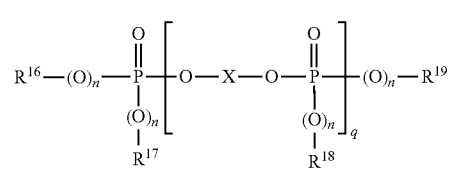

(15)

wherein $R^{16}$, $R^{17}$, $R^{18}$, and $R^{19}$ are each independently $C_{1-8}$ alkyl, $C_{5-6}$ cycloalkyl, $C_{6-20}$ aryl, or $C_{7-12}$ arylalkylene, each optionally substituted by $C_{1-12}$ alkyl, specifically by $C_{1-4}$ alkyl and X is a mono- or poly-nuclear aromatic $C_{6-30}$ moiety or a linear or branched $C_{2-30}$ aliphatic radical, which can be OH-substituted and can contain up to 8 ether bonds, provided that at least one of $R^{16}$, $R^{17}$, $R^{18}$, $R^{19}$, and X is an aromatic group. In some embodiments $R^{16}$, $R^{17}R^{18}$, and $R^{19}$ are each independently $C_{1-4}$ alkyl, naphthyl, phenyl($C_{1-4}$) alkylene, or aryl groups optionally substituted by $C_{1-4}$ alkyl. Specific aryl moieties are cresyl, phenyl, xylenyl, propylphenyl, or butylphenyl. In some embodiments X in formula (15) is a mono- or poly-nuclear aromatic $C_{6-30}$ moiety derived from a diphenol. Further in formula (15), n is each independently 0 or 1; in some embodiments n is equal to 1. Also in formula (15), q is from 0.5 to 30, from 0.8 to 15, from 1 to 5, or from 1 to 2. Specifically, X can be represented by the following divalent groups (16), or a combination comprising one or more of these divalent groups.

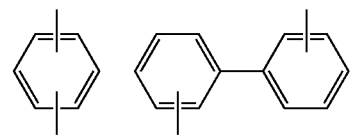

(16)

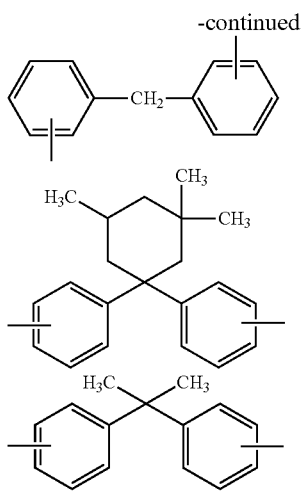

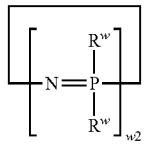

(19)

In these embodiments, each of $R^{16}$, $R^{17}$, $R^{18}$, and $R^{19}$ can be aromatic, i.e., phenyl, n is 1, and p is 1-5, specifically 1-2. In some embodiments at least one of $R^{16}$, $R^{17}$, $R^{18}$, $R^{19}$, and X corresponds to a monomer used to form the polycarbonate, e.g., bisphenol-A or resorcinol. In another embodiment, X is derived especially from resorcinol, hydroquinone, bisphenol-A, or diphenylphenol, and $R^{16}$, $R^{17}$, $R^{18}$, $R^{19}$, is aromatic, specifically phenyl. A specific aromatic organophosphorus compound of this type is resorcinol bis(diphenyl phosphate), also known as RDP. Another specific class of aromatic organophosphorus compounds having two or more phosphorus-containing groups are compounds of formula (17)

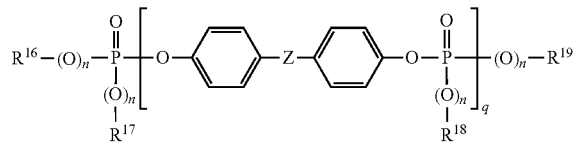

(17)

wherein $R^{16}$, $R^{17}$, $R^{18}$, $R^{19}$, n, and q are as defined for formula (19) and wherein Z is $C_{1-7}$ alkylidene, $C_{1-7}$ alkylene, $C_{5-12}$ cycloalkylidene, —O—, —S—, —SO₂—, or —CO—, specifically isopropylidene. A specific aromatic organophosphorus compound of this type is bisphenol-A bis(diphenyl phosphate), also known as BPADP, wherein $R^{16}$, $R^{17}$, $R^{18}$, and $R^{19}$ are each phenyl, each n is 1, and q is from 1 to 5, from 1 to 2, or 1.

Organophosphorus compounds containing at least one phosphorus-nitrogen bond includes phosphazenes, phosphorus ester amides, phosphoric acid amides, phosphonic acid amides, phosphinic acid amides, and tris(aziridinyl)phosphine oxide. Phosphazenes (18) and cyclic phosphazenes (19)

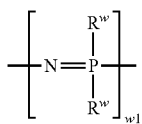

(18)

in particular can used, wherein w1 is 3 to 10,000 and w2 is 3 to 25, specifically 3 to 7, and each $R^w$ is independently a $C_{1-12}$ alkyl, alkenyl, alkoxy, aryl, aryloxy, or polyoxyalkylene group. In the foregoing groups at least one hydrogen atom of these groups can be substituted with a group having an N, S, O, or F atom, or an amino group. For example, each $R^w$ can be a substituted or unsubstituted phenoxy, an amino, or a polyoxyalkylene group. Any given $R^w$ can further be a crosslink to another phosphazene group. Exemplary crosslinks include bisphenol groups, for example bisphenol A groups. Examples include phenoxy cyclotriphosphazene, octaphenoxy cyclotetraphosphazene decaphenoxy cyclopentaphosphazene, and the like. A combination of different phosphazenes can be used. A number of phosphazenes and their synthesis are described in H. R. Allcook, "Phosphorus-Nitrogen Compounds" Academic Press (1972), and J. E. Mark et al., "Inorganic Polymers" Prentice-Hall International, Inc. (1992).

Accordingly, depending on the particular organophosphorus compound used, the thermoplastic compositions can comprise from 0 to 12 wt. %, 2 to 12 wt. %, 3.5 to 10 wt. %, or 5 to 8 wt. % of the organophosphorus flame retardant, each based on the total weight of the composition. Specifically, the organophosphorus compounds can be bisphenol A bis(diphenyl phosphate), triphenyl phosphate, resorcinol bis (diphenyl phosphate), tricresyl phosphate, or a combination comprising at least one of the foregoing.

Anti-drip agents in most embodiments are not used in the thermoplastic compositions. Anti-drip agents include a fibril-forming or non-fibril forming fluoropolymer such as polytetrafluoroethylene (PTFE). The anti-drip agent can be encapsulated by a rigid copolymer, for example styrene-acrylonitrile copolymer (SAN). PTFE encapsulated in SAN is known as TSAN. Antidrip agents are substantially absent or completely absent from the thermoplastic compositions in some embodiments.

Methods for forming the thermoplastic compositions can vary. In an embodiment, the polymers are combined (e.g., blended) with any additives (e.g., a mold release agent) such as in a screw-type extruder. The polymers any additives can be combined in any order, and in form, for example, powder, granular, filamentous, as a masterbatch, and the like. The thermoplastic compositions can be foamed, extruded into a sheet, or optionally pelletized. Methods of foaming a thermoplastic composition using frothing or physical or chemical blowing agents are known and can be used. The pellets can be used for molding into articles, foaming, or they can be used in forming a sheet of the flame retardant thermoplastic composition. In some embodiments, the composition can be extruded (or co-extruded with a coating or other layer) in the form of a sheet and/or can be processed through calendaring rolls to form the desired sheet.

As discussed above, the thermoplastic compositions are formulated to meet strict low smoke density requirements. The relative amounts of polycarbonate copolymer and polyetherimide in the thermoplastic compositions depends on the particular copolymer and polyetherimide used, the targeted level of smoke density and heat release, and other desired properties of the thermoplastic composition, such as impact strength and flow. In an embodiment, the polyetherimide is present in an amount from 5 to 30 wt. %, based on the total weight of the thermoplastic composition, and within this range the specific amount is selected to be effective to provide a smoke density (Ds-4) of less than 150, less than 135, less than 120, less than 100, or less than 80 measured according to ISO 5659-2 on a 3 mm thick plaque at 50 kW/m$^2$. These values can be obtained in articles having a wide range of thicknesses, for example from 0.1 to 10 mm, or 0.5 to 5 mm.

The thermoplastic compositions can further have a maximum average rate of heat emission (MAHRE) of 90 kW/m$^2$ or less, 75 kW/m$^2$ or less, or 60 kW/m$^2$ or less as measured according to ISO 5660-1 on a 3 mm thick plaque at 50 kW/m$^2$.

Use of the PEI can lower smoke density (Ds-4) to the desired levels. For ITR-PC-siloxane copolymers such as (ITR ester)-co-(bisphenol-A carbonate)-co-polydimethyl-siloxane)carbonate copolymers and ITR-PC copolymers such as (ITR ester)-co-(bisphenol-A carbonate) copolymers with good inherent smoke and heat release properties, a combination with 5 to 30 wt. % of the polyetherimide lowers the smoke density (Ds-4), as measured according to ISO 5659-2 on a 3 mm thick plaque at 50 kW/m$^2$, even further so that more stringent fire requirements can be met, more specifically Hazard Level 3 requirements for R6 applications in the EN45545 norm (for R1, and R6 applications qualifying for HL3 compliance, a smoke density (Ds-4) at or below 150 is required at 50 kW/m$^2$), provided that the other required properties (e.g. heat release and/or flame spread) meet the selection criteria as well.

Thus, in some embodiments the compositions can have a smoke density (Ds-4) of 150 or less as measured according to ISO 5659-2 on a 3 mm thick plaque at 50 kW/m$^2$. In a specific embodiment, a thermoplastic composition comprising ITR-PC, ITR-PC-siloxane or their combination has a smoke density (Ds-4) of 150 or less as measured according to ISO 5659-2 at 50 kW/m$^2$ and maximum heat release rate (MAHRE) of 90 kW/m$^2$ or less as measured according to ISO 5660-1 at 50 kW/m$^2$, both on a 3 mm thick plaque. These values can be obtained in articles having a wide range of thicknesses, for example from 0.1 to 10 mm, or 0.5 to 5 mm. These low smoke density and heat release values are obtained using a combination of an ITR-PC and an ITR-PC-siloxane in a weight ratio of 10:90 to 90:10, specifically 20:80 to 80:20. In an embodiment the ITR-PC comprises ITR and bisphenol-A carbonate units as described above, and the ITR-PC-siloxane comprises ITR ester units, bisphenol-A carbonate units, and siloxane units (9b-2), (9b-3), (9b-3) or a combination comprising at least one of the foregoing as described above (specifically of formula 9b-2). The compositions can further comprise an aromatic organophosphorus compound, e.g., RDP, BPADP, or a combination comprising at least one of the foregoing aromatic organophosphorus compounds.

Thus, in some embodiments the compositions can have a MAHRE of 90 kW/m$^2$ or less as measured according to ISO 5660-1 on a 3 mm thick plaque at 50 kW/m$^2$ and a Ds-4 smoke density of 150 or less as measured according to ISO 5659-2 on a 3 mm thick plaque at 50 kW/m$^2$, resulting in R6 applications in compliance with Hazard Level 2 rating for the EN45545 (2013) standard; a MAHRE of 60 kW/m$^2$ or less as measured according to ISO 5660-1 on a 3 mm thick plaque at 50 kW/m$^2$ and a Ds-4 smoke density of 150 or less as measured according to ISO 5659-2 on a 3 mm thick plaque at 50 kW/m$^2$, resulting in R6 applications in compliance with Hazard Level 3 rating for the EN45545 (2013) norm. For example, these values can be obtained when the poly(carbonate-arylate) is an ITR-PC comprising bisphenol-A carbonate units and ITR ester units, or an ITR-PC-siloxane comprising bisphenol-A carbonate units, ITR ester units, and siloxane units (9b-2), (9b-3), (9b-4) or a combination comprising at least one of the foregoing as described above (specifically of formula 9b-2), and optionally, an aromatic organophosphorus compound, e.g., RDP, BPADP, or a combination comprising at least one of the foregoing aromatic organophosphorus compounds. These values can be obtained in articles having a wide range of thicknesses, for example from 0.1 to 10 mm, or 0.5 to 5 mm.

The compositions can also have a critical heat flux at extinguishment (CFE) at or above 20 kW/m$^2$, at or above 22 kW/m$^2$, at or above 24 kW/m$^2$, or at or above 26 kW/m$^2$ determined in accordance to ISO 5658-2 on a 3 mm thick plaque.

Thus, in some embodiments the compositions can have a MAHRE of 90 kW/m$^2$ or less as measured according to ISO 5660-1 on a 3 mm thick plaque at 50 kW/m$^2$, a Ds-4 smoke density of 150 or less as measured according to ISO 5659-2 on a 3 mm thick plaque at 50 kW/m$^2$, and a critical heat flux at extinguishment (CFE) at or above 20 kW/m$^2$ determined in accordance to ISO 5658-2 on a 3 mm thick plaque, resulting in R1 applications in compliance with Hazard Level 2 rating for the EN45545 (2013) standard; a MAHRE of 60 kW/m$^2$ or less as measured according to ISO 5660-1 on a 3 mm thick plaque at 50 kW/m$^2$, a Ds-4 smoke density of 150 or less as measured according to ISO 5659-2 on a 3 mm thick plaque at 50 kW/m$^2$, and a critical heat flux at extinguishment (CFE) at or above 20 kW/m$^2$ determined in accordance to ISO 5658-2 on a 3 mm thick plaque resulting in R1 applications in compliance with Hazard Level 3 rating for the EN45545 (2013) norm. For example, these values can be obtained when the poly(carbonate-arylate) is an ITR-PC comprising bisphenol-A carbonate units and ITR ester units, or an ITR-PC-siloxane comprising bisphenol-A carbonate units, ITR ester units, and siloxane units (9b-2), (9b-3), (9b-4) or a combination comprising at least one of the foregoing as described above (specifically 9b-2), and an aromatic organophosphorus compound, e.g., RDP, BPADP, or a combination comprising at least one of the foregoing aromatic organophosphorus compounds. These values can be obtained in articles having a wide range of thicknesses, for example from 0.1 to 10 mm, or 0.5 to 5 mm.

The thermoplastic compositions can be formulated to have lower densities, in particular a density of 1.35 g/cc or less, 1.34 g/cc or less, 1.33 g/cc or less, 1.32 g/cc or less, 1.31 g/cc or less, 1.30 g/cc or less, or 1.29 g/cc or less. The same or similar values can be obtained in components having a wide range of thicknesses, for example from 0.1 to 10 mm, or 0.5 to 5 mm.

The thermoplastic compositions can further have good melt viscosities, which aid processing. The thermoplastic compositions can have a melt volume flow rate (MVR, cubic centimeter per 10 minutes (cc/10 min) measured according to of 4 to about 30, greater than or equal to 5, greater than or equal to 6, greater than or equal to 7, greater than or equal to 8, greater than or equal to 9, greater than or equal to 10, greater than or equal to 12, greater than or equal to 14 or greater than or equal to 16 cc/min, measured at 300° C./1.2 Kg at 360 second dwell according to ISO 1133. The same or similar values can be obtained in articles having a wide range of thicknesses, for example from 0.1 to 10 mm, or 0.5 to 5 mm.

The thermoplastic compositions can further have excellent impact properties, in particular multiaxial impact (MAI) and ductility. The compositions can have an MAI equal to or higher than 100 J, determined at 23° C. at an impact speed of 4.4 m/second in accordance with ISO 6603 on discs with a thickness of 3.2 mm. The compositions can have a ductility in multiaxial impact of 80% and higher, determined at 23° C. at an impact speed of 4.4 m/second in accordance with ISO 6603 on discs with a thickness of 3.2 mm. These values can be obtained in articles having a wide range of thicknesses, for example from 0.1 to 10 mm, or 0.5 to 5 mm.

As noted above the present discovery allows the manufacture of compositions have very low smoke densities (Ds-4), as measured according to ISO5659-2 on a 3 mm thick plaque at 50 kW/m$^2$ and low heat release (MAHRE) as measured according to ISO5660-1 on a 3 mm thick plaque at 50 kW/m$^2$, while maintaining the advantageous properties of polycarbonates. Thus, thermoplastic compositions having practical impact properties within 20%, within 10%, within 5%, or within 1% of the same compositions without the polyetherimides can be manufactured. For example, the thermoplastic compositions can have an MAI within 20%, within 10%, within 5%, or within 1% of the MAI of the same composition, each determined at 23° C. at an impact speed of 4.4 m/second in accordance with ISO 6603 on discs with a thickness of 3.2 mm. The white or almost-white color of the polycarbonates can further be maintained.

Railway components, in particular seat components and claddings for train interiors that are molded or extruded from the thermoplastic compositions are also provided. Molding can be by a variety of means such as injection molding, rotational molding, blow molding, and the like. In an embodiment, the molding is by injection molding. As used herein, "claddings" means components that provide a surface of an article. Illustrative claddings include, for example, interior vertical surfaces, such as side walls, front walls, end-walls, partitions, room dividers, flaps, boxes, hoods and louvres; interior doors and linings for internal and external doors; window insulations, kitchen interior surfaces, interior horizontal surfaces, such as ceiling paneling, flaps, boxes, hoods and louvres; luggage storage areas, such as overhead and vertical luggage racks, luggage containers and compartments; driver's desk applications, such as paneling and surfaces of driver's desk; interior surfaces of gangways, such as interior sides of gangway membranes (bellows) and interior linings; window frames (including sealants and gaskets); (folding) tables with downward facing surface; interior and exterior surface of air ducts, and devices for passenger information (such as information display screens) and the like. In a specific embodiment, the claddings include, for example, a side wall, a front wall, an end-walls, a partition, a room divider, an interior door, a window insulation, a lining, a kitchen interior surface, a ceiling panel, an overhead or vertical luggage rack, a luggage container, a luggage compartment, a window frame, a (folding) table with downward facing surface, or an information display screen.

In an embodiment, the seat components and claddings meet certain criteria set forth in European Railway standard EN-45545 (2013). The European Union has approved the introduction of a set of fire testing standards for the railroad industry that prescribes certain flammability, flame spread rate, heat release, smoke emission, and smoke toxicity requirements for materials used in railway vehicles, known as European Railway standard EN-45545 (2013). Based on the vehicle material, end-use, and fire risks, 26 different "Requirement" categories for materials have been established (R1-R26). Seat components for example, both back and base shells, fall under the R6 application type. The R1 application type covers, amongst others, interior vertical surfaces, side walls, front walls, end-walls, partitions, room dividers, flaps, boxes, hoods and louvres; interior doors and linings for internal and external doors; window insulations, kitchen interior surfaces, interior horizontal surfaces, such as ceiling paneling, flaps, boxes, hoods and louvres; luggage storage areas, such as overhead and vertical luggage racks, luggage containers and compartments; driver's desk applications, such as paneling and surfaces of driver's desk; interior surfaces of gangways, such as interior sides of gangway membranes (bellows) and interior linings; window frames (including sealants and gaskets); (folding) tables with downward facing surface; interior and exterior surface of air ducts, and devices for passenger information (such as information display screens) and the like.

"Hazard Levels" (HL1 to HL3) have been designated, reflecting the degree of probability of personal injury as the result of a fire. The levels are based on dwell time and are related to operation and design categories. HL1 is the lowest hazard level and is typically applicable to vehicles that run under relatively safe conditions (easy evacuation of the vehicle). HL3 is the highest hazard level and represents most dangerous operation/design categories (difficult and/or time-consuming evacuation of the vehicle, e.g. in underground rail cars). For each application type, different test requirements for the hazard levels are defined. The testing methods, and smoke density (Ds-4) and maximum heat release (MAHRE) values for the various hazard levels in the European Railway standard EN-45545 (2013) are shown in Table 1A for R6 applications.

TABLE 1A

European Railways Standard EN 45545 for R6 applications

| Hazard Level | Smoke Density, DS-4 ISO 5659-2, at 50 kW/m$^2$ | Heat release, MAHRE (kW/m$^2$) ISO 5660-1, at 50 kW/m$^2$ |
| --- | --- | --- |
| HL1 | ≤600 | — |
| HL2 | ≤300 | ≤90 |
| HL3 | ≤150 | ≤60 |

The testing methods, and smoke density, maximum heat release rate values and critical heat flux at extinguishment for the various hazard levels in the European Railway standard EN-45545 (2013) are shown in Table 1B for R1 applications.

TABLE 1B

European Railways Standard EN 45545 for R1 applications

| Hazard Level | Smoke Density, DS-4 ISO 5659-2, at 50 kW/m$^2$ | Heat release, MAHRE (kW/m$^2$) ISO 5660-1, at 50 kW/m$^2$ | Critical heat flux at extinguishment (CFE) [kW/m$^2$] ISO 5658-2 |
| --- | --- | --- | --- |
| HL1 | ≤600 | — | >20 |
| HL2 | ≤300 | ≤90 | >20 |
| HL3 | ≤150 | ≤60 | >20 |

Data in the Examples shows that the compositions herein can meet the requirements for HL2, and some compositions can meet the requirements for HL3 for both R1 and R6 applications.

While the compositions described herein are designed for use specifically in railway interiors, it is to be understood that the compositions are also useful in other interior components that are required to meet the test standards for HL2 or HL3, for both R1 and R6 applications. Interior bus components are specifically mentioned. Current discussions directed to increasing bus safety include proposals to apply the HL2 and HL3 standards to interior bus components. This invention accordingly includes interior bus components, including seat components and claddings as described above and comprising the specific compositions described herein, and particularly below, that meet the tests specified in the HL2 or HL3 standards described above.

In an embodiment, provided herein is a railway component wherein the component is a seat component, and wherein the railway component is molded or formed from a thermoplastic polymer composition comprising 58 to 95 wt. % of a first polymer comprising bisphenol A carbonate units and monoaryl arylate units, or a second polymer comprising bisphenol A carbonate units, monoaryl arylate units, and siloxane units, or a combination comprising at least one of the foregoing polymers; 5 to 30 wt. % of a polyetherimide; and optionally an organophosphorus compound in an amount effective to provide 0.1 to 1.0 wt. % of phosphorus, based on the total weight of the thermoplastic polymer composition, and optionally, up to 5 wt. % of an additive selected from a processing aid, a heat stabilizer, an ultra violet light absorber, a colorant, or a combination comprising at least one of the foregoing, wherein an article having a thickness of 0.5 to 10 mm molded from the composition has a Ds-4 smoke density of less than or equal to 150 measured according to ISO 5659-2 on a 3 mm thick plaque at 50 kW/m$^2$, and a MAHRE of less than or equal to 90 kW/m$^2$ measured according to ISO 5660-1 on a 3 mm thick plaque at 50 kW/m$^2$, a multiaxial impact energy at or above 100 J and a ductility of 80 to 100%, measured at +23° C. at an impact speed of 4.4 m/second in accordance with ISO 6603 on 3.2 mm thick discs, and optionally, a melt volume flow rate of greater than 4 cc/10 min measured at 300° C. under 1.2 kg force measured according to measured according to ISO 1133.

Also disclosed herein is a railway component wherein the component is a seat component, and wherein the railway component is molded or formed from a thermoplastic polymer composition comprising, 58 to 95 wt. % of a first polymer comprising bisphenol A carbonate units and monoaryl arylate units, or a second polymer comprising bisphenol A carbonate units, monoaryl arylate units, and siloxane units, or a combination comprising at least one of the foregoing polymer; 5 to 30 wt. % of a polyetherimide; and an organophosphorus compound in an amount effective to provide 0.1 to 1.0 wt. % of phosphorus, based on the total weight of the thermoplastic polymer composition, and optionally, up to 5 wt. % of an additive selected from a processing aid, a heat stabilizer, an ultra violet light absorber, a colorant, or a combination comprising at least one of the foregoing, wherein an article having a thickness of 0.5 to 10 mm molded from the composition has a Ds-4 smoke density of less than or equal to 150 measured according to ISO 5659-2 on a 3 mm thick plaque at 50 kW/m$^2$, and a MAHRE of less than or equal to 60 kW/m$^2$ measured according to ISO 5660-1 on a 3 mm thick plaque at 50 kW/m$^2$, a multiaxial impact energy at or above 100 J and a ductility of 80 to 100%, measured at +23° C. at an impact speed of 4.4 m/second in accordance with ISO 6603 on 3.2 mm thick discs, and optionally, a melt volume flow rate of greater than 4 cc/10 min measured at 300° C. under 1.2 kg force measured according to measured according to ISO 1133.

Also described herein is a railway component wherein the component is an interior vertical surface, such as side walls, front walls, end-walls, partitions, room dividers, flaps, boxes, hoods and louvres; an interior door or lining for internal and external doors; a window insulation, a kitchen interior surface, an interior horizontal surface, such as ceiling paneling, flaps, boxes, hoods and louvres; a luggage storage area, such as overhead and vertical luggage racks, luggage containers and compartments; a driver's desk application, such as paneling and surfaces of driver's desk; an interior surface of gangways, such as interior sides of gangway membranes (bellows) and interior linings; a window frame (including sealants and gaskets); a (folding) table with downward facing surface; an interior or exterior surface of air ducts, or a device for passenger information, such as information display screens, and wherein the railway component is molded or formed from a thermoplastic polymer composition comprising, 58 to 95 wt. % of a first polymer comprising bisphenol A carbonate units and monoaryl arylate units, or a second polymer comprising bisphenol A carbonate units, monoaryl arylate units, and siloxane units, or a combination comprising at least one of the foregoing polymer; 5 to 30 wt. % of a polyetherimide; and optionally an organophosphorus compound in an amount effective to provide 0.1 to 1.0 wt. % of phosphorus, based on the total weight of the thermoplastic polymer composition, and optionally, up to 5 wt. % of an additive selected from a processing aid, a heat stabilizer, an ultra violet light absorber, a colorant, or a combination comprising at least one of the foregoing, wherein an article having a thickness of 0.5 to 10 mm molded from the composition has a Ds-4 smoke density of less than or equal to 150 measured according to ISO 5659-2 on a 3 mm thick plaque at 50 kW/m$^2$, and a MAHRE of less than or equal to 90 kW/m$^2$ measured according to ISO 5660-1 on a 3 mm thick plaque at 50 kW/m$^2$, a critical heat flux at extinguishment (CFE) of equal to or more than 20 kW/m$^2$ measured according to ISO 5658-2 at a 3 mm thick plaque, and a multiaxial impact energy at or above 100 J and a ductility of 80 to 100%, measured at +23° C. at an impact speed of 4.4 m/second in accordance with ISO 6603 on 3.2 mm thick discs, and optionally, a melt volume flow rate of greater than 4 cc/10 min measured at 300° C. under 1.2 kg force measured according to measured according to ISO 1133.

Also described herein is a railway component wherein the component is an interior vertical surface, such as side walls, front walls, end-walls, partitions, room dividers, flaps, boxes, hoods and louvres; an interior door or lining for internal and external doors; a window insulation, a kitchen interior surface, an interior horizontal surface, such as ceiling paneling, flaps, boxes, hoods and louvres; a luggage storage area, such as overhead and vertical luggage racks, luggage containers and compartments; a driver's desk application, such as paneling and surfaces of driver's desk; an interior surface of gangways, such as interior sides of gangway membranes (bellows) and interior linings; a window frame (including sealants and gaskets); a (folding) table with downward facing surface; an interior or exterior surface of air ducts, or a device for passenger information, such as information display screens, and wherein the railway component is molded or formed from a thermoplastic polymer composition comprising, 58 to 95 wt. % of a first polymer comprising bisphenol A carbonate units and monoaryl arylate units, or a second polymer comprising bisphenol A carbonate units, monoaryl arylate units, and siloxane units, or a combination comprising at least one of the foregoing polymer; 5 to 30 wt. % of a polyetherimide; and an organophosphorus compound in an amount effective to provide 0.1 to 1.0 wt. % of phosphorus, based on the total weight of the thermoplastic polymer composition, and optionally, up to 5 wt. % of an additive selected from a processing aid, a heat stabilizer, an ultra violet light absorber, a colorant, or a combination comprising at least one of the foregoing, wherein an article having a thickness of 0.5 to 10 mm molded from the composition has a Ds-4 smoke density of less than or equal to 150 measured according to ISO 5659-2 on a 3 mm thick plaque at 50 kW/m², and a MAHRE of less than or equal to 60 kW/m² measured according to ISO 5660-1 on a 3 mm thick plaque at 50 kW/m², a critical heat flux at extinguishment (CFE) of equal to or more than 20 kW/m² measured according to ISO 5658-2 at a 3 mm thick plaque, and a multiaxial impact energy at or above 100 J and a ductility of 80 to 100%, measured at +23° C. at an impact speed of 4.4 m/second in accordance with ISO 6603 on 3.2 mm thick discs, and optionally, a melt volume flow rate of greater than 4 cc/10 min measured at 300° C. under 1.2 kg force measured according to measured according to ISO 1133.

Also provided herein is a railway component wherein the component is a seat component; an interior vertical surface, such as side walls, front walls, end-walls, partitions, room dividers, flaps, boxes, hoods, and louvres; an interior door or lining for internal and external doors; a window insulation, a kitchen interior surface, an interior horizontal surface, such as ceiling paneling, flaps, boxes, hoods, and louvres; a luggage storage area, such as overhead and vertical luggage racks, luggage containers and compartments; a driver's desk application, such as paneling and surfaces of driver's desk; an interior surface of gangways, such as interior sides of gangway membranes (bellows) and interior linings; a window frame (including sealants and gaskets); a (folding) table with downward facing surface; an interior or exterior surface of air ducts, or a device for passenger information, such as information display screens, and wherein the railway component is molded or formed from a thermoplastic polymer composition comprising, based on the total weight of the composition, 58 to 95 wt. % of a first polymer comprising bisphenol A carbonate units and monoaryl arylate units, a second polymer comprising bisphenol A carbonate units, monoaryl arylate units, and siloxane units, or a combination comprising at least one of the foregoing polymer; 5 to 30 wt. % of a polyetherimide; optionally an aromatic organophosphorus compound such as BPADP or RDP in an amount effective to provide 0.1 to 1.0 wt. % of phosphorus; and optionally, up to 5 wt. % of an additive selected from a processing aid, a heat stabilizer, an ultra violet light absorber, a colorant, or a combination comprising at least one of the foregoing, wherein the thermoplastic composition optionally has a melt volume flow rate of greater than 4 cc/10 min measured at 300° C. under 1.2 kg force measured according to measured according to ISO 1133, and the railway component is injection molded, wherein the thermoplastic composition optionally has a Vicat B120 of less than 160° C. measured according to ISO 306, and the component is extruded, and wherein a sample of the thermoplastic composition has: a smoke density after 4 minutes (Ds-4) of equal to or less than 150 measured in accordance with ISO 5659-2 on a 3 mm thick plaque at 50 kW/m², an integral of the smoke density as a function of time up to 4 minutes (VOF4) of equal to or less than 300 measured in accordance with ISO 5659-2 on a 3 mm thick plaque at 50 kW/m², a maximum average heat release (MAHRE) of equal to or less than 90 kW/m² or equal to or less than 60 kW/m² measured in accordance with ISO 5660-1 on a 3 mm thick plaque at 50 kW/m², and a ductility in multiaxial impact of 80% to 100%, measured at 23° C. at an impact speed of 4.4 m/second in accordance with ISO 6603 on 3.2 mm thick discs, optionally a critical heat flux at extinguishment (CFE) of equal to or greater than 20 kW/m² measured in accordance with ISO 5658-2 on a 3 mm thick plaque.

In an embodiment, the second polymer is a poly(carbonate-arylate ester) that comprises 2 to 20 mol % of bisphenol-A carbonate units, 60 to 98 mol % of isophthalic acid-terephthalic acid-resorcinol ester units, optionally, 1 to 20 mol % of resorcinol carbonate units, isophthalic acid-terephthalic acid-bisphenol-A ester units, or a combination thereof.

In another embodiment, the poly(carbonate-arylate ester) comprises 1 to 40 mol % of bisphenol A carbonate units, 50 to 95 mol % of isophthalic acid-terephthalic acid-resorcinol units, and siloxane units in an amount effective to provide 0.1 to 10 wt. % of siloxane units, based on the weight of the second polymer is a poly(carbonate-arylate ester), wherein the siloxane units are of the formula

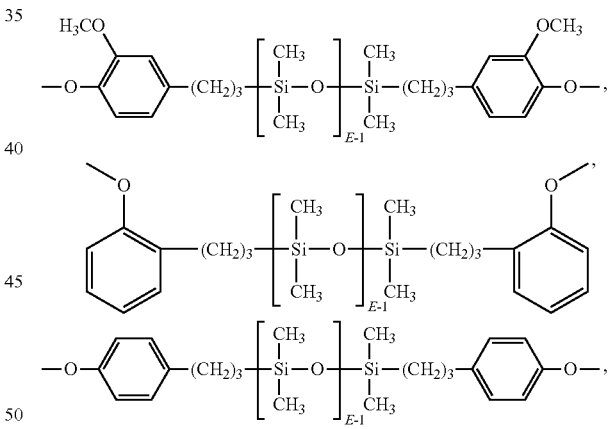

or a combination comprising at least one of the foregoing (specifically of formula 9b-2), wherein E has an average value of 2 to 90, 2 to 50, 2 to 30, or 2 to 20.

The poly(carbonate-arylate ester) can also comprise a combination comprising, based on the total weight of the poly(carbonate-arylate ester)s, 20 to 80 wt. % of a poly (bisphenol-A carbonate)-co-poly(isophthalate-terephthalate-resorcinol ester) comprising units of the formula

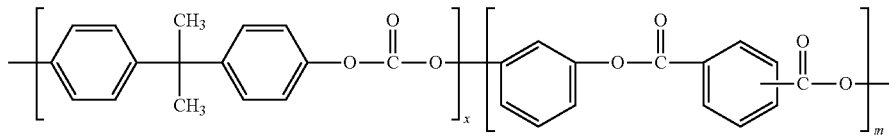

wherein m is 4 to 100, and the mole ratio of x:m is 99:1 to 1:99; and 20 to 80 wt. % of the poly(bisphenol-A carbonate)-co-poly(isophthalate-terephthalate-resorcinol ester)-co-poly(siloxane).

The polyetherimide can comprise units of the formula

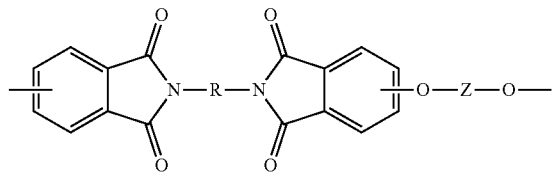

wherein R is a $C_{2-20}$ hydrocarbon group, and Z is an aromatic $C_{6-24}$ monocyclic or polycyclic group optionally substituted with 1 to 6 $C_{1-8}$ alkyl groups, 1 to 8 halogen atoms, or a combination thereof, wherein the divalent bonds of the —O—Z—O— group are in the 3,3', 3,4', 4,3', or the 4,4' positions, for example, R is m-phenylene and Z is 2,2-bis(1',4'-phenylene)isopropylidene.

In any of the foregoing embodiments, the organophosphorus compound can be an aromatic organophosphorus compound can have at least one organic aromatic group and at least one phosphorus-containing group, such as bisphenol A bis(diphenyl phosphate), triphenyl phosphate, resorcinol bis(diphenyl phosphate), tricresyl phosphate, a phenol/biphenol, polyphosphate, or a combination comprising at least one of the foregoing, or an organic compound having at least one phosphorus-nitrogen bond such as a phosphazene, phosphorus ester amide, phosphoric acid amide, phosphonic acid amide, phosphinic acid amide, tris(aziridinyl)phosphine oxide, or a combination comprising at least one of the foregoing; optionally, the composition comprises 0.05 to 10.0 wt. % of a light diffuser additive comprising silicone, polymethylsilsesquioxane, crosslinked poly(methyl methacrylate), methyl methacrylate/ethyleneglycol dimethacrylate copolymer, $TiO_2$, or a combination comprising at least one of the foregoing, based on the total weight of the polymers in the thermoplastic composition, or 0.00002 to 5.0 wt. % of one or more colorants based on the total weight of the polymers in the thermoplastic composition; or no or substantially no flame retarding brominated compounds, flame retardant salts, or a combination comprising at least one of the foregoing are present in the thermoplastic composition.

It is also possible for the compositions herein to contain 5 to 40 wt. % of a polyetherimide, and be suitable for use as a railway seat component or cladding.

Thus, in an embodiment, a railway component is a molded or extruded seat component, comprising a thermoplastic composition comprising, based on the total weight of the composition: 48 to 95 wt. % of a first polymer comprising bisphenol A carbonate units and monoaryl arylate units, or a second polymer comprising bisphenol A carbonate units, monoaryl arylate units, and siloxane units, or a combination comprising at least one of the foregoing polymers; 5 to 40 wt. % of a polyetherimide; and optionally 2 to 12 wt. % of an organophosphorus compound, in an amount effective to provide 0.1 to 1.0 wt. % of phosphorus, based on the total weight of the thermoplastic polymer composition, wherein the bisphenol A carbonate units are of the formula

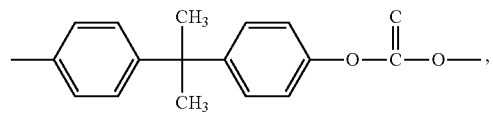

and
the monoaryl arylate units are of the formula formula wherein each $R^h$ is independently a halogen atom, a $C_{1-10}$ hydrocarbyl and n is 0 to 4; and the siloxane units are of the formula formula or a combination comprising at least one of the foregoing (specifically of formula 9b-2), wherein E has an average value of 2 to 90; wherein a sample of the thermoplastic composition has: a smoke density after 4 minutes (Ds-4) of equal to or less than 150 measured in accordance with ISO 5659-2 on a 3 mm thick plaque at 50 kW/m², an integral of the smoke density as a function of time up to 4 minutes (VOF4) of equal to or less than 300 measured in accordance with ISO 5659-2 on a 3 mm thick plaque at 50 kW/m², a maximum average heat release (MAHRE) of equal to or less than 90 kW/m² measured in accordance with ISO 5660-1 on a 3 mm thick plaque at 50 kW/m², and a ductility in multiaxial impact of 80% to 100%, measured at 23° C. at an impact speed of 4.4 m/second in accordance with ISO 6603 on 3.2 mm thick discs. In a specific embodiment, a sample of the thermoplastic composition has: a smoke density after 4 minutes (Ds-4) of equal to or less than 150 measured in accordance with ISO 5659-2 on a 3 mm thick plaque at 50 kW/m², an integral of the smoke density as a function of time up to 4 minutes (VOF4) of equal to or less than 300 measured in accordance with ISO 5659-2 on a 3 mm thick plaque at 50 kW/m², a maximum average heat release (MAHRE) of equal to or less than 60 kW/m² measured in accordance with ISO 5660-1 on a 3 mm thick plaque at 50 kW/m², and a ductility in multiaxial impact of 80% to 100%, measured at +23° C. at an impact speed of 4.4 m/second in accordance with ISO 6603 on 3.2 mm thick discs. Optionally, the seat component is injection molded, and the thermoplastic composition has a melt volume flow rate of equal to or greater than 4 cc/10 min measured at 300° C. under 1.2 kg force measured according to ISO 1133; or the seat component is extruded, and the thermoplastic composition has a Vicat B120 of less than 160° C. measured according to ISO 306.

In other specific embodiments of the foregoing seat component comprising 5 to 40 wt. % of a polyetherimide, one or more of the following conditions can apply: the first polymer can comprise: 2 to 20 mol % of bisphenol-A carbonate units, 60 to 98 mol % of isophthalic acid-terephthalic acid-resorcinol ester units of the formula

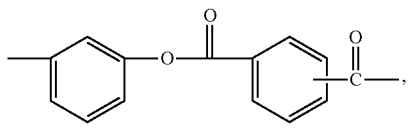

and optionally, 1 to 20 mol % resorcinol carbonate units of the formula

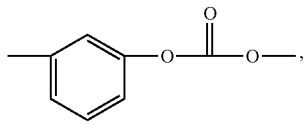

isophthalic acid-terephthalic acid-bisphenol-A ester units of the formula

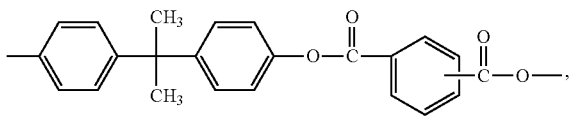

or a combination thereof, and specifically the first polymer can comprise units of the formula

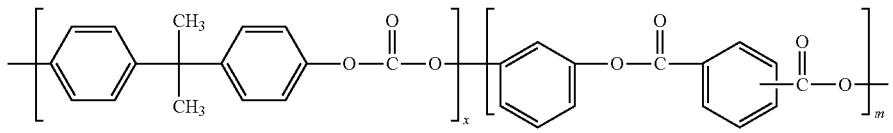

wherein m is 4 to 100, and the mole ratio of x:m is 99:1 to 1:99; the second polymer can comprises 1 to 40 mol % of the bisphenol A carbonate units, 50 to 95 mol % of the isophthalic acid-terephthalic acid-resorcinol units, and the siloxane units (9b-2), (9b-3), (9b-4), or a combination comprising at least one of the foregoing (specifically of formula 9b-2) in an amount effective to provide 0.1 to 10 wt. % of siloxane units, based on the weight of the second polymer, wherein E has an average value of 2 to 50; the polyetherimide can comprises units of the formula

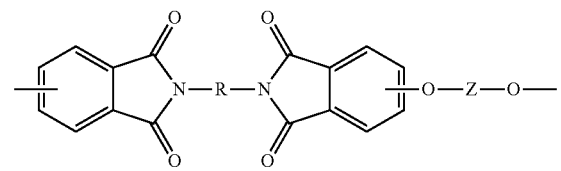

wherein R is a $C_{2-20}$ hydrocarbon group, and Z is an aromatic $C_{6-24}$ monocyclic or polycyclic group optionally substituted with 1 to 6 $C_{1-8}$ alkyl groups, 1 to 8 halogen atoms, or a combination thereof, wherein the divalent bonds of the —O—Z—O— group are in the 3,3', 3,4', 4,3', or the 4,4' positions, specifically wherein R is m-phenylene and Z is 2,2-bis(1',4'-phenylene)isopropylidene; the organophosphorus compound can be an aromatic organophosphorus compound can have at least one organic aromatic group and at least one phosphorus-containing group, such as bisphenol A bis(diphenyl phosphate), triphenyl phosphate, resorcinol bis(diphenyl phosphate), tricresyl phosphate, a phenol/biphenol polyphosphate, or a combination comprising at least one of the foregoing, or an organic compound having at least one phosphorus-nitrogen bond such as a phosphazene, phosphorus ester amide, phosphoric acid amide, phosphonic acid amide, phosphinic acid amide, tris(aziridinyl)phosphine oxide, or a combination comprising at least one of the foregoing; optionally, the composition comprises up to 5 wt. % of an additive selected from a processing aid, a heat stabilizer, an ultra violet light absorber, a colorant, or a combination comprising at least one of the foregoing, for example 0.05 to 10.0 wt. % of a light diffuser additive comprising silicone, polymethylsilsesquioxane, crosslinked poly(methyl methacrylate), methyl methacrylate/ethyleneglycol dimethacrylate copolymer, $TiO_2$, or a combination comprising at least one of the foregoing, based on the total weight of the polymers in the thermoplastic composition, or 0.00002 to 5.0 wt. % of one or more colorants based on the total weight of the polymers in the thermoplastic composition; or no or substantially no flame retarding brominated compounds, flame retardant salts, or a combination comprising at least one of the foregoing are present in the thermoplastic composition.

In other specific embodiments of the foregoing seat component comprising 5 to 40 wt. % of a polyetherimide, the thermoplastic composition can comprise 48 to 95 wt. % of a combination comprising, based on the weight of the combination, 20 to 80 wt. % of a poly(bisphenol-A carbonate)-co-poly(isophthalate-terephthalate-resorcinol ester) of the formula

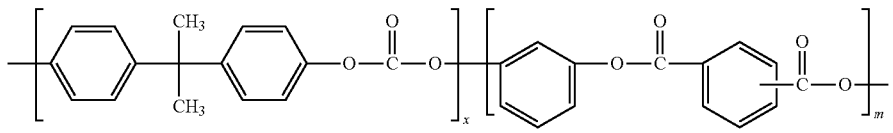

wherein m is 4 to 100, and the mole ratio of x:m is 99:1 to 1:99, and 20 to 80 wt. % of a poly(bisphenol-A carbonate)-co-poly(isophthalate-terephthalate-resorcinol ester)-co-poly(siloxane) comprising 1 to 40 mol % of the bisphenol A carbonate units, 50 to 95 mol % of the isophthalic acid-terephthalic acid-resorcinol units, and the siloxane units (9b-2), (9b-3), (9b-4), or a combination comprising at least one of the foregoing (specifically of formula 9b-2) in an amount effective to provide 0.1 to 10 wt. % of siloxane units, based on the weight of the polymer, wherein E has an average value of 2 to 30, based on the weight of the poly(bisphenol-A carbonate)-co-poly(isophthalate-terephthalate-resorcinol ester)-co-poly(siloxane); 5 to 40 wt. % of a polyetherimide comprising units of the formula

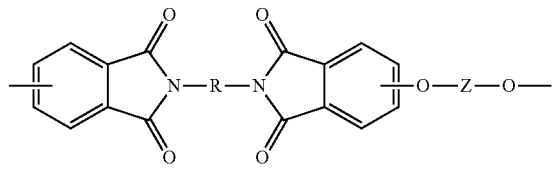

wherein R is m-phenylene and Z is 2,2-bis(1',4'-phenylene) isopropylidene; 0 to up to 12 wt. % of bisphenol A bis(diphenyl phosphate); and optionally, up to 5 wt. % of an additive selected from a processing aid, a heat stabilizer, an ultra violet light absorber, a colorant, or a combination comprising at least one of the foregoing; wherein a sample of the thermoplastic composition has: a smoke density after 4 minutes (Ds-4) of equal to or less than 150 measured in accordance with ISO 5659-2 on a 3 mm thick plaque at 50 kW/m$^2$, an integral of the smoke density as a function of time up to 4 minutes (VOF4) of equal to or less than 300 measured in accordance with ISO 5659-2 on a 3 mm thick plaque at 50 kW/m$^2$, a maximum average heat release (MAHRE) of equal to or less than 90 kW/m$^2$ measured in accordance with ISO 5660-1 on a 3 mm thick plaque at 50 kW/m$^2$, and a ductility in multiaxial impact of 80% to 100%, measured at 23° C. at an impact speed of 4.4 m/second in accordance with ISO 6603 on 3.2 mm thick discs; or the thermoplastic composition can comprise based on the weight of the thermoplastic composition, 48 to 93 wt. % of a combination comprising, based on the weight of the combination, 20 to 80 wt. % of a poly(bisphenol-A carbonate)-co-poly(isophthalate-terephthalate-resorcinol ester) of the formula wherein m is 4 to 100, and the mole ratio of x:m is 99:1 to 1:99, and 20 to 80 wt. % of a poly(bisphenol-A carbonate)-co-poly(isophthalate-terephthalate-resorcinol ester)-co-poly(siloxane) comprising, 1 to 40 mol % of the bisphenol A carbonate units, 50 to 95 mol % of the isophthalic acid-terephthalic acid-resorcinol units, and the siloxane units (9b-2), (9b-3), (9b-4), or a combination comprising at least one of the foregoing (specifically of formula 9b-2) in an amount effective to provide 0.1 to 10 wt. % of siloxane units, based on the weight of the polymer, wherein E has an average value of 2 to 30, based on the weight of the poly(bisphenol-A carbonate)-co-poly(isophthalate-terephthalate-resorcinol ester)-co-poly(siloxane); 5 to 40 wt. % of a polyetherimide comprising units of the formula

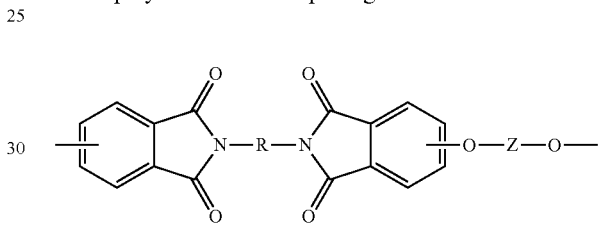

wherein R is m-phenylene and Z is 2,2-bis(1',4'-phenylene) isopropylidene; 2 to up to 12 wt. % of bisphenol A bis(diphenyl phosphate); and optionally, up to 5 wt. % of an additive selected from a processing aid, a heat stabilizer, an ultra violet light absorber, a colorant, or a combination comprising at least one of the foregoing; wherein a molded sample of the thermoplastic composition has: a smoke density after 4 minutes (Ds-4) of equal to or less than 150 measured in accordance with ISO 5659-2 on a 3 mm thick plaque at 50 kW/m$^2$, an integral of the smoke density as a function of time up to 4 minutes (VOF4) of equal to or less than 300 measured in accordance with ISO 5659-2 on a 3 mm thick plaque at 50 kW/m$^2$, a maximum average heat release (MAHRE) of equal to or less than 60 kW/m$^2$ measured in accordance with ISO 5660-1 on a 3 mm thick plaque at 50 kW/m$^2$, and a ductility in multiaxial impact of 80% to 100%, measured at 23° C. at an impact speed of 4.4 m/second in accordance with ISO 6603 on 3.2 mm thick discs; or the thermoplastic composition comprises, based on the total weight of the composition, 58 to 95 wt. % of a poly(bisphenol-A carbonate)-co-poly(isophthalate-terephthalate-resorcinol ester) of the formula

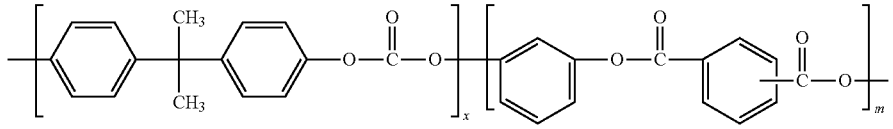

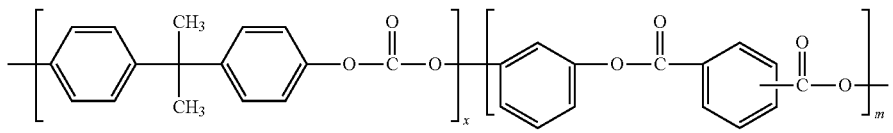

wherein m is 4 to 100, and the mole ratio of x:m is 99:1 to 1:99; 5 to 40 wt. % or 5 to 30 wt. % of a polyetherimide comprising units of the formula

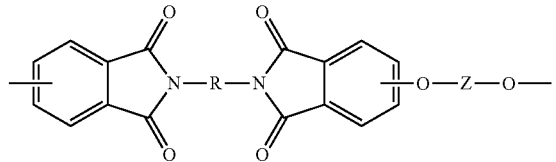

wherein R is m-phenylene and Z is 2,2-bis(1',4'-phenylene) isopropylidene; 0 to up to 12 wt. % of bisphenol A bis(diphenyl phosphate); and optionally, up to 5 wt. % of an additive selected from a processing aid, a heat stabilizer, an ultra violet light absorber, a colorant, or a combination comprising at least one of the foregoing; wherein a sample of the thermoplastic composition has: a smoke density after 4 minutes (Ds-4) of equal to or less than 150 measured in accordance with ISO 5659-2 on a 3 mm thick plaque at 50 kW/m², an integral of the smoke density as a function of time up to 4 minutes (VOF4) of equal to or less than 300 measured in accordance with ISO 5659-2 on a 3 mm thick plaque at 50 kW/m², a maximum average heat release (MAHRE) of equal to or less than 90 kW/m² measured in accordance with ISO 5660-1 on a 3 mm thick plaque at 50 kW/m², and a ductility in multiaxial impact of 80% to 100%, measured at 23° C. at an impact speed of 4.4 m/second in accordance with ISO 6603 on 3.2 mm thick discs; or the thermoplastic composition comprises, based on the weight of the thermoplastic composition, 48 to 93 wt. % of a poly(bisphenol-A carbonate)-co-poly(isophthalate-terephthalate-resorcinol ester) of the formula

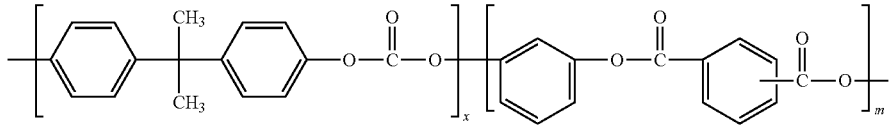

wherein m is 4 to 100, and the mole ratio of x:m is 99:1 to 1:99, and 5 to 40 wt. % of a polyetherimide comprising units of the formula

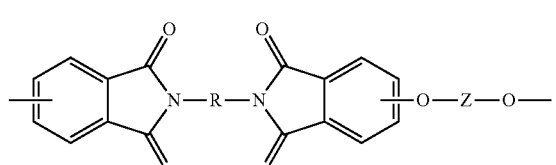

wherein R is m-phenylene and Z is 2,2-bis(1',4'-phenylene) isopropylidene; 2 to up to 12 wt. % of bisphenol A bis(diphenyl phosphate); and optionally, up to 5 wt. % of an additive selected from a processing aid, a heat stabilizer, an ultra violet light absorber, a colorant, or a combination comprising at least one of the foregoing; wherein a molded sample of the thermoplastic composition has: a smoke density after 4 minutes (Ds-4) of equal to or less than 150 measured in accordance with ISO 5659-2 on a 3 mm thick plaque at 50 kW/m², an integral of the smoke density as a function of time up to 4 minutes (VOF4) of equal to or less than 300 measured in accordance with ISO 5659-2 on a 3 mm thick plaque at 50 kW/m², a maximum average heat release (MAHRE) of equal to or less than 60 kW/m² measured in accordance with ISO 5660-1 on a 3 mm thick plaque at 50 kW/m², and a ductility in multiaxial impact of 80% to 100%, measured at 23° C. at an impact speed of 4.4 m/second in accordance with ISO 6603 on 3.2 mm thick discs; or the thermoplastic composition comprises, based on the total weight of the composition, 48 to 95 wt. % of a poly(bisphenol-A carbonate)-co-poly(isophthalate-terephthalate-resorcinol ester)-co-poly(siloxane) which comprises 1 to 40 mol % of bisphenol A carbonate units, 50 to 95 mol % of isophthalic acid-terephthalic acid-resorcinol units, and the siloxane units (9b-2), (9b-3), (9b-4), or a combination comprising at least one of the foregoing (specifically of formula 9b-2) present in an amount effective to provide 0.1 to 10 wt. % of the siloxane units, based on the weight of the poly(bisphenol-A carbonate)-co-poly(isophthalate-terephthalate-resorcinol ester)-co-poly(siloxane), wherein E is 2 to 30; 5 to 40 wt % of a polyetherimide comprising units of the formula

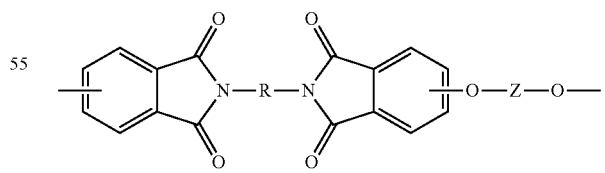

wherein R is m-phenylene and Z is 2,2-bis(1',4'-phenylene) isopropylidene; 0 to up to 12 wt. % of bisphenol A bis(diphenyl phosphate); and optionally, up to 5 wt. % of an additive selected from a processing aid, a heat stabilizer, an ultra violet light absorber, a colorant, or a combination comprising at least one of the foregoing; wherein a sample of the thermoplastic composition has: a smoke density after 4 minutes (Ds-4) of equal to or less than 150 measured in accordance with ISO 5659-2 on a 3 mm thick plaque at 50 kW/m², an integral of the smoke density as a function of time up to 4 minutes (VOF4) of equal to or less than 300 measured in accordance with ISO 5659-2 on a 3 mm thick plaque at 50 kW/m², a maximum average heat release (MAHRE) of equal to or less than 90 kW/m² measured in accordance with ISO 5660-1 on a 3 mm thick plaque at 50 kW/m², and a ductility in multiaxial impact of 80% to 100%, measured at 23° C. at an impact speed of 4.4 m/second in accordance with ISO 6603 on 3.2 mm thick discs; or the thermoplastic composition comprises, based on the weight of the thermoplastic composition, 48 to 93 wt. % of a poly(bisphenol-A carbonate)-co-poly(isophthalate-terephthalate-resorcinol ester)-co-poly(siloxane) which comprises 1 to 40 mol % of the bisphenol A carbonate units, 50 to 95 mol % of the isophthalic acid-terephthalic acid-resorcinol units, and the siloxane units (9b-2), (9b-3), (9b-4), or a combination comprising at least one of the foregoing (specifically of formula 9b-2) in an amount effective to provide 0.1 to 10 wt. % of siloxane units, based on the weight of the polymer, wherein E has an average value of 2 to 30, based on the weight of the poly(bisphenol-A carbonate)-co-poly(isophthalate-terephthalate-resorcinol ester)-co-poly(siloxane); and 5 to 40 wt. % of a polyetherimide comprising units of the formula

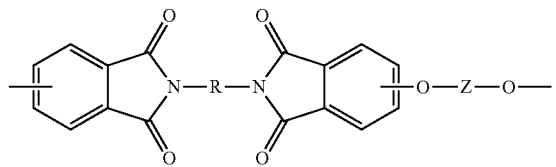

wherein R is m-phenylene and Z is 2,2-bis(1',4'-phenylene)isopropylidene; 2 to up to 12 wt. % of bisphenol A bis(diphenyl phosphate); and optionally, up to 5 wt. % of an additive selected from a processing aid, a heat stabilizer, an ultra violet light absorber, a colorant, or a combination comprising at least one of the foregoing; wherein a molded sample of the thermoplastic composition has: a smoke density after 4 minutes (Ds-4) of equal to or less than 150 measured in accordance with ISO 5659-2 on a 3 mm thick plaque at 50 kW/m², an integral of the smoke density as a function of time up to 4 minutes (VOF4) of equal to or less than 300 measured in accordance with ISO 5659-2 on a 3 mm thick plaque at 50 kW/m², a maximum average heat release (MAHRE) of equal to or less than 60 kW/m² measured in accordance with ISO 5660-1 on a 3 mm thick plaque at 50 kW/m², and a ductility in multiaxial impact of 80% to 100%, measured at 23° C. at an impact speed of 4.4 m/second in accordance with ISO 6603 on 3.2 mm thick discs.

In still other embodiments, the railway component is extruded or molded interior train cladding comprising a thermoplastic composition comprising, based on the total weight of the composition: 48 to 95 wt. % of a first polymer comprising bisphenol A carbonate units and monoaryl arylate units, or a second polymer comprising bisphenol A carbonate units, monoaryl arylate units, and siloxane units, or a combination comprising at least one of the foregoing polymers; 5 to 40 wt. % of a polyetherimide; and optionally an organophosphorus compound in an amount effective to provide 0.1 to 1.0 wt. % of phosphorus, based on the total weight of the thermoplastic polymer composition, wherein the bisphenol A carbonate units are of the formula

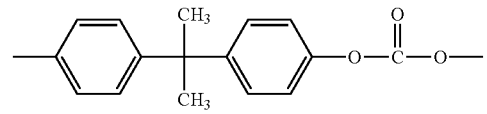

the monoaryl arylate units are of the formula

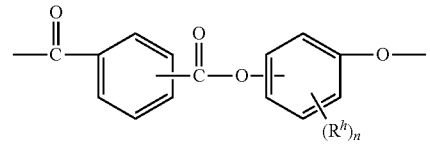

wherein each $R^h$ is independently a halogen atom, a $C_{1-10}$ hydrocarbyl and n is 0 to 4; and the siloxane units are of the formula

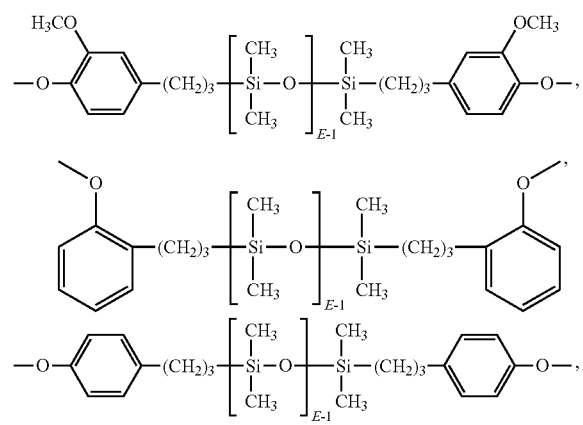

or a combination comprising at least one of the foregoing (specifically of formula 9b-2), wherein E has an average value of 2 to 90 wherein a sample of the thermoplastic composition has: a smoke density after 4 minutes (Ds-4) of equal to or less than 150 measured in accordance with ISO 5659-2 on a 3 mm thick plaque at 50 kW/m², an integral of the smoke density as a function of time up to 4 minutes (VOF4) of equal to or less than 300 measured in accordance with ISO 5659-2 on a 3 mm thick plaque at 50 kW/m², a maximum average heat release (MAHRE) of equal to or less than 90 kW/m² measured in accordance with ISO 5660-1 on a 3 mm thick plaque at 50 kW/m², a critical heat flux at extinguishment (CFE) of equal to or greater than 20 kW/m² measured in accordance with ISO 5658-2 on a 3 mm thick plaque, and a ductility in multiaxial impact of 80% to 100%, measured at 23° C. at an impact speed of 4.4 m/second in accordance with ISO 6603 on 3.2 mm thick discs. In a specific embodiment, a sample of the thermoplastic composition has: a smoke density after 4 minutes (Ds-4) of equal to or less than 150 measured in accordance with ISO 5659-2 on a 3 mm thick plaque at 50 kW/m², an integral of the smoke density as a function of time up to 4 minutes (VOF4) of equal to or less than 300 measured in accordance with ISO 5659-2 on a 3 mm thick plaque at 50 kW/m², a maximum average heat release (MAHRE) of equal to or less than 60 kW/m² measured in accordance with ISO 5660-1 on a 3 mm thick plaque at 50 kW/m², a critical heat flux at extinguishment (CFE) of equal to or greater than 20 kW/m² measured in accordance with ISO 5658-2 on a 3 mm thick plaque, and a ductility in multiaxial impact of 80% to 100%, measured at 23° C. at an impact speed of 4.4 m/second in accordance with ISO 6603 on 3.2 mm thick discs. Optionally, the seat component is injection molded, and the thermoplastic composition has a melt volume flow rate of equal to or greater than 4 cc/10 min measured at 300° C. under 1.2 kg force measured according to ISO 1133; or the seat component is extruded, and the thermoplastic composition has a Vicat B120 of less than 160° C. measured according to ISO 306.

In specific embodiments of the interior cladding wherein the thermoplastic composition comprises 5 to 40 wt. % of a polyetherimide, one or more of the following conditions can apply: the first polymer can comprise: 2 to 20 mol % of bisphenol-A carbonate units, 60 to 98 mol % of isophthalic acid-terephthalic acid-resorcinol ester units of the formula

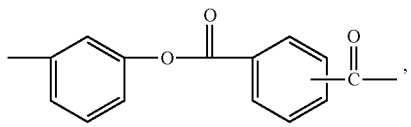

and optionally, 1 to 20 mol % resorcinol carbonate units of the formula

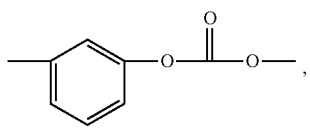

isophthalic acid-terephthalic acid-bisphenol-A ester units of the formula

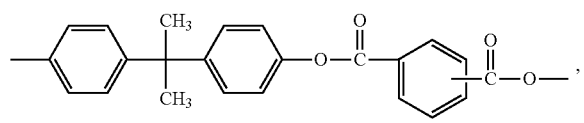

or a combination thereof, and specifically the first polymer can comprise units of the formula

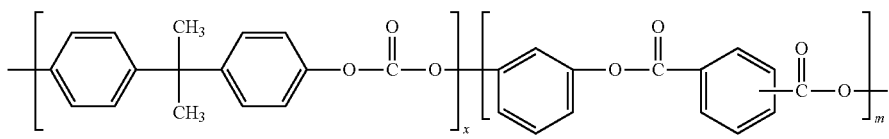

wherein m is 4 to 100, and the mole ratio of x:m is 99:1 to 1:99; the second polymer can comprises 1 to 40 mol % of the bisphenol A carbonate units, 50 to 95 mol % of the isophthalic acid-terephthalic acid-resorcinol units, and the siloxane units (9b-2), (9b-3), (9b-4), or a combination comprising at least one of the foregoing (specifically of formula 9b-2) in an amount effective to provide 0.1 to 10 wt. % of siloxane units, based on the weight of the second polymer, wherein E has an average value of 2 to 50; the polyetherimide can comprises units of the formula

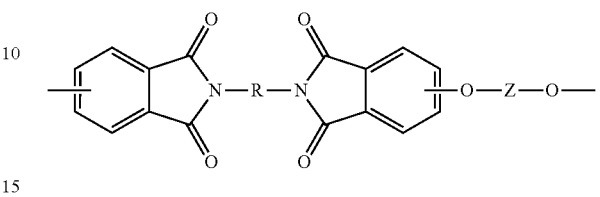

wherein R is a $C_{2-20}$ hydrocarbon group, and Z is an aromatic $C_{6-24}$ monocyclic or polycyclic group optionally substituted with 1 to 6 $C_{1-8}$ alkyl groups, 1 to 8 halogen atoms, or a combination thereof, wherein the divalent bonds of the —O—Z—O— group are in the 3,3', 3,4', 4,3', or the 4,4' positions, specifically wherein R is m-phenylene and Z is 2,2-bis(1',4'-phenylene)isopropylidene; the organophosphorus compound can be an aromatic organophosphorus compound can have at least one organic aromatic group and at least one phosphorus-containing group, such as bisphenol A bis(diphenyl phosphate), triphenyl phosphate, resorcinol bis(diphenyl phosphate), tricresyl phosphate, a phenol/biphenol polyphosphate, or a combination comprising at least one of the foregoing, or an organic compound having at least one phosphorus-nitrogen bond such as a phosphazene, phosphorus ester amide, phosphoric acid amide, phosphonic acid amide, phosphinic acid amide, tris(aziridinyl)phosphine oxide, or a combination comprising at least one of the foregoing; optionally, the composition comprises up to 5 wt. % of an additive selected from a processing aid, a heat stabilizer, an ultra violet light absorber, a colorant, or a combination comprising at least one of the foregoing, for example 0.05 to 10.0 wt. % of a light diffuser additive comprising silicone, polymethylsilsesquioxane, crosslinked poly(methyl methacrylate), methyl methacrylate/ethyleneglycol dimethacrylate copolymer, $TiO_2$, or a combination comprising at least one of the foregoing, based on the total weight of the polymers in the thermoplastic composition, or 0.00002 to 5.0 wt. % of one or more colorants based on the total weight of the polymers in the thermoplastic composition; or no or substantially no flame retarding brominated compounds, flame retardant salts, or a combination comprising at least one of the foregoing are present in the thermoplastic composition.

In other specific embodiments of the foregoing interior train claddings comprising 40 wt. % of a polyetherimide, the thermoplastic composition can comprise 48 to 95 wt. % of a combination comprising, based on the weight of the combination, 20 to 80 wt. % of a poly(bisphenol-A carbonate)-co-poly(isophthalate-terephthalate-resorcinol ester) of the formula

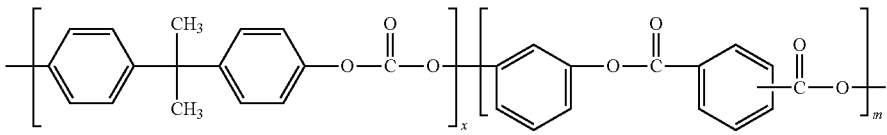

wherein m is 4 to 100, and the mole ratio of x:m is 99:1 to 1:99, and 20 to 80 wt. % of a poly(bisphenol-A carbonate)-co-poly(isophthalate-terephthalate-resorcinol ester)-co-poly(siloxane) comprising, 1 to 40 mol % of bisphenol A carbonate units, 50 to 95 mol % of isophthalic acid-terephthalic acid-resorcinol units, and the siloxane units (9b-2), (9b-3), (9b-4), or a combination comprising at least one of the foregoing (specifically of formula 9b-2), present in an amount effective to provide 0.1 to 10 wt. % of the siloxane units, based on the weight of the poly(bisphenol-A carbonate)-co-poly(isophthalate-terephthalate-resorcinol ester)-co-poly(siloxane), wherein E has an average value of 2 to 30; and 5 to 40 wt. % of a polyetherimide comprising units of the formula

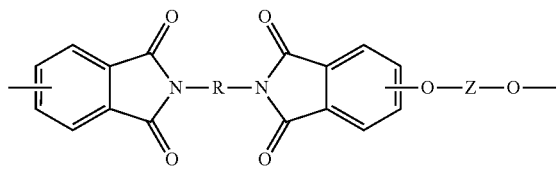

R is m-phenylene and Z is 2,2-bis(1',4'-phenylene)isopropylidene; 0 to up to 12 wt. % of bisphenol A bis(diphenyl phosphate); and optionally, up to 5 wt. % of an additive selected from a processing aid, a heat stabilizer, an ultra violet light absorber, a colorant, or a combination comprising at least one of the foregoing; wherein a sample of the thermoplastic composition has: a smoke density after 4 minutes (Ds-4) of equal to or less than 150 measured in accordance with ISO 5659-2 on a 3 mm thick plaque at 50 kW/m², an integral of the smoke density as a function of time up to 4 minutes (VOF4) of equal to or less than 300 measured in accordance with ISO 5659-2 on a 3 mm thick plaque at 50 kW/m², a maximum average heat release (MAHRE) of equal to or less than 90 kW/m² measured in accordance with ISO 5660-1 on a 3 mm thick plaque at 50 kW/m², a critical heat flux at extinguishment (CFE) of equal to or greater than 20 kW/m² measured in accordance with ISO 5658-2 on a 3 mm thick plaque, and a ductility in multiaxial impact of 80% to 100%, measured at 23° C. at an impact speed of 4.4 m/second in accordance with ISO 6603 on 3.2 mm thick discs; or the thermoplastic composition comprises, based on the total weight of the thermoplastic composition, 48 to 93 wt. % of a combination comprising, based on the weight of the combination, 20 to 80 wt. % of a poly(bisphenol-A carbonate)-co-poly(isophthalate-terephthalate-resorcinol ester) of the formula wherein m is 4 to 100, and the mole ratio of x:m is 99:1 to 1:99, and 20 to 80 wt. % of a poly(bisphenol-A carbonate)-co-poly(isophthalate-terephthalate-resorcinol ester)-co-poly(siloxane) comprising, 1 to 40 mol % of bisphenol A carbonate units, 50 to 95 mol % of isophthalic acid-terephthalic acid-resorcinol units, and the siloxane units (9b-2), (9b-3), (9b-4), or a combination comprising at least one of the foregoing (specifically of formula 9b-2) are present in an amount effective to provide 0.1 to 10 wt. % of siloxane units, based on the weight of the poly(bisphenol-A carbonate)-co-poly(isophthalate-terephthalate-resorcinol ester)-co-poly(siloxane), wherein E has an average value of 2 to 30; 5 to 40 wt. % of a polyetherimide comprising units of the formula

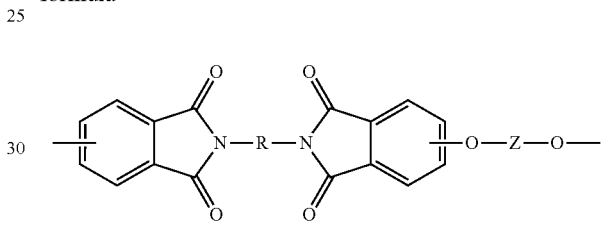

R is m-phenylene and Z is 2,2-bis(1',4'-phenylene)isopropylidene; 2 to up to 12 wt. % of bisphenol A bis(diphenyl phosphate); and optionally, up to 5 wt. % of an additive selected from a processing aid, a heat stabilizer, an ultra violet light absorber, a colorant, or a combination comprising at least one of the foregoing, wherein a sample of the thermoplastic composition has: a smoke density after 4 minutes (Ds-4) of equal to or less than 150 measured in accordance with ISO 5659-2 on a 3 mm thick plaque at 50 kW/m², an integral of the smoke density as a function of time up to 4 minutes (VOF4) of equal to or less than 300 measured in accordance with ISO 5659-2 on a 3 mm thick plaque at 50 kW/m², a maximum average heat release (MAHRE) of equal to or less than 60 kW/m² measured in accordance with ISO 5660-1 on a 3 mm thick plaque at 50 kW/m², a critical heat flux at extinguishment (CFE) of equal to or greater than 20 kW/m² measured in accordance with ISO 5658-2 on a 3 mm thick plaque, and a ductility in multiaxial impact of 80% to 100%, measured at 23° C. at an impact speed of 4.4 m/second in accordance with ISO 6603 on 3.2 mm thick discs; or the thermoplastic composition comprises, based on the total weight of the composition, 48 to 95 wt. % of a poly(bisphenol-A carbonate)-co-poly(isophthalate-terephthalate-resorcinol ester) of the formula

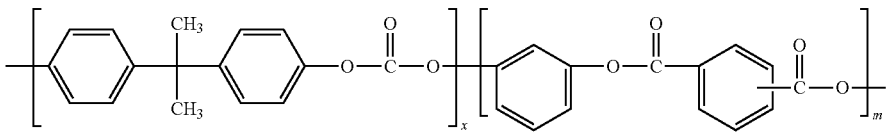

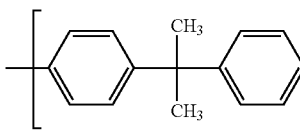

wherein m is 4 to 100, and the mole ratio of x:m is 99:1 to 1:99; 5 to 40 wt. % of a polyetherimide comprising units of the formula

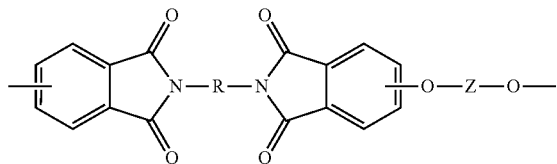

wherein R is m-phenylene and Z is 2,2-bis(1',4'-phenylene) isopropylidene; 0 to up to 12 wt. % of bisphenol A bis (diphenyl phosphate); and optionally, up to 5 wt. % of an additive selected from a processing aid, a heat stabilizer, an ultra violet light absorber, a colorant, or a combination comprising at least one of the wherein a sample of the thermoplastic composition has: a smoke density after 4 minutes (Ds-4) of equal to or less than 150 measured in accordance with ISO 5659-2 on a 3 mm thick plaque at 50 kW/m², an integral of the smoke density as a function of time up to 4 minutes (VOF4) of equal to or less than 300 measured in accordance with ISO 5659-2 on a 3 mm thick plaque at 50 kW/m², a maximum average heat release (MAHRE) of equal to or less than 90 kW/m² measured in accordance with ISO 5660-1 on a 3 mm thick plaque at 50 kW/m², a critical heat flux at extinguishment (CFE) of equal to or greater than 20 kW/m² measured in accordance with ISO 5658-2 on a 3 mm thick plaque, and a ductility in multiaxial impact of 80% to 100%, measured at 23° C. at an impact speed of 4.4 m/second in accordance with ISO 6603 on 3.2 mm thick discs; or the thermoplastic composition comprises, based on the weight of the thermoplastic composition, 48 to 93 wt. % of a poly(bisphenol-A carbonate)-co-poly(isophthalate-terephthalate-resorcinol ester) of the formula

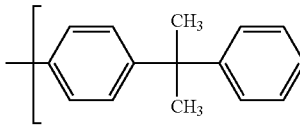

wherein m is 4 to 100, and the mole ratio of x:m is 99:1 to 1:99, and 5 to 40 wt. % of a polyetherimide comprising units of the formula

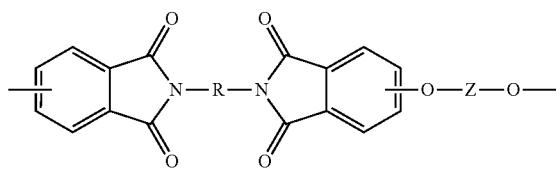

wherein R is m-phenylene and Z is 2,2-bis(1',4'-phenylene) isopropylidene; 2 to up to 12 wt. % of bisphenol A bis (diphenyl phosphate); and optionally, up to 5 wt. % of an additive selected from a processing aid, a heat stabilizer, an ultra violet light absorber, a colorant, or a combination comprising at least one of the foregoing; wherein a sample of the thermoplastic composition has: a smoke density after 4 minutes (Ds-4) of equal to or less than 150 measured in accordance with ISO 5659-2 on a 3 mm thick plaque at 50 kW/m², an integral of the smoke density as a function of time up to 4 minutes (VOF4) of equal to or less than 300 measured in accordance with ISO 5659-2 on a 3 mm thick plaque at 50 kW/m², a maximum average heat release (MAHRE) of equal to or less than 60 kW/m² measured in accordance with ISO 5660-1 on a 3 mm thick plaque at 50 kW/m², a critical heat flux at extinguishment (CFE) of equal to or greater than 20 kW/m² measured in accordance with ISO 5658-2 on a 3 mm thick plaque, and a ductility in multiaxial impact of 80% to 100%, measured at 23° C. at an impact speed of 4.4 m/second in accordance with ISO 6603 on 3.2 mm thick discs; or the thermoplastic composition comprises, based on the total weight of the composition, 48 to 95 wt. % of a poly(bisphenol-A carbonate)-co-poly(isophthalate-terephthalate-resorcinol ester)-co-poly(siloxane) which comprises 1 to 40 mol % of bisphenol A carbonate units, 50 to 95 mol % of isophthalic acid-terephthalic acid-resorcinol units, and the siloxane units (9b-2), (9b-3), (9b-4), or a combination comprising at least one of the foregoing (specifically of formula 9b-2) are present in an amount effective to provide 0.1 to 10 wt. % of siloxane units, based on the weight of the poly(bisphenol-A carbonate)-co-poly(isophthalate-terephthalate-resorcinol ester)-co-poly(siloxane), wherein E has an average value of 2 to 30; 5 to 40 wt. % of a polyetherimide comprising units of the formula

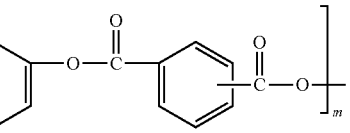

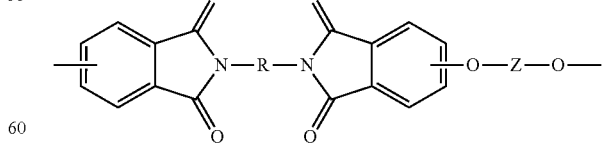

wherein R is m-phenylene and Z is 2,2-bis(1',4'-phenylene) isopropylidene; 0 to up to 12 wt. % of bisphenol A bis (diphenyl phosphate; and optionally, up to 5 wt. % of an additive selected from a processing aid, a heat stabilizer, an ultra violet light absorber, a colorant, or a combination comprising at least one of the foregoing; wherein a sample of the thermoplastic composition has: a smoke density after 4 minutes (Ds-4) of equal to or less than 150 measured in accordance with ISO 5659-2 on a 3 mm thick plaque at 50 kW/m$^2$, an integral of the smoke density as a function of time up to 4 minutes (VOF4) of equal to or less than 300 measured in accordance with ISO 5659-2 on a 3 mm thick plaque at 50 kW/m$^2$, a maximum average heat release (MAHRE) of equal to or less than 90 kW/m$^2$ measured in accordance with ISO 5660-1 on a 3 mm thick plaque at 50 kW/m$^2$, a critical heat flux at extinguishment (CFE) of equal to or greater than 20 kW/m$^2$ measured in accordance with ISO 5658-2 on a 3 mm thick plaque, and a ductility in multiaxial impact of 80% to 100%, measured at 23° C. at an impact speed of 4.4 m/second in accordance with ISO 6603 on 3.2 mm thick discs; or the thermoplastic composition comprises, based on the weight of the thermoplastic composition, 48 to 93 wt. % of a poly(bisphenol-A carbonate)-co-poly(isophthalate-terephthalate-resorcinol ester)-co-poly(siloxane) which comprises 1 to 40 mol % of bisphenol A carbonate units, 50 to 95 mol % of isophthalic acid-terephthalic acid-resorcinol units, and the siloxane units (9b-2), (9b-3), (9b-4), or a combination comprising at least one of the foregoing (specifically of formula 9b-2) are present in an amount effective to provide 0.1 to 10 wt. % of siloxane units, based on the weight of the poly(bisphenol-A carbonate)-co-poly(isophthalate-terephthalate-resorcinol ester)-co-poly(siloxane), wherein E has an average value of 2 to 30; and 5 to 40 wt. % of a polyetherimide comprising units of the formula

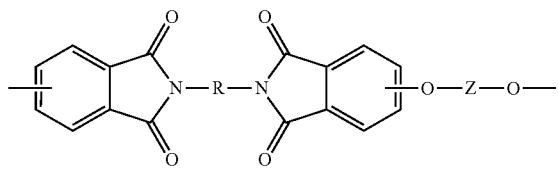

wherein R is m-phenylene and Z is 2,2-bis(1',4'-phenylene) isopropylidene; 2 to up to 12 wt. % of bisphenol A bis (diphenyl phosphate); and optionally, up to 5 wt. % of an additive selected from a processing aid, a heat stabilizer, an ultra violet light absorber, a colorant, or a combination comprising at least one of the foregoing; wherein a sample of the thermoplastic composition has: a smoke density after 4 minutes (Ds-4) of equal to or less than 150 measured in accordance with ISO 5659-2 on a 3 mm thick plaque at 50 kW/m$^2$, an integral of the smoke density as a function of time up to 4 minutes (VOF4) of equal to or less than 300 measured in accordance with ISO 5659-2 on a 3 mm thick plaque at 50 kW/m$^2$, a maximum average heat release (MAHRE) of equal to or less than 60 kW/m$^2$ measured in accordance with ISO 5660-1 on a 3 mm thick plaque at 50 kW/m$^2$, a critical heat flux at extinguishment (CFE) of equal to or greater than 20 kW/m$^2$ measured in accordance with ISO 5658-2 on a 3 mm thick plaque, and a ductility in multiaxial impact of 80% to 100%, measured at 23° C. at an impact speed of 4.4 m/second in accordance with ISO 6603 on 3.2 mm thick discs.

As in other embodiments, the claddings manufactured from the thermoplastic compositions comprising 5 to 40 wt. % of the polyetherimide can be an interior vertical surface selected from room dividers, flaps, boxes, hoods and louvres; an interior door or lining for internal and external doors; a window insulation; a kitchen interior surface; an interior horizontal surface selected from ceiling paneling, flaps, boxes, hoods and louvres; a luggage storage area selected from overhead and vertical luggage racks, luggage containers and compartments; a driver's desk application selected from paneling and surfaces of driver's desk; an interior surface of gangways selected from interior sides of gangway membranes (bellows) and interior linings; a window frame; an optionally folding table with downward facing surface; an interior or exterior surface of air ducts, or a device for passenger information, specifically the cladding can be a side wall, a front wall, an end-wall, a partition, a room divider, an interior door, a window insulation, a lining, a kitchen interior surface, a ceiling panel, an overhead or vertical luggage rack, a luggage container, a luggage compartment, a window frame, an optionally folding table with downward facing surface, or an information display screen; or where a light diffuser is present, the cladding can be a partition, a room divider, an interior door or lining for internal and external doors, a window insulation, an overhead and vertical luggage rack, a luggage container and compartment, a window frame, an optionally folding table with downward facing surface, or a device for passenger information.

The seat components or cladding having low smoke density and low heat release rates are further illustrated by the following non-limiting examples.

EXAMPLES

Materials for the following examples are listed in Table 2.

TABLE 2

| COMPONENT | Trade name; chemical description | SOURCE |
|---|---|---|
| PC1 | Bisphenol A homopolycarbonate, having an Mw of 27,000 to 33,000 g/mol as determined by GPC using polycarbonate standards | SABIC |
| PC2 | Linear Bisphenol A Polycarbonate, produced via interfacial polymerization, Mw of about 21,800 g/mol as determined by GPC using polycarbonate standards, phenol end-capped | SABIC |
| PC3 | Branched Bisphenol A polycarbonate, produced via interfacial polymerization, 0.3 mol % 1,1,1-tris(4-hydroxyphenyl)ethane (THPE) branching agent, Mw about 33,600 g/mol as determined by GPC using polycarbonate standards, para-cumylphenol (PCP) end-capped | SABIC |
| SiPC2 | PDMS (polydimethylsiloxane) - Bisphenol A Polycarbonate copolymer, produced via interfacial polymerization, 6 wt. % siloxane, average PDMS block length of 45 units (D45), Mw about 23,000 g/mol as determined by GPC using polycarbonate standards, para-cumylphenol (PCP) end-capped* | SABIC |

TABLE 2-continued

| COMPONENT | Trade name; chemical description | SOURCE |
|---|---|---|
| PC105B | TetrabromoBPA/bisphenol A polycarbonate copolymer, bromine content of 26 wt. %, Mw about 23,700 g/mol, para-cumyl phenol end-capped | SABIC |
| ITR-PC | ITR (Isophthalic acid-terephthalic acid-resorcinol) - bisphenol A copolyestercarbonate copolymer, ester content 83 mol %, interfacial polymerization, Mw 19,000 to 23,000 g/mol, para-cumyl phenol end-capped | SABIC |
| ITR-PC-Si | Polysiloxane-ITR (Isophthalic acid-terephthalic acid-resorcinol) - bisphenol-A copolyestercarbonate copolymer, ester content 83 mol %, siloxane content 1 wt. % (average siloxane chain length about 10 containing eugenol endcaps), interfacial polymerization, Mw = 22,500 to 26,500 g/mol, para-cumyl phenol end-capped | SABIC |
| BPADP | CR-741; Bisphenol A diphosphate | NAGASE (EUROPE) GMBH |
| PEPQ | Tetrakis(2,4-di-tert-butylphenyl)[1,1-biphenyl]-4,4'diylbisphosphonite | CLARIANT |
| TIO2 | Coated titanium dioxide | DUPONT |
| CARBON BLACK | Amorphous Carbon | CABOT |
| IRGAPHOS 168 | Tris(di-t-butylphenyl)phosphite | BASF |
| IRGANOX 1076 | Octadecyl-3-(3,5-di-tert-butyl-4-hydroxyphenyl) propionate | BASF |
| KSS | Potassium 3-(phenylsulfonyl)benzenesulfonate | Sloss Industries |
| Rimar | Potassium nonafluoro-1-butanesulfonate | Lanxess Germany |
| Octaphenylcyclotetrasiloxane | Octaphenylcyclotetrasiloxane | MOMENTIVE |
| PTFE | Encapsulated PTFE | SABIC |
| ABS R360 | Acrylonitrile-butadiene-styrene resin, 360, butadiene content 51.8%, styrene content 36.9%, acrylonitrile content 11.3% | SABIC |
| PEI | Polyetherimide resin, made via reaction of bisphenol A dianhydride with equimolar amount of m-phenylene diamine, Mw about 33,000 g/mol, determined via GPC using Polystyrene standards | SABIC |
| PPSU | Radel 5100; poly(phenylenesulfone) | SOLVAY |

*Can be manufactured by the methods described in U.S. Pat. No. 6,072,011 to Hoover.

The tests performed are summarized in Table 3.

TABLE 3

| Description | Test | Specimen | Property | Units |
|---|---|---|---|---|
| ISO Smoke density | ISO 5659-2, at 50 kW/m$^2$ | plaque 75 × 75 × 3 mm | DS-4 | [—] |
| ISO Heat release | ISO 5660-1, at 50 kW/m$^2$ | plaque 100 × 100 × 3 mm | MAHRE | kW/m$^2$ |
| Melt volume flow rate at 300° C., 1.2 kg | ISO 1133 | Pellets | MVR | cc/10 min |
| Izod Notched Impact, 23° C., 5.5 J | ISO 180/1A | Multi-purpose ISO 3167 Type A, 4 mm thickness | INI | kJ/m$^2$ |
| Multiaxial Impact, 23° C., 4.4 m/s | ISO 6603 | Disc, 3.2 mm thickness, 100 mm diameter | MAI | J |
| ISO Flame spread | ISO 565802 | plaque 800 × 155 × 3 mm | CFE | kW/m2 |
| Vicat, B120 | ISO 306 | Multi-purpose ISO 3167 Type A, 4 mm thickness | Vicat | ° C. |

Smoke density measurements were performed on 7.5×7.5 cm plaques with 3 mm thickness using a National Bureau of Standards (NBS) Smoke Density Chamber from Fire Testing Technology Ltd (West Sussex, United Kingdom). All measurements were performed according to ISO5659-2, with an irradiance of 50 kW/m$^2$ at the sample position and a sample-to-cone distance of 5 cm in view of the charring behavior of the samples (as prescribed by ISO5659-2). Ds-4 was determined as the measured smoke density after 240 seconds.

Heat release measurements were performed on 10×10 cm plaques with 3 mm thickness using a Cone Calorimeter. All measurements were performed according to ISO 5660-1, with an irradiation of 50 kW/m$^2$ at the sample position and a sample-to-cone distance of 6 cm in view of the charring behavior of the samples (as prescribed by ISO 5660-1).

ISO flame spread measurements were performed on a 800×155 mm plaques with 3 mm thickness using according to ISO 5658-2. Flame spread is measured as critical heat flux at extinguishment (CFE) in kW/m$^2$ as prescribed by ISO 5658-2.

The smoke density, flame spread and heat release tests executed are indicative tests. They were performed according to their respective ISO standards, but were not executed by an officially certified test institute.

Blending, Extrusion, and Molding Conditions

The compositions were made as follows. All solid additives (e.g., stabilizers, colorants, solid flame retardants) were dry blended off-line as concentrates using one of the primary polymer powders as a carrier and starve-fed via gravimetric feeder(s) into the feed throat of the extruder. The remaining polymer(s) were starve-fed via gravimetric feeder(s) into the feed throat of the extruder as well. The liquid flame retardants (e.g., BPADP) were fed before the vacuum using a liquid injection system. It will be recognized by one skilled in the art that the method is not limited to these temperatures or processing equipment.

Extrusion of all materials was performed on a 25 mm Werner-Pfleiderer ZAK twin-screw extruder (L/D ratio of 33/1 with a vacuum port located near the die face. The extruder has 9 zones, which were set at temperatures of 40° C. (feed zone), 200° C. (zone 1), 250° C. (zone 2), 270° C. (zone 3) and 280-300° C. (zone 4 to 8). Screw speed was 300 rpm and throughput was between 15 and 25 kg/hr.

The compositions were molded after drying at 100 to 110° C. for 6 hours on a 45-ton Engel molding machine with 22 mm screw or 75-ton Engel molding machine with 30 mm screw operating at a temperature 270-300° C. with a mold temperature of 70-90° C. It will be recognized by one skilled in the art that the method is not limited to these temperatures or processing equipment.

Examples 1-8

Examples 1-8 demonstrate the effect of the addition of polyetherimide (PEI) to Isophthalic acid-terephthalic acid-resorcinol)-bisphenol-A poly(ester-co-carbonate) (ITR-PC) copolymers on smoke density (Ds-4) and heat release (MAHRE) properties as well as mechanical properties. Formulations and results are shown in Table 4.

indicating no interaction), which results in compositions with smoke densities (Ds-4) comparable to 100 wt. % PEI, as measured according to ISO 5659-2 on 3 mm thick plaques at 50 kW/m$^2$, with significant benefits in flow and impact properties.

The results demonstrate that ITR-PC-siloxane copolymers with 10-30% PEI based on the weight of the composition has a smoke density (Ds-4) below 150 as measured according to ISO 5659-2 on 3 mm thick plaque at 50 kW/m$^2$, which qualifies for rail components of Hazard Level 3 designation according to the European Railway Standard EN 45545 (for R6 applications qualifying for HL3 compliance, a smoke density (Ds-4) at or below 150 is required at 50 kW/m$^2$), provided that the other required properties (e.g. heat release) meet the selection criteria as well, whereas formulations without PEI do not meet these HL3 requirements for Ds-4 (e.g. CEx1 has a Ds-4 of 186 as measured according to ISO5659-2 on 3 mm thick plaque at 50 kW/m$^2$, which would only meet HL2, requiring Ds-4≤300 for R6 applications at 50 kW/m$^2$).

Compositions with polyetherimide contents of 20% (Ex3) and 30% (Ex4) have MAHRE values below 90 kW/m$^2$ measured according to ISO 5660-1 at 50 kW/m$^2$, which is below the threshold for HL2 compliance for R6 applications (MAHRE<90 kW/m$^2$ at 50 kW/m$^2$). This shows that suffi-

TABLE 4

| Component | Unit | CEx1 | Ex2 | Ex3 | Ex4 | Ex5 | CEx6 | CEx7 | CEx8 |
|---|---|---|---|---|---|---|---|---|---|
| ITR-PC | % | 99.94 | 89.94 | 79.94 | 74.94 | 69.94 | 59.94 | 39.94 | — |
| PEPQ | % | 0.06 | 0.06 | 0.06 | 0.06 | 0.06 | 0.06 | 0.06 | — |
| PEI | % | | 10 | 20 | 25 | 30 | 40 | 60 | 100 |
| Property | | | | | | | | | |
| INI, 23° C., 5.5 J | kJ/m$^2$ | 16 | 13 | 11 | 10 | 9 | 8 | 6 | 5 |
| MAI, 23° C., 4.4 m/s | J | 119 | 120 | 135 | 135 | 121 | 143 | 133 | 10 |
| MAI, ductility % | % | 100 | 80-100 | 80-100 | 80-100 | 80-100 | 80-100 | 20 | 0 |
| Vicat B120 | ° C. | 137 | 146 | 153 | N.A. | 160 | 167 | 181 | 212 |
| MVR, 300° C., 1.2 kg | Cc/10' | 9.6 | 7.7 | 6.1 | N.A. | 4.3** | 2.6** | * | * |
| MVR, 330° C., 2.16 kg | Cc/10' | 64.3 | 48.5 | 35.2 | 34.2 | 31.9 | 24.4 | 15.6 | — |
| Smoke density, DS-4 | — | 186 | 93 | 77 | 76 | 69 | 70** | — | 72 |
| Heat release, MAHRE | kW/m$^2$ | 125 | 98 | 81 | — | 79 | 80** | — | 45 |

* Not measurable
**Extrapolated

As shown in Table 4 and illustrated graphically in FIG. 1, smoke density (Ds-4) decreases upon addition of PEI, with values similar to 100 wt % PEI obtained already at 20-30 wt. % of PEI loading (Ds-4 of 77, 76 and 69 for 20, 25 and 30% respectively, compared to Ds-4 of 72 for 100 wt. % PEI, all measured on 3 mm thick plaques at 50 kW/m$^2$). As shown in FIG. 1, the decrease in smoke density (Ds-4) as a function of fractional concentration of PEI is non-linear, following a behavior indicating strong interaction between the PEI and the ITR-PC copolymer. An interaction parameter k was calculated based on the following equation.

$$Ds_{Blend} = \frac{w_{ITR-PC} Ds_{ITR-PC}^{Pure} + k w_{PEI} Ds_{PEI}^{pure}}{w_{ITR-PC} + k w_{PEI}} \quad \text{(Eq. 1)}$$

where $W_{ITR-PC}$ and $W_{PEI}$ are the fractional concentration of the ITR-PC and PEI copolymers respectively;
k is the interaction parameter; and
Ds is the smoke density.
The interaction parameter (k) is much larger (k=52.7), than expected based upon simple rules of mixture (k=1, ciently low MAHRE values can be achieved upon addition of sufficient polyetherimide to ITR-PC.

The compositions containing up to 30% of polyetherimide have similar multiaxial impact properties, both impact energy (120-135 J) and ductility (80-100%), as measured according to ISO 6603 on 3.2 mm thick discs, as the composition without polyetherimide (CEx1, impact energy of 119 J and ductility of 100%). In contrast, compositions containing high amounts of polyetherimide (CEx7) or only polyetherimide (CEx8) have significantly worse ductility levels (20% and 0% for CEx6 and CEx7 respectively) and/or impact energy (10 J for CEx8) than the composition containing only polycarbonate copolymer (CEx1).

In addition, compositions with higher polyetherimide contents have significantly higher Vicat values, which is typically not beneficial for forming of extruded articles, increasing the Vicat temperature from 137° C. (CEx1) to 153° C. for 20% polyetherimide (Ex3), 160° C. for 30% polyetherimide (Ex5) and 181° C. for 60% of polyetherimide (CEx7). Similarly, melt flow significantly decreases for higher polyetherimide contents, decreasing the MVR at 330° C. and 2.16 kg from 64.3 cc/10 min (CEx1) to 35.2 cc/10 min for 20% polyetherimide (Ex3), 31.9 cc/10 min for 30% polyetherimide (Ex5) and 15.6 cc/10 min for 60% of polyetherimide (CEx7). At standard polycarbonate MVR conditions, 300° C. and 1.2 kg, MVR decreases from 9.6 cc/10 min (CEx1) to 6.1 cc/10 min for 20% polyetherimide (Ex3) and to 4.3 for 30% polyetherimide (Ex4), while it is too low to be measured for 60% of polyetherimide (CEx7) or 100% polyetherimide (CEx8) under these conditions.

As such, the addition of polyetherimide to ITR-PC makes these compositions suitable for suitable for Hazard Level 2 (HL-2) (Ds-4≤300 at 50 kW/m² and MAHRE≤90 kW/m² at 50 kW/m²) or potentially even HL-3 (Ds-4≤150 at 50 kW/m² and MAHRE≤60 kW/m² at 50 kW/m²) in European Railway standard EN-45545 class R6 applications. Using polyetherimide quantities at 30% or lower provides compositions with good retention of practical impact (MAI), relatively low heat properties (Vicat of 160° C. and lower) and acceptable flow for injection molding.

Examples 9-12

Examples 9-12 demonstrate the effect of the addition of polyetherimide (PEI) to polycarbonate copolymer combinations with high isophthalic acid-terephthalic acid-resorcinol contents, namely ITR-PC-siloxane copolymers and ITR-PC copolymers on smoke density (Ds-4). Formulations and results are shown in Table 5.

TABLE 5

|  | Unit | Ex9 | Ex10 | CEx11 | CEx12 |
|---|---|---|---|---|---|
| Component |  |  |  |  |  |
| ITR-PC-siloxane | % | 44.97 | 38.92 | 49.97 | 0 |
| ITR-PC | % | 44.97 | 38.92 | 49.97 | 0 |
| PEPQ | % | 0.06 | 0.06 | 0.06 | 0 |
| TiO$_2$ | % | 2.0 | 2.0 | 2.0 | 0 |
| Carbon black | % | 0.10 | 0.1 | 0.10 | 0 |
| PEI | % | 10 | 20 | 0 | 100 |
| Property |  |  |  |  |  |
| INI, 23° C., 5.5 J | kJ/m² | 16 | 12 | 18 | 5 |
| MAI, 23° C., 4.4 m/s | J | 121 | 125 | 126 | 10 |
| MAI, ductility % | % | 100 | 100 | 100 | 0 |
| Vicat B120 | ° C. | 145 | 152 | 137 | 212 |
| MVR, 300° C., 1.2 kg | Cc/10' | 5.5 | 4.2 | 6.9 | * |
| DS-4 | — | 111 | 76 | 158 | 72 |
| MAHRE | kW/m² | 83 | 68 | N.A. | 45 |

* Not measurable

As shown in Table 5 and illustrated in FIG. 7, smoke density (Ds-4) decreases upon addition of PEI, with values similar to 100 wt % PEI already at 20 wt. % of PEI loading (DS-4 of 76, compared to DS-4 of 72 for 100 wt. % PEI, all measured on a 3 mm thick plaque at 50 kW/m²).

Similar to ITR-PC copolymers alone, the interaction parameter (k) was calculated for the ITR-PC/ITR-PC-siloxane combination using the equation $$Ds_{Blend} = \frac{w_{ITR-PC/ITR-PC-Si} Ds_{100\% \ ITR-PC/ITR-PC-Si} + kw_{PEI} Ds_{PEI}^{pure}}{w_{ITR-PC/ITR-PC-Si} + kw_{PEI}}$$ (Eq. 2)

The calculated interaction parameter (k=16.4) is much larger than expected based upon simple rules of mixture (k=1), which results in compositions with smoke densities comparable to 100 wt. % PEI, at PEI fractional concentrations of 20% (Ex. 10).

The results demonstrate that combinations of ITR-PC-siloxane and ITR-PC copolymers having 10 wt. % and 20 wt. % PEI have a smoke density (Ds-4) below 150 as measured according to ISO5659-2 on a 3 mm thick plaque at 50 kW/m², which qualifies these compositions for forming rail components of Hazard Level 3 designation according to the European Railway Standard EN 45545 (for R6 applications qualifying for HL3 compliance, a smoke density (Ds-4) at or below 150 is required at 50 kW/m²), provided that the other required properties (e.g. heat release) meet the selection criteria as well, whereas identical formulations without PEI do not meet these HL3 requirements for Ds-4 (e.g. CEx11 has a Ds-4 of 158 as measured according to ISO5659-2 on a 3 mm thick plaque at 50 kW/m², which only meets HL2 requiring Ds-4≤300 for R6 applications)).

Compositions with polyetherimide contents of 10% (Ex9) and 20% (Ex10) have MAHRE values below 90 kW/m² as measured according to ISO 5660-1 at 50 kW/m², which is below the threshold for HL2 compliance for R6 applications (MAHRE<90 kW/m² at 50 kW/m²). This shows that sufficiently low MAHRE values can be achieved upon addition of sufficient polyetherimide to compositions containing ITR-PC-Si and ITR-PC.

The compositions containing up to 20% of polyetherimide have similar multiaxial impact properties, both impact energy (120-130 J) and ductility (100%), as measured according to ISO 6603 on 3.2 mm thick discs, as the composition without polyetherimide (CEx10, impact energy of 125 J and ductility of 100%). In contrast, compositions containing only polyetherimide (CEx11) have significantly worse ductility levels (0%) and/or impact energy (10 J) than the composition containing only polycarbonate copolymer (CEx10).

The compositions containing up to 20% of polyetherimide have relatively minor changes in melt viscosity, with MVR at 300° C. and 1.2 kg decreasing from 6.9 cc/10 min (CEx10) to 4.2 cc/10 min for 20% polyetherimide (Ex9), as measured at 300° C. and 1.2 kg. Also the increase in Vicat is limited, as Vicat changes from 137° C. (CEx10) to 152° C. for 20% polyetherimide (Ex8).

As such, the addition of polyetherimide to compositions containing ITR-PC and ITR-PC-Si makes these compositions suitable for suitable for Hazard Level 2 (HL-2) (Ds-4≤300 at 50 kW/m² and MAHRE≤90 kW/m² at 50 kW/m²) or potentially even HL-3 (Ds-4≤150 at 50 kW/m² and MAHRE≤60 kW/m² at 50 kW/m²) in European Railway standard EN-45545 class R6 applications. Using polyetherimide quantities at 30% or lower provides compositions with good retention of practical impact (MAI), relatively low heat properties (Vicat of 160° C. and lower) and acceptable flow for injection molding (MVR of 4 cc/10 min and higher).

Examples 13-17

To determine whether the observed non-linear effect on smoke density (Ds-4) occurs, polymers with inherently low smoke density values different than PEI, were used as additives. Examples 13-17 demonstrate the effect of the addition of PPSU to ITR-PC copolymer. Formulations and results are shown in Table 6.

TABLE 6

| Component | Unit | CEx13 | CEx14 | CEx15 | CEx16 | CEx17 |
|---|---|---|---|---|---|---|
| ITR-PC | % | 100 | 90 | 80 | 70 | 0 |
| PPSU | % | 0 | 10 | 20 | 30 | 100 |
| Property |  |  |  |  |  |  |
| Smoke density, DS-4 | — | 186 | 194 | 194 | 133 | 67 |

Figure 2:
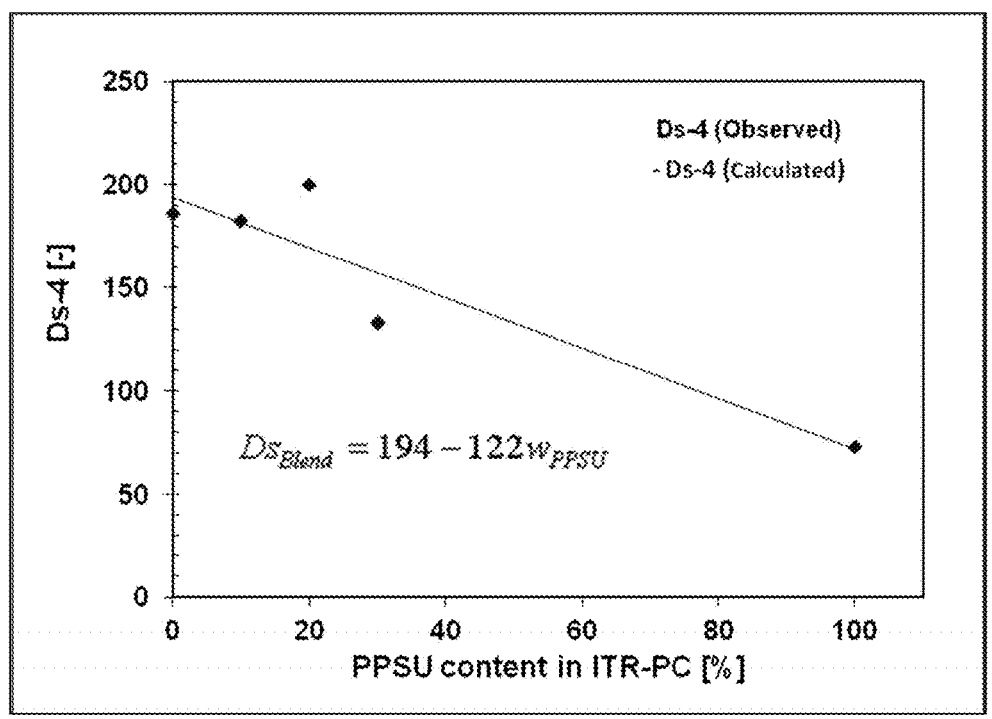
FIG. 2 shows the effect of an increase in fractional concentration (wt. %) of a poly(phenylsulfone) (PPSU) in an ITR-PC copolymer on smoke density (Ds-4), indicating the absence of interaction behavior.
Figure 3:
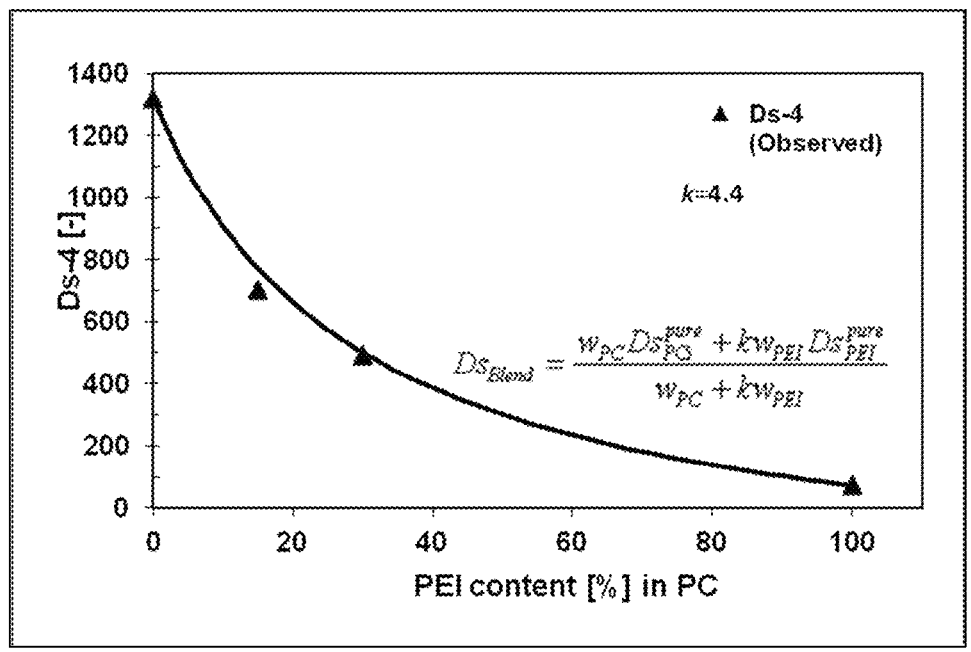
FIG. 3 shows the effect of the increase in fractional concentration (wt. %) of a polyetherimide in a homopolycarbonate on smoke density (Ds-4), indicating an interaction behavior.
Figure 4:
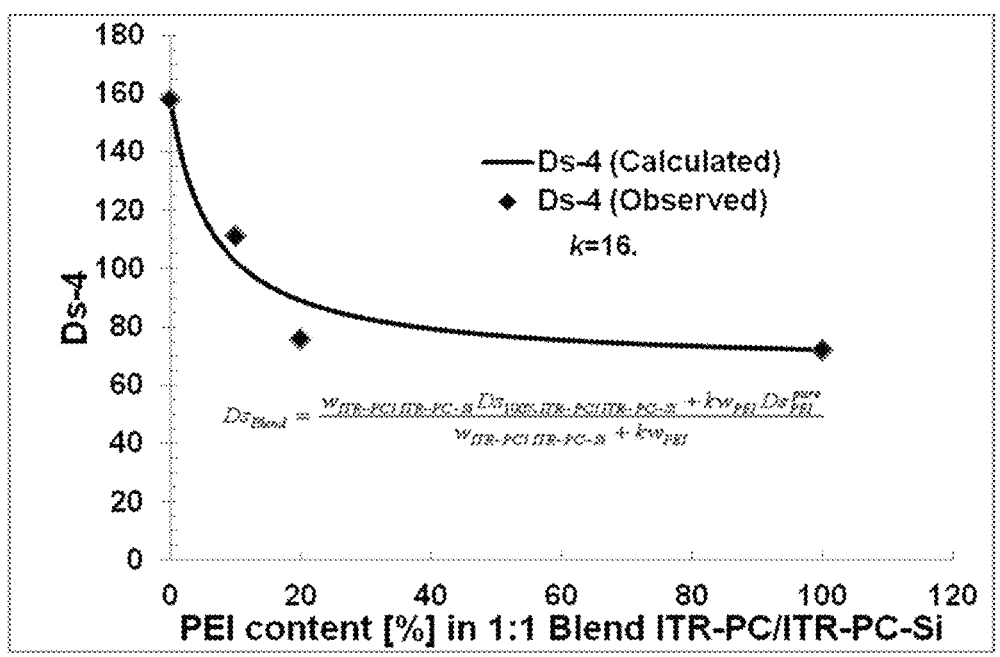
FIG. 4 shows the effect of an increase in fractional concentration (wt. %) of a polyetherimide in a combination of an ITR-PC copolymer and an ITR-PC-Si copolymer on smoke density (Ds-4), indicating an interaction behavior.

As shown in Table 6 and FIG. 2, there is no decrease in smoke density (Ds-4) as a function of PPSU loading beyond the expected by rules of mixture for these compositions (k=1), unlike the results observed for the addition of PEI to ITR-PC copolymers and combinations of ITR-PC with ITR-PC-siloxane copolymers. Rather, the effect is linear. The results demonstrate that the observed interactive, non-linear effect of PEI addition to high ITR content polycarbonate copolymer on the smoke density is unexpected and does not translate automatically to other polymers with inherently very low smoke density values similar to PEI.

Examples 27-30

To determine whether the non-linear effect on smoke density (Ds-4) is true for polycarbonate homopolymers, PEI at different concentrations was added to a polycarbonate homopolymer (PC). Results and formulations are shown in Table 9.

TABLE 9

|  | Unit | CEx27 | CEx28 | CEx29 | CEx30 |
|---|---|---|---|---|---|
| Component |  |  |  |  |  |
| PC1 | % | 99.88 | 84.88 | 69.88 | 0 |
| IRGANOX 1076 | % | 0.04 | 0.04 | 0.04 | 0 |
| IRGAPHOS 168 | % | 0.08 | 0.08 | 0.08 | 0 |
| PEI | % | 0 | 15 | 30 | 100 |
| Property |  |  |  |  |  |
| Smoke density, DS-4 | — | 1320 | 703 | 493 | 72 |

As shown in Table 9 and graphically illustrated in FIG. 5, the decrease in smoke density (Ds-4) as a function of PEI concentration is non-linear and larger than expected based upon simple rules of mixture (k=4.4 calculated according to the Equation in FIG. 5), but much lower values than in the case of ITR-PC (k=52.7) or compositions containing both ITR-PC and ITR-PC-Si (k=16.4).

The addition of PEI to polycarbonate homopolymer (PC) reduces the smoke density (Ds-4) (Ds-4 of 493 as measured according to ISO5659-2 on a 3 mm thick plaque at 50 kW/m² at 30% PEI), but not to below 300 or even 150. The addition of PEI to PC homopolymer reduces the smoke density (Ds-4) to such a degree that formulations containing PEI have smoke density (Ds-4) values (Ds-4 of 493 at 30% PEI as measured according to ISO5659-2 on a 3 mm thick plaque at 50 kW/m², Ex29) below 600, making them suitable for EN-45545 type applications (for R6 applications qualifying for HL1 compliance, a Ds-4 smoke density at or below 600 is required at 50 kW/m²), provided that the other required properties (e.g. heat release) meet the requirements as well, whereas formulations without PEI do not meet these requirements (see CEx27, having Ds-4 of 1320 as measured according to ISO5659-2 on a 3 mm thick plaque at 50 kW/m², which would fail to meet even HL-1, requiring Ds-4<600 for R6 applications at 50 kW/m²). However, these compositions do not meet the Hazard level 2 or even Hazard level 3 requirements of the EN45545 rail standard (2013) for R1 or R6 applications for smoke density (DS-4<300 at 50 kW/m² for HL2 and DS-4<150 at 50 kW/m² for HL3) at any hazard level. Therefore, these compositions are not suitable for seat components or claddings requiring meeting HL2 or HL3 requirements of the EN45545 standard.

Examples 36-39

Examples 36-39 show that the addition of an aromatic organophosphorus compound (BPADP) to compositions of PEI in a polycarbonate copolymer results in a further unexpected combination of properties. Results and formulations are shown in Table 11.

TABLE 11

|  | Unit | Ex36 | Ex37 | CEX38 | Ex39 |
|---|---|---|---|---|---|
| Component |  |  |  |  |  |
| ITR-PC-siloxane | % | 43.92 | 40.17 | 49.97 |  |
| ITR-PC | % | 43.92 | 40.17 | 49.97 | 80.34 |
| PEPQ | % | 0.06 | 0.06 | 0.06 | 0.06 |
| Coated TiO₂ | % | 2.00 | 2.00 | 2.0 | 2.00 |
| Carbon black | % | 0.10 | 0.10 | 0.10 | 0.10 |
| BPADP | % | 0 | 7.5 | 0 | 7.50 |
| PEI | % | 10 | 10 | 0 | 10 |
| Properties |  |  |  |  |  |
| INI, 23° C., 5.5 J | kJ/m² | 18 | 10 | 12 | 9 |
| MAI, 23° C., 4.4 m/s | J | 126 | 139 | 125 | 120 |
| MAI, ductility % | % | 100 | 100 | 100 | 100 |
| Vicat B120 | ° C. | 137 | 122 | 152 | 122 |
| MVR, 300° C., 1.2 kg | Cc/10' | 6.9 | 12.1 | 4.2 | 16.8 |
| DS-4 | — | 111 | 117 | 158 | 121 |
| MAHRE | kW/m² | 83 | 43 | 96 | 49 |

The results show that the combination of a phosphorus-containing compound (BPADP) and PEI to compositions containing ITR-PC and ITR-PC-Si provides a significant decrease in the MAHRE properties compared to the composition without BPADP (with PEI in the formulation), lowering from a MAHRE of 83 kW/m² (CEx36) to 43 kW/m² (Ex37), as measured according to ISO5660-1 on a 3 mm thick plaque at 50 kW/m². Also for compositions containing ITR-PC and PEI (Ex40), the addition of the phosphorus-containing compound (BPADP) provides similar low MAHRE values (49 kW/m²), as measured according to ISO5660-1 on a 3 mm thick plaque at 50 kW/m². The addition of the phosphorus containing compound does not adversely affect smoke density (Ds-4), with similar values with BPADP (Ds-4 of 111, CEx36) and without BPADP (Ds-4 of 117, Ex37), all measured according to ISO5659-2 on a 3 mm thick plaque at 50 kW/m².

The addition of BPADP does not negatively affect practical impact, as compositions containing ITR-PC, ITR-PC-Si, PEI and BPADP (Ex37) still have high MAI energy values (139 J) and ductility (100%), as measured according to ISO 6603 on 3.2 mm thick discs, comparable to the same composition without BPADP (Ex36). Also the composition containing ITR-PC, PEI and BPADP (Ex39) still have high MAI energy values (120 J) and ductility (100%), as measured according to ISO 6603 on 3.2 mm thick discs.

Furthermore, BPADP addition to these compositions increases the melt flow of the compositions compared to the composition without BPADP, resulting in MVR measured at 300° C. and 1.2 kg of 12.1 and 16.8 cc/10 minutes for Ex37 and Ex39 respectively.

The low heat release (MAHRE) and smoke density (Ds-4) make the components made of compositions containing ITR-PC, PEI and BPADP or containing ITR-PC-Si, ITR-PC, PEI and BPADP capable of meeting the requirements of the most strict hazard level (HL3) for R6 applications in European Railway standard EN-45545, which requires MAHRE of equal to or less than 60 kW/m², as measured according to ISO5660-1 on a 3 mm thick plaque at 50 kW/m², and Ds-4 equal to or less than 150, as measured according to ISO5659-2 on a 3 mm thick plaque at 50 kW/m². Furthermore, these compositions retain good practical impact properties and have excellent melt flow.

Example 40

Example 40 shows the smoke density, measured according to ISO5659-1, heat release, measured according to ISO5660-2 and flame spread measured according to ISO 5658-2, as well as physical properties. All were measured at 3 mm thickness of compositions containing ITR-PC, ITR-PC-Si and 10% of PEI. Formulations and results are shown in Table 12.

TABLE 12

|  | Unit | Ex40 |
|---|---|---|
| Component |  |  |
| ITR-PC-siloxane | % | 43.92 |
| ITR-PC | % | 43.92 |
| PEPQ | % | 0.06 |
| Coated $TiO_2$ | % | 2.00 |
| Carbon black | % | 0.10 |
| BPADP | % | 0 |
| PEI | % | 10 |
| Properties |  |  |
| INI, 23° C., 5.5 J | $kJ/m^2$ | 18 |
| MAI, 23° C., 4.4 m/s | J | 126 |
| MAI, ductility % | % | 100 |
| Vicat B120 | ° C. | 137 |
| MVR, 300° C., 1.2 kg | Cc/10' | 6.9 |
| DS-4 | — | 111 |
| MAHRE | $kW/m^2$ | 83 |
| CFE | $kW/m^2$ | 22.4 |

As shown in Table 12, the compositions containing ITR-PC, ITR-PC-Si and 10% of PEI has low Ds-4 values (111) as measured according to ISO5659-2 at 50 $kW/m^2$, low heat release values (MAHRE of 83 $kW/m^2$) as measured according to ISO 5660-1 at 50 $kW/m^2$ and excellent flame spread properties (CFE of 22.4 $kW/m^2$) as measured according to ISO 5658-1, all measured at 3 mm thickness.

Therefore these materials are also suitable for Hazard Level 2 (HL-2) (Ds-4≤300 at 50 $kW/m^2$, CFE>20 $kW/m^2$ and MAHRE≤90 $kW/m^2$ at 50 $kW/m^2$) or potentially even HL-3 (Ds-4≤150 at 50 $kW/m^2$, CFE>20 $kW/m^2$, and MAHRE≤60 $kW/m^2$ at 50 $kW/m^2$) in European Railway standard EN-45545 class R1 applications. Furthermore, these compositions have good melt flow properties, with an MVR of 6.9 cc/10 min, as measured at 300° C. and 1.2 kg, and good practical impact (MAI) energy (126 J) and ductility (100%), as measured according to ISO 6603 on 3.2 mm thick discs. This makes these compositions well suitable for these applications.

The Examples demonstrate the ability of these compositions to achieve a unique balance of low smoke, low flame spread and low heat release, as measured according to European Railway standard EN-45545 testing, in combination with high flow rate (MVR) and high practical multiaxial impact (MAI) at room temperature, which could not be achieved for compositions without PEI.

Table 13 summarizes the interaction parameter values obtained for the compositions showing the nonlinear effect of PEI addition on smoke density of various polycarbonate copolymers and their combinations.

TABLE 13

| Composition | Interaction Parameter (k) |
|---|---|
| ITR-PC | 52.7 |
| ITR-PC/ITR-PC-Si | 16.4 |
| PC1 | 4.4 |

As shown in Table 13, where a nonlinear effect is observed, the interaction parameter has a value of greater than 4. Using the k interaction parameters, it is possible to calculate the fractional concentration of PEI necessary to bring a given thermoplastic composition to meet the various Hazard Levels under EN 45545 European Rail standard (2013) requirements.

Examples 41-46

These comparative examples show that meeting the smoke density and heat release requirements of the EN45545 standard is not possible with regular flame retardant polycarbonate/acrylonitrile-butadiene-styrene blends and flame retardant polycarbonate resins. Formulations and results are shown in Table 14.

TABLE 14

| Component | Unit | CEx 41 | CEx 42 | CEx 43 | CEx 44 | CEx 45 | CEx 46 |
|---|---|---|---|---|---|---|---|
| PC1 | % |  | 64.83 | 51.84 | 87.55 |  | 46.78 |
| PC2 | % |  | 34.59 | 47.53 |  |  |  |
| PC3 | % | 87.40 |  |  |  |  |  |
| PC105B | % |  |  |  | 12.00 |  | 1.00 |
| SiPC2 | % |  |  |  |  | 92.5 | 46.78 |
| KSS | % |  |  | 0.03 | 0.10 |  | 0.25 |
| Rimar | % |  | 0.08 |  |  |  | 0.08 |
| Octaphenylcyclotetrasiloxane | % |  | 0.10 |  |  |  |  |
| BPADP | % | 8.00 |  |  |  | 7.50 | 5.00 |
| PTFE | % | 0.20 |  |  |  |  |  |
| ABS R360 | % | 4.00 |  |  |  |  |  |
| Standard additives | % | 0.40 | 0.40 | 0.60 | 0.35 |  | 0.12 |
| Property |  |  |  |  |  |  |  |
| Smoke density, DS-4 | — | 1320 | 1123 | 1320 | 1320 | 610 | 814 |
| Heat release, MAHRE | $kW/m^2$ | 140 | NA | NA | NA | 153 | 211 |

Comparative example 41 is a typical example of a flame retardant polycarbonate/acrylonitrile-butadiene-styrene (PC/ABS) blend. The composition has the maximum measurable smoke density value (DS-4) of 1320 at 50 kW/m$^2$ and a heat release (MAHRE) of 140 kW/m$^2$ at 50 kW/m$^2$, which do not meet the EN45545 rail standard (2013) thresholds for R1 or R6 applications for smoke density (DS-4<600 for HL-1, DS-4<300 for HL2 and DS-4<150 for HL3, all at 50 kW/m$^2$) and also do not meet the EN45545 rail standard (2013) thresholds for heat release (MAHRE<90 kW/m$^2$ for HL2 and MAHRE<60 kW/m$^2$ for HL3, all at 50 kW/m$^2$). Therefore, flame retardant polycarbonate/acrylonitrile-butadiene-styrene (PC/ABS) blends are not suitable for seat components or claddings requiring meeting HL2 or HL3 requirements of the EN45545 standard.

Comparative examples 42 to 44 are typical examples of flame retardant bisphenol A polycarbonate resins. All compositions have high smoke density values (Ds-4) above 1000 at 50 kW/m$^2$, which do not meet the EN45545 rail standard (2013) thresholds for R1 or R6 applications for smoke density (DS-4<600 for HL-1, DS-4<300 for HL2 and DS-4<150 for HL3, all at 50 kW/m$^2$) at any hazard level. Therefore, flame retardant polycarbonate resins are not suitable for seat components or claddings requiring meeting HL2 or HL3 requirements of the EN45545 standard.

Comparative examples 45 to 46 are examples of flame retardant poly(carbonate-siloxane) resins. All compositions have high smoke density values (Ds-4) above 600 at 50 kW/m$^2$, which do not meet the EN45545 rail standard (2013) thresholds for R1 or R6 applications for smoke density (DS-4<600 for HL-1, DS-4<300 for HL2 and DS-4<150 for HL3, all at 50 kW/m$^2$) at any hazard level. Furthermore, these compositions have heat release (MAHRE) values above 150 kW/m$^2$ at 50 kW/m$^2$, which do not meet the EN45545 rail standard (2013) thresholds for heat release (MAHRE<90 kW/m$^2$ for HL2 and MAHRE<60 kW/m$^2$ for HL3, all at 50 kW/m$^2$). Therefore, flame retardant poly(carbonate-siloxane) resins are not suitable for seat components or claddings requiring meeting HL2 or HL3 requirements of the EN45545 standard.

Examples 47-48

These comparative examples show that meeting the smoke density and heat release requirements of the EN45545 standard is possible with certain high heat polymers, but that these polymers do not have a suitable property profile for rail interior applications. Formulations and results are shown in Table 15.

TABLE 15

| | Unit | CEx 47 | CEx 48 |
|---|---|---|---|
| Component | | | |
| PEI | % | 100 | |
| PPSU | % | | 100 |
| Property | | | |
| Smoke density, DS-4 | — | 76 | 67 |
| Heat release, MAHRE | kW/m$^2$ | 43 | 15 |
| MVR, 300' C., 1.2 kg | Cc/10 min | Cannot be measured | Cannot be measured |
| MV, 300' C., 1500 s-1 | Pa · s | Cannot be measured | Cannot be measured |
| MAI, RT, ductility | % | 0 | 0 |
| Glass transition temperature | ° C. | 216 | 220 |

Comparative examples 47 and 48 show that both PEI and PPSU have very low smoke density (Ds-4) values around 60-70 at 50 kW/m$^2$ and low heat release (MAHRE) values of 43 and 15 kW/m$^2$ respectively at 50 kW/m$^2$. As such, these resins are fully compliant with the HL2 or HL3 requirements for R1 and R6 applications according to EN45545 for smoke density (DS-4<300 for HL2 and DS-4<150 for HL3, all at 50 kW/m$^2$) and heat release (MAHRE<90 kW/m$^2$ for HL2 and MAHRE<60 kW/m$^2$ for HL3, all at 50 kW/m$^2$).

However, these resins both have limited practical impact properties, as indicated by their 0% ductility in MAI testing at room temperature. Furthermore, due to their high glass transition temperatures of 216 and 220° C. respectively, the melt flow is limited, such that MVR and MV values cannot be measured at 300° C., which makes these resins less suitable for molding of large and complex parts, using conventional tooling for PC/ABS and PC resins, which have glass transition temperatures of 150° C. and lower, depending on the composition. Furthermore, the high glass transition temperatures of these resins make them very difficult to form using for instance thermoforming.

As such, despite meeting the HL2 or HL3 requirements for R1 and R6 applications according to EN45545 for smoke density (DS-4<300 for HL2 and DS-4<150 for HL3, all at 50 kW/m$^2$) and heat release (MAHRE<90 kW/m$^2$ for HL2 and MAHRE<60 kW/m$^2$ for HL3, all at 50 kW/m$^2$), these resins are less suitable for molding or forming of rail interior applications.

The singular forms "a," "an," and "the" include plural referents unless the context clearly dictates otherwise. "Or" means "and/or." The endpoints of all ranges directed to the same component or property are inclusive and independently combinable. The suffix "(s)" as used herein is intended to include both the singular and the plural of the term that it modifies, thereby including at least one of that term (e.g., "colorant(s)" includes at least one colorant). "Optional" or "optionally" means that the subsequently described event or circumstance can or cannot occur, and that the description includes instances where the event occurs and instances where it does not. Unless defined otherwise, technical and scientific terms used herein have the same meaning as is commonly understood by one of skill in the art to which this invention belongs.

As used herein, a "combination" is inclusive of blends, mixtures, alloys, reaction products, and the like. Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

As used herein, the term "hydrocarbyl" and "hydrocarbon" refers broadly to a substituent comprising carbon and hydrogen, optionally with 1 to 3 heteroatoms, for example, oxygen, nitrogen, halogen, silicon, sulfur, or a combination comprising at least one of the foregoing; "alkyl" refers to a straight or branched chain, saturated monovalent hydrocarbon group; "alkylene" refers to a straight or branched chain, saturated, divalent hydrocarbon group; "alkylidene" refers to a straight or branched chain, saturated divalent hydrocarbon group, with both valences on a single common carbon atom; "alkenyl" refers to a straight or branched chain monovalent hydrocarbon group having at least two carbons joined by a carbon-carbon double bond; "cycloalkyl" refers to a non-aromatic monovalent monocyclic or multicylic hydrocarbon group having at least three carbon atoms, "cycloalkenyl" refers to a non-aromatic cyclic divalent hydrocarbon group having at least three carbon atoms, with at least one degree of unsaturation; "aryl" refers to an aromatic monovalent group containing only carbon in the aromatic ring or rings; "arylene" refers to an aromatic divalent group containing only carbon in the aromatic ring or rings; "alkylaryl" refers to an aryl group that has been substituted with an alkyl group as defined above, with 4-methylphenyl being an exemplary alkylaryl group; "arylalkyl" refers to an alkyl group that has been substituted with an aryl group as defined above, with benzyl being an exemplary arylalkyl group; "acyl" refers to an alkyl group as defined above with the indicated number of carbon atoms attached through a carbonyl carbon bridge (—C(=O)—); "alkoxy" refers to an alkyl group as defined above with the indicated number of carbon atoms attached through an oxygen bridge (—O—); and "aryloxy" refers to an aryl group as defined above with the indicated number of carbon atoms attached through an oxygen bridge (—O—).

Unless otherwise indicated, each of the foregoing groups can be unsubstituted or substituted, provided that the substitution does not significantly adversely affect synthesis, stability, or use of the compound. The term "substituted" as used herein means that at least one hydrogen on the designated atom or group is replaced with another group, provided that the designated atom's normal valence is not exceeded. When the substituent is oxo (i.e., =O), then two hydrogens on the atom are replaced. Combinations of substituents and/or variables are permissible provided that the substitutions do not significantly adversely affect synthesis or use of the compound. Exemplary groups that can be present on a "substituted" position include, but are not limited to, cyano; hydroxyl; nitro; azido; alkanoyl (such as a $C_{2-6}$ alkanoyl group such as acyl); carboxamido; $C_{1-6}$ or $C_{1-3}$ alkyl, cycloalkyl, alkenyl, and alkynyl (including groups having at least one unsaturated linkages and from 2 to 8, or 2 to 6 carbon atoms); $C_{1-6}$ or $C_{1-3}$ alkoxy groups; $C_{6-10}$ aryloxy such as phenoxy; $C_{1-6}$ alkylthio; $C_{1-6}$ or $C_{1-3}$ alkylsulfinyl; $C_{1-6}$ or $C_{1-3}$ alkylsulfonyl; aminodi($C_{1-6}$ or $C_{1-3}$)alkyl; $C_{6-12}$ aryl having at least one aromatic rings (e.g., phenyl, biphenyl, naphthyl, or the like, each ring either substituted or unsubstituted aromatic); $C_{7-19}$ alkylenearyl having 1 to 3 separate or fused rings and from 6 to 18 ring carbon atoms, with benzyl being an exemplary arylalkyl group; or arylalkoxy having 1 to 3 separate or fused rings and from 6 to 18 ring carbon atoms, with benzyloxy being an exemplary arylalkoxy group.

All references cited herein are incorporated by reference in their entirety. While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A railway component,
wherein the component is a molded or extruded seat component, comprising a thermoplastic composition comprising, based on the total weight of the composition:
69 to 90 wt. % of a first polymer comprising bisphenol A carbonate units and monoaryl arylate units, and a second polymer comprising bisphenol A carbonate units, monoaryl arylate units, and siloxane units;
10 to 30 wt. % of a polyetherimide;
optionally, up to 5 wt. % of an additive selected from a processing aid, a heat stabilizer, an ultra violet light absorber, a colorant, or a combination comprising at least one of the foregoing; and
optionally, 2 to 12 wt. % of an organophosphorus compound in an amount effective to provide 0.1 to 1.0 wt. % of phosphorus, based on the total weight of the thermoplastic polymer composition,
wherein
the bisphenol A carbonate units are of the formula

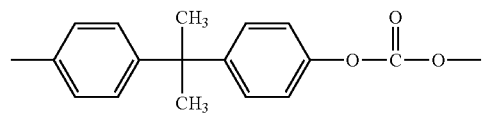

the monoaryl arylate units are of the formula

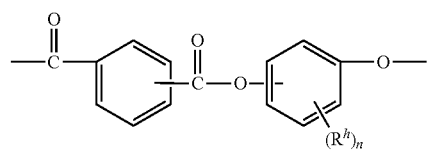

wherein each $R^h$ is independently a halogen atom, a $C_{1-10}$ hydrocarbyl and n is 0 to 4; and
the siloxane units are of the formula

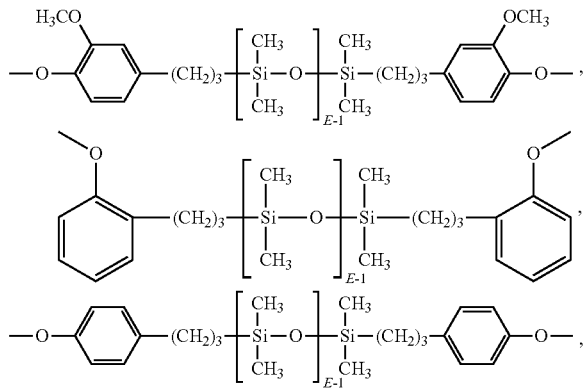

or a combination comprising at least one of the foregoing, wherein E has an average value of 2 to 90;
wherein a sample of the thermoplastic composition has:
a smoke density after 4 minutes (Ds-4) of equal to or less than 150 measured in accordance with ISO 5659-2 on a 3 mm thick plaque at 50 kW/m$^2$,
an integral of the smoke density as a function of time up to 4 minutes (VOF4) of equal to or less than 300 measured in accordance with ISO 5659-2 on a 3 mm thick plaque at 50 kW/m$^2$,
a maximum average heat release (MAHRE) of equal to or less than 90 kW/m$^2$ measured in accordance with ISO 5660-1 on a 3 mm thick plaque at 50 kW/m$^2$, and
a ductility in multiaxial impact of 80% to 100%, measured at 23° C. at an impact speed of 4.4 m/second in accordance with ISO 6603 on 3.2 mm thick discs.

2. The railway component of claim 1, wherein a sample of the thermoplastic composition has:

a smoke density after 4 minutes (Ds-4) of equal to or less than 150 measured in accordance with ISO 5659-2 on a 3 mm thick plaque at 50 kW/m², 
an integral of the smoke density as a function of time up to 4 minutes (VOF4) of equal to or less than 300 measured in accordance with ISO 5659-2 on a 3 mm thick plaque at 50 kW/m²,
a maximum average heat release (MAHRE) of equal to or less than 60 kW/m² measured in accordance with ISO 5660-1 on a 3 mm thick plaque at 50 kW/m², and
a ductility in multiaxial impact of 80% to 100%, measured at +23° C. at an impact speed of 4.4 m/second in accordance with ISO 6603 on 3.2 mm thick discs.

3. The railway component of claim 1, wherein the first polymer comprises:
2 to 20 mol % of bisphenol-A carbonate units,
60 to 98 mol % of isophthalic acid-terephthalic acid-resorcinol ester units of the formula

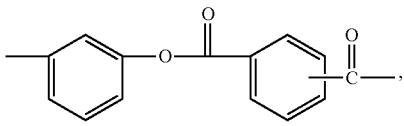

and
optionally, 1 to 20 mol % resorcinol carbonate units of the formula

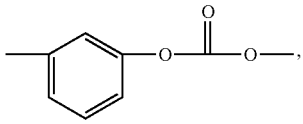

isophthalic acid-terephthalic acid-bisphenol-A ester units of the formula

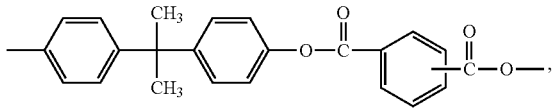

or a combination comprising at least one of the foregoing.

4. The railway component of claim 1, wherein the first polymer comprises units of the formula

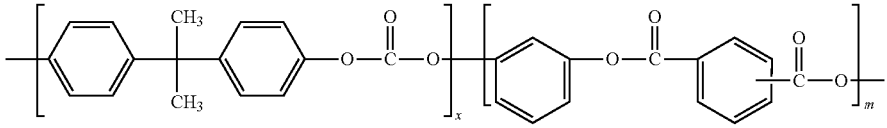

wherein m is 4 to 100, and the mole ratio of x:m is 99:1 to 1:99.

5. The railway component of claim 1, wherein the second polymer comprises
1 to 40 mol % of the bisphenol A carbonate units,
50 to 95 mol % of the isophthalic acid-terephthalic acid-resorcinol units, and
the siloxane units in an amount effective to provide 0.1 to 10 wt. % of siloxane units, based on the weight of the second polymer, wherein E has an average value of 2 to 50.

6. The railway component of claim 1, wherein the polyetherimide comprises units of the formula

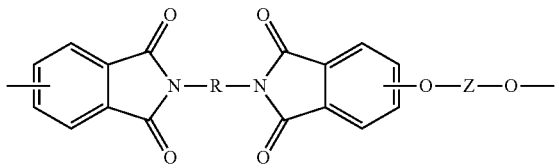

wherein
R is a $C_{2-20}$ hydrocarbon group, and
Z is an aromatic $C_{6-24}$ monocyclic or polycyclic group optionally substituted with 1 to 6 $C_{1-8}$ alkyl groups, 1 to 8 halogen atoms, or a combination comprising at least one of the foregoing, wherein the divalent bonds of the —O—Z—O— group are in the 3,3', 3,4', 4,3', or the 4,4' positions.

7. The railway component of claim 6, wherein R is m-phenylene and Z is 2,2-bis(1',4'-phenylene)isopropylidene.

8. The railway component of claim 1, wherein the component is injection molded, and the thermoplastic composition has a melt volume flow rate of equal to or greater than 4 cc/10 min measured at 300° C. under 1.2 kg force measured according to ISO 1133.

9. The railway component of claim 1, wherein the component is extruded, and the thermoplastic composition has a Vicat B120 of less than 160° C. measured according to ISO 306.

10. The railway component of claim 1, wherein the organophosphorus compound is an aromatic organophosphorus compound having at least one organic aromatic group and at least one phosphorus-containing group, or an organic compound having at least one phosphorus-nitrogen bond.

11. The railway component of claim 10, wherein the organophosphorus compound is bisphenol A bis(diphenyl phosphate), triphenyl phosphate, resorcinol bis(diphenyl phosphate), tricresyl phosphate, a phenol/bi-phenol polyphosphate, or a combination comprising at least one of the foregoing.

12. The railway component of claim 10, wherein organophosphorus compound containing a nitrogen-phosphorus bond is a phosphazene, phosphorus ester amide, phosphoric acid amide, phosphonic acid amide, phosphinic acid amide, tris(aziridinyl) phosphine oxide, a combination comprising at least one of the foregoing.

13. The railway component of claim 1, wherein no or substantially no flame retarding brominated compounds, flame retardant salts, or a combination comprising at least one of the foregoing are present in the thermoplastic composition.

14. The railway component of claim 1, wherein the thermoplastic composition further comprises 0.05 to 5.0 wt.

% of a light diffuser additive comprising silicone, polymethylsilsesquioxane, crosslinked poly(methyl methacrylate), methyl methacrylate/ethyleneglycol dimethacrylate copolymer, TiO$_2$, or a combination comprising at least one of the foregoing.

15. The railway component of claim 1, wherein the thermoplastic composition further comprises 0.00002 to 5.0 wt. % of one or more colorants based on the total weight of the polymers in the thermoplastic composition.

16. The railway component of claim 1, wherein the thermoplastic composition comprises, based on the total weight of the composition,
80 to 90 wt. % of a combination comprising, based on the weight of the combination,
20 to 80 wt. % of a poly(bisphenol-A carbonate)-co-poly(isophthalate-terephthalate-resorcinol ester) of the formula

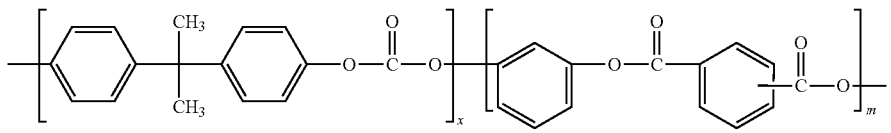

wherein m is 4 to 100, and the mole ratio of x:m is 99:1 to 1:99, and
20 to 80 wt. % of a poly(bisphenol-A carbonate)-co-poly(isophthalate-terephthalate-resorcinol ester)-co-poly(siloxane) comprising
1 to 40 mol % of the bisphenol A carbonate units,
50 to 95 mol % of the isophthalic acid-terephthalic acid-resorcinol units, and
the siloxane units in an amount effective to provide 0.1 to 10 wt. % of siloxane units, based on the weight the poly(bisphenol-A carbonate)-co-poly(isophthalate-terephthalate-resorcinol ester)-co-poly(siloxane), wherein E has an average value of 2 to 30;
10 to 20 wt. % of a polyetherimide comprising units of the formula

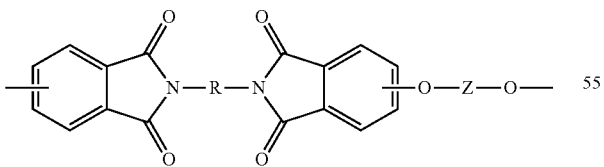

wherein R is m-phenylene and Z is 2,2-bis(1',4'-phenylene) isopropylidene;
optionally, 2 to 12 wt. % of bisphenol A bis(diphenyl phosphate); and
optionally, up to 5 wt. % of an additive selected from a processing aid, a heat stabilizer, an ultra violet light absorber, a colorant, or a combination comprising at least one of the foregoing;

wherein a sample of the thermoplastic composition has:
a smoke density after 4 minutes (Ds-4) of equal to or less than 150 measured in accordance with ISO 5659-2 on a 3 mm thick plaque at 50 kW/m$^2$,
an integral of the smoke density as a function of time up to 4 minutes (VOF4) of equal to or less than 300 measured in accordance with ISO 5659-2 on a 3 mm thick plaque at 50 kW/m$^2$,
a maximum average heat release (MAHRE) of equal to or less than 90 kW/m$^2$ measured in accordance with ISO 5660-1 on a 3 mm thick plaque at 50 kW/m$^2$, and
a ductility in multiaxial impact of 80% to 100%, measured at 23° C. at an impact speed of 4.4 m/second in accordance with ISO 6603 on 3.2 mm thick discs.

17. The railway component of claim 1, wherein the thermoplastic composition comprises, based on the weight of the thermoplastic composition,
80 to 90 wt. % of a combination comprising, based on the weight of the combination,
20 to 80 wt. % of a poly(bisphenol-A carbonate)-co-poly(isophthalate-terephthalate-resorcinol ester) of the formula

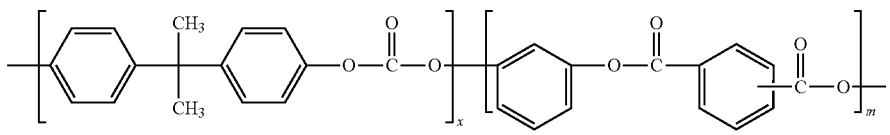

wherein m is 4 to 100, and the mole ratio of x:m is 99:1 to 1:99, and
20 to 80 wt. % of a poly(bisphenol-A carbonate)-co-poly(isophthalate-terephthalate-resorcinol ester)-co-poly(siloxane) comprising,
1 to 40 mol % of the bisphenol A carbonate units,
50 to 95 mol % of the isophthalic acid-terephthalic acid-resorcinol units, and
the siloxane units in an amount effective to provide 0.1 to 10 wt. % of siloxane units, based on the weight of the poly(bisphenol-A carbonate)-co-poly(isophthalate-terephthalate-resorcinol ester)-co-poly(siloxane), wherein E has an average value of 2 to 30;
10 to 20 wt. % of a polyetherimide comprising units of the formula

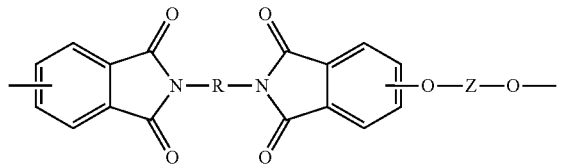

wherein R is m-phenylene and Z is 2,2-bis(1',4'-phenylene)isopropylidene;
2 to up to 12 wt. % of bisphenol A bis(diphenyl phosphate); and
optionally, up to 5 wt. % of an additive selected from a processing aid, a heat stabilizer, an ultra violet light absorber, a colorant, or a combination comprising at least one of the foregoing;
wherein a molded sample of the thermoplastic composition has:
a smoke density after 4 minutes (Ds-4) of equal to or less than 150 measured in accordance with ISO 5659-2 on a 3 mm thick plaque at 50 kW/m$^2$,
an integral of the smoke density as a function of time up to 4 minutes (VOF4) of equal to or less than 300 measured in accordance with ISO 5659-2 on a 3 mm thick plaque at 50 kW/m$^2$,
a maximum average heat release (MAHRE) of equal to or less than 60 kW/m$^2$ measured in accordance with ISO 5660-1 on a 3 mm thick plaque at 50 kW/m$^2$, and
a ductility in multiaxial impact of 80% to 100%, measured at 23° C. at an impact speed of 4.4 m/second in accordance with ISO 6603 on 3.2 mm thick discs.

18. A railway component,
wherein the component is an extruded or molded interior train cladding comprising a thermoplastic composition comprising, based on the total weight of the composition:
69 to 90 wt. % of a first polymer comprising bisphenol A carbonate units and monoaryl arylate units and a second polymer comprising bisphenol A carbonate units, monoaryl arylate units, and siloxane units;
10 to 30 wt. % of a polyetherimide;
optionally, up to 5 wt. % of an additive selected from a processing aid, a heat stabilizer, an ultra violet light absorber, a colorant, or a combination comprising at least one of the foregoing; and
optionally an organophosphorus compound in an amount effective to provide 0.1 to 1.0 wt. % of phosphorus, based on the total weight of the thermoplastic polymer composition,
wherein
the bisphenol A carbonate units are of the formula

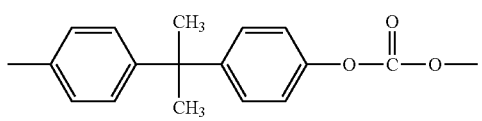

the monoaryl arylate units are of the formula

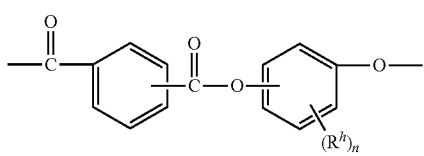

wherein each R$^h$ is independently a halogen atom, a C$_{1-10}$ hydrocarbyl and n is 0 to 4; and
the siloxane units are of the formula

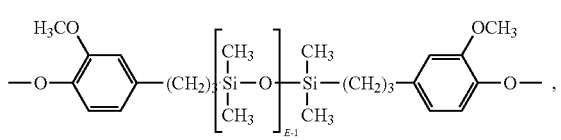

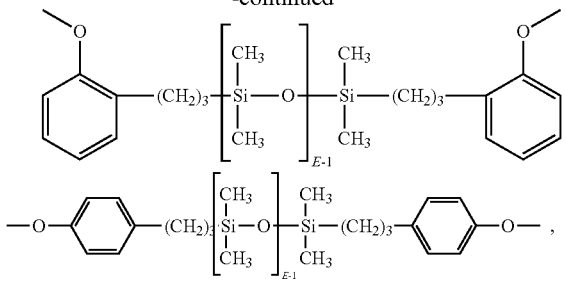

or a combination comprising at least one of the foregoing, wherein E has an average value of 2 to 90;
wherein a sample of the thermoplastic composition has:
a smoke density after 4 minutes (Ds-4) of equal to or less than 150 measured in accordance with ISO 5659-2 on a 3 mm thick plaque at 50 kW/m$^2$,
an integral of the smoke density as a function of time up to 4 minutes (VOF4) of equal to or less than 300 measured in accordance with ISO 5659-2 on a 3 mm thick plaque at 50 kW/m$^2$,
a maximum average heat release (MAHRE) of equal to or less than 90 kW/m$^2$ measured in accordance with ISO 5660-1 on a 3 mm thick plaque at 50 kW/m$^2$,
a critical heat flux at extinguishment (CFE) of equal to or greater than 20 kW/m$^2$ measured in accordance with ISO 5658-2 on a 3 mm thick plaque, and
a ductility in multiaxial impact of 80% to 100%, measured at 23° C. at an impact speed of 4.4 m/second in accordance with ISO 6603 on 3.2 mm thick discs.

19. The railway component of claim 18,
wherein a sample of the thermoplastic composition has:
a smoke density after 4 minutes (Ds-4) of equal to or less than 150 measured in accordance with ISO 5659-2 on a 3 mm thick plaque at 50 kW/m$^2$,
an integral of the smoke density as a function of time up to 4 minutes (VOF4) of equal to or less than 300 measured in accordance with ISO 5659-2 on a 3 mm thick plaque at 50 kW/m$^2$,
a maximum average heat release (MAHRE) of equal to or less than 60 kW/m$^2$ measured in accordance with ISO 5660-1 on a 3 mm thick plaque at 50 kW/m$^2$,
a critical heat flux at extinguishment (CFE) of equal to or greater than 20 kW/m$^2$ measured in accordance with ISO 5658-2 on a 3 mm thick plaque, and
a ductility in multiaxial impact of 80% to 100%, measured at 23° C. at an impact speed of 4.4 m/second in accordance with ISO 6603 on 3.2 mm thick discs.

20. The railway component of claim 18, wherein the component is injection molded, and the thermoplastic composition has a melt volume flow rate of equal to or greater than 4 cc/10 min measured at 300° C. under 1.2 kg force measured according to ISO 1133.

21. The railway component of claim 18, wherein the component is extruded, and the thermoplastic composition has a Vicat B120 of less than 160° C. measured according to ISO 306.

22. The railway component of claim 18, wherein the first polymer comprises:
2 to 20 mol % of bisphenol-A carbonate units,
60 to 98 mol % of isophthalic acid-terephthalic acid-resorcinol ester units of the formula

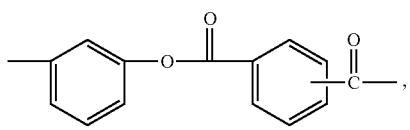

and
optionally, 1 to 20 mol % resorcinol carbonate units of the formula

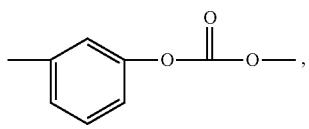

isophthalic acid-terephthalic acid-bisphenol-A ester units of the formula

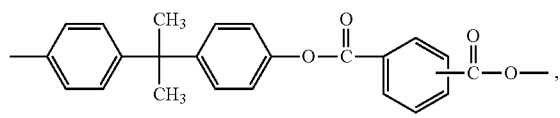

or a combination comprising at least one of the foregoing.

23. The railway component of claim 18, wherein the first polymer comprises units of the formula

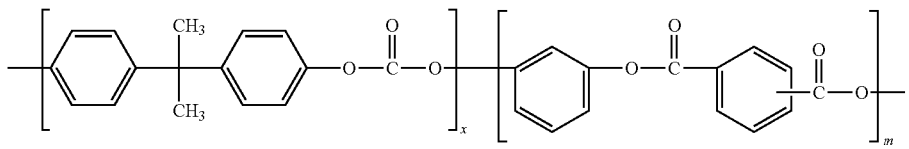

wherein m is 4 to 100, and the mole ratio of x:m is 99:1 to 1:99.

24. The railway component of claim 18, wherein the second polymer comprises
1 to 40 mol % of the bisphenol A carbonate units,
50 to 95 mol % of the isophthalic acid-terephthalic acid-resorcinol units, and
the siloxane units in an amount effective to provide 0.1 to 10 wt. % of siloxane units, based on the weight of the polymer, wherein E has an average value of 2 to 30.

25. The railway component of claim 18, wherein the polyetherimide comprises units of the formula

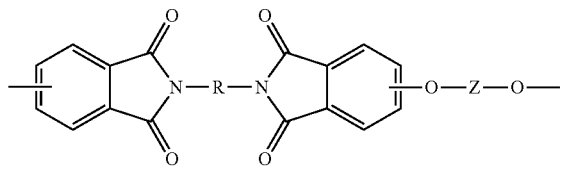

wherein
R is a $C_{2-20}$ hydrocarbon group, and
Z is an aromatic $C_{6-24}$ monocyclic or polycyclic group optionally substituted with 1 to 6 $C_{1-8}$ alkyl groups, 1 to 8 halogen atoms, or a combination comprising at least one of the foregoing, wherein the divalent bonds of the —O—Z—O— group are in the 3,3', 3,4', 4,3', or the 4,4' positions.

26. The railway component of claim 25, wherein R is m-phenylene and Z is 2,2-bis(1',4'-phenylene)isopropylidene.

27. The railway component of claim 18, wherein the organophosphorus compound is an aromatic organophosphorus compound having at least one organic aromatic group and at least one phosphorus-containing group, or an organic compound having at least one phosphorus-nitrogen bond.

28. The railway component of claim 27, wherein the organophosphorus compound is bisphenol A bis(diphenyl phosphate), triphenyl phosphate, resorcinol bis(diphenyl phosphate), tricresyl phosphate, a phenol/bi-phenol polyphosphate, or a combination comprising at least one of the foregoing.

29. The railway component of claim 27, wherein organophosphorus compound containing a nitrogen-phosphorus bond is a phosphazene, phosphorus ester amide, phosphoric acid amide, phosphonic acid amide, phosphinic acid amide, tris(aziridinyl) phosphine oxide, a combination comprising at least one of the foregoing.

30. The railway component of claim 18, wherein no or substantially no flame retarding brominated compounds, flame retardant salts, or a combination comprising at least one of the foregoing are present in the thermoplastic composition.

31. The railway component of claim 18, wherein the thermoplastic composition further comprises 0.05 to 5.0 wt. % of a light diffuser additive comprising silicone, polymethylsilsesquioxane, crosslinked poly(methyl methacrylate), methyl methacrylate/ethyleneglycol dimethacrylate copolymer, $TiO_2$, or a combination comprising at least one of the foregoing.

32. The railway component of claim 18, wherein the thermoplastic composition further comprises 0.00002 to 5.0 wt. % of a colorant based on the total weight of the polymers in the thermoplastic composition.

33. The railway component of claim 18, wherein the thermoplastic composition comprises, based on the total weight of the composition,
80 to 90 wt. % of a combination comprising, based on the weight of the combination,
20 to 80 wt. % of a poly(bisphenol-A carbonate)-co-poly(isophthalate-terephthalate-resorcinol ester) of the formula

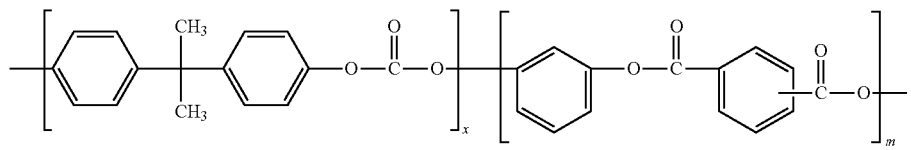

wherein m is 4 to 100, and the mole ratio of x:m is 99:1 to 1:99, and
  20 to 80 wt. % of a poly(bisphenol-A carbonate)-co-poly(isophthalate-terephthalate-resorcinol ester)-co-poly(siloxane) comprising,
    1 to 40 mol % of bisphenol A carbonate units,
    50 to 95 mol % of isophthalic acid-terephthalic acid-resorcinol units, and
    the siloxane units present in an amount effective to provide 0.1 to 10 wt. % of the siloxane units,
    based on the weight of the poly(bisphenol-A carbonate)-co-poly(isophthalate-terephthalate-resorcinol ester)-co-poly(siloxane), wherein E has an average value of 2 to 30; and
  10 to 20 wt. % of a polyetherimide comprising units of the formula

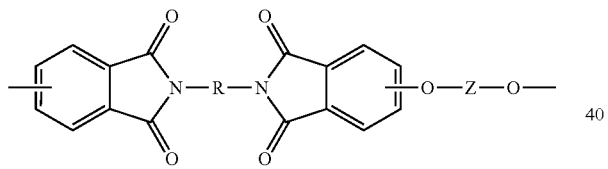

R is m-phenylene and Z is 2,2-bis(1',4'-phenylene)isopropylidene;
  0 to up to 12 wt. % of bisphenol A bis(diphenyl phosphate); and
  optionally, up to 5 wt. % of an additive selected from a processing aid, a heat stabilizer, an ultra violet light absorber, a colorant, or a combination comprising at least one of the foregoing;
wherein a sample of the thermoplastic composition has:
  a smoke density after 4 minutes (Ds-4) of equal to or less than 150 measured in accordance with ISO 5659-2 on a 3 mm thick plaque at 50 kW/m$^2$,
  an integral of the smoke density as a function of time up to 4 minutes (VOF4) of equal to or less than 300 measured in accordance with ISO 5659-2 on a 3 mm thick plaque at 50 kW/m$^2$,
  a maximum average heat release (MAHRE) of equal to or less than 90 kW/m$^2$ measured in accordance with ISO 5660-1 on a 3 mm thick plaque at 50 kW/m$^2$,
  a critical heat flux at extinguishment (CFE) of equal to or greater than 20 kW/m$^2$ measured in accordance with ISO 5658-2 on a 3 mm thick plaque, and
  a ductility in multiaxial impact of 80% to 100%, measured at 23° C. at an impact speed of 4.4 m/second in accordance with ISO 6603 on 3.2 mm thick discs.

34. The railway component of claim 18, wherein the thermoplastic composition comprises, based on the total weight of the thermoplastic composition,
  80 to 90 wt. % of a combination comprising, based on the weight of the combination,
    20 to 80 wt. % of a poly(bisphenol-A carbonate)-co-poly(isophthalate-terephthalate-resorcinol ester) of the formula

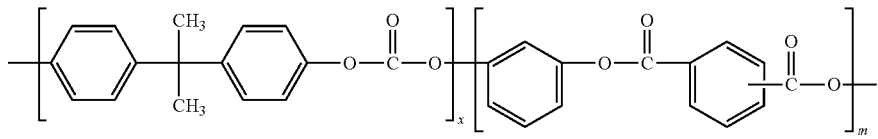

wherein m is 4 to 100, and the mole ratio of x:m is 99:1 to 1:99, and
  20 to 80 wt. % of a poly(bisphenol-A carbonate)-co-poly(isophthalate-terephthalate-resorcinol ester)-co-poly(siloxane) comprising,
    1 to 40 mol % of bisphenol A carbonate units,
    50 to 95 mol % of isophthalic acid-terephthalic acid-resorcinol units, and
    the siloxane units are present in an amount effective to provide 0.1 to 10 wt. % of siloxane units, based on the weight of the poly(bisphenol-A carbonate)-co-poly(isophthalate-terephthalate-resorcinol ester)-co-poly(siloxane), wherein E has an average value of 2 to 30;
  10 to 20 wt. % of a polyetherimide comprising units of the formula

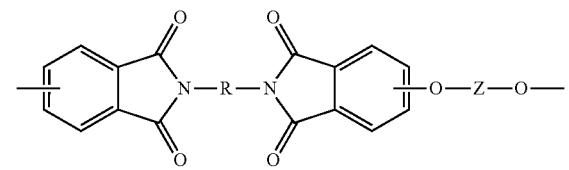

R is m-phenylene and Z is 2,2-bis(1',4'-phenylene)isopropylidene;
  2 to up to 12 wt. % of bisphenol A bis(diphenyl phosphate); and
  optionally, up to 5 wt. % of an additive selected from a processing aid, a heat stabilizer, an ultra violet light absorber, a colorant, or a combination comprising at least one of the foregoing, wherein a sample of the thermoplastic composition has:
  a smoke density after 4 minutes (Ds-4) of equal to or less than 150 measured in accordance with ISO 5659-2 on a 3 mm thick plaque at 50 kW/m$^2$, an integral of the smoke density as a function of time up to 4 minutes (VOF4) of equal to or less than 300 measured in accordance with ISO 5659-2 on a 3 mm thick plaque at 50 kW/m$^2$, a maximum average heat release (MAHRE) of equal to or less than 60 kW/m$^2$ measured in accordance with ISO 5660-1 on a 3 mm thick plaque at 50 kW/m$^2$, a critical heat flux at extinguishment (CFE) of equal to or greater than 20 kW/m$^2$ measured in accordance with ISO 5658-2 on a 3 mm thick plaque, and a ductility in multiaxial impact of 80% to 100%, measured at 23° C. at an impact speed of 4.4 m/second in accordance with ISO 6603 on 3.2 mm thick discs.

35. The railway component of claim 18, wherein the cladding is an interior vertical surface selected from room dividers, flaps, boxes, hoods and louvres; an interior door or lining for internal and external doors; a window insulation; a kitchen interior surface; an interior horizontal surface selected from ceiling paneling, flaps, boxes, hoods and louvres; a luggage storage area selected from overhead and vertical luggage racks, luggage containers and compartments; a driver's desk application selected from paneling and surfaces of driver's desk; an interior surface of gangways selected from interior sides of gangway membranes (bellows) and interior linings; a window frame; an optionally folding table with downward facing surface; an interior or exterior surface of air ducts, or a device for passenger information.

36. The railway component of claim 35, wherein the cladding is a side wall, a front wall, an end-wall, a partition, a room divider, an interior door, a window insulation, a lining, a kitchen interior surface, a ceiling panel, an overhead or vertical luggage rack, a luggage container, a luggage compartment, a window frame, an optionally folding table with downward facing surface, or an information display screen.

37. The railway component of claim 18, wherein the component is a partition, a room divider, an interior door or lining for internal and external doors, a window insulation, an overhead and vertical luggage rack, a luggage container and compartment, a window frame, an optionally folding table with downward facing surface; or a device for passenger information, wherein the thermoplastic composition comprises a light diffuser additive comprising silicone, polymethylsilsesquioxane, crosslinked poly(methyl methacrylate), methyl methacrylate/ethyleneglycol dimethacrylate copolymer, TiO$_2$, or a combination comprising at least one of the foregoing.

38. A railway component
wherein the component is a molded or extruded seat component or a molded or extruded interior train cladding, comprising a thermoplastic composition comprising, based on the total weight of the composition,
58 to 95 wt. % of a poly(bisphenol-A carbonate)-co-poly(isophthalate-terephthalate-resorcinol ester)-co-poly(siloxane) which comprises
1 to 40 mol % of bisphenol A carbonate units,
50 to 95 mol % of isophthalic acid-terephthalic acid-resorcinol units, and
the siloxane units present in an amount effective to provide 0.1 to 10 wt. % of the siloxane units, based on the weight of the poly(bisphenol-A carbonate)-co-poly(isophthalate-terephthalate-resorcinol ester)-co-poly(siloxane);

5 to 30 wt. % of a polyetherimide comprising units of the formula

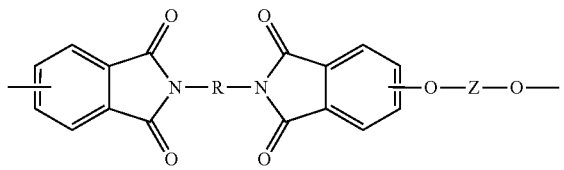

wherein R is m-phenylene and Z is 2,2-bis(1',4'-phenylene)isopropylidene;
0 to up to 12 wt. % of bisphenol A bis(diphenyl phosphate); and
optionally, up to 5 wt. % of an additive selected from a processing aid, a heat stabilizer, an ultra violet light absorber, a colorant, or a combination comprising at least one of the foregoing;
wherein
the bisphenol A carbonate units are of the formula

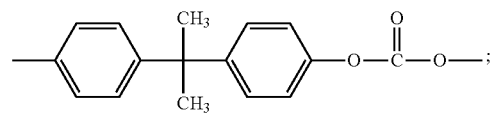

the isophthalic acid-terephthalic acid-resorcinol units are of the formula

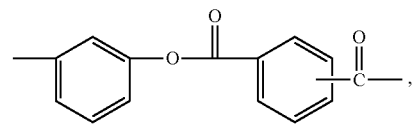

and
the siloxane units are of the formula

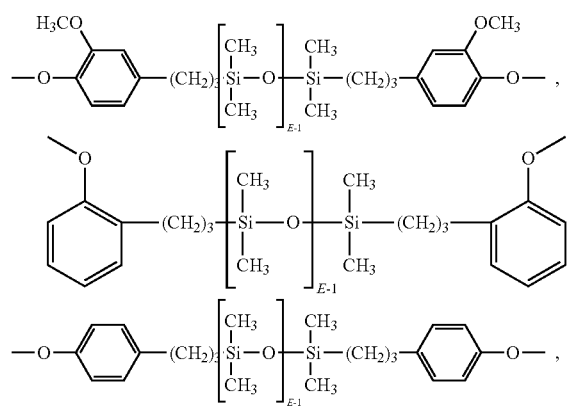

or a combination comprising at least one of the foregoing, wherein E has an average value of 2 to 90;
wherein a sample of the thermoplastic composition has:
a smoke density after 4 minutes (Ds-4) of equal to or less than 150 measured in accordance with ISO 5659-2 on a 3 mm thick plaque at 50 kW/m$^2$, an integral of the smoke density as a function of time up to 4 minutes (VOF4) of equal to or less than 300 measured in accordance with ISO 5659-2 on a 3 mm thick plaque at 50 kW/m$^2$, a maximum average heat release (MAHRE) of equal to or less than 90 kW/m$^2$ measured in accordance with ISO 5660-1 on a 3 mm thick plaque at 50 kW/m$^2$, and a ductility in multiaxial impact of 80% to 100%, measured at 23° C. at an impact speed of 4.4 m/second in accordance with ISO 6603 on 3.2 mm thick discs.

39. The railway component of claim 38, wherein the thermoplastic composition comprises, based on the weight of the thermoplastic composition, 58 to 93 wt. % of the poly(bisphenol-A carbonate)-co-poly(isophthalate-terephthalate-resorcinol ester)-co-poly(siloxane); and 5 to 30 wt. % of the polyetherimide;

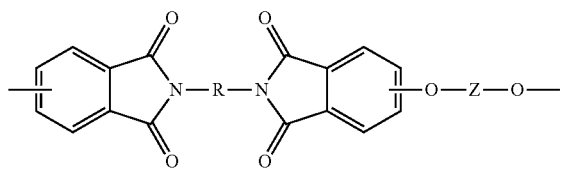

2 to up to 12 wt. % of bisphenol A bis(diphenyl phosphate); and optionally, up to 5 wt. % of an additive selected from a processing aid, a heat stabilizer, an ultra violet light absorber, a colorant, or a combination comprising at least one of the foregoing;

wherein a molded sample of the thermoplastic composition has:

a smoke density after 4 minutes (Ds-4) of equal to or less than 150 measured in accordance with ISO 5659-2 on a 3 mm thick plaque at 50 kW/m$^2$, an integral of the smoke density as a function of time up to 4 minutes (VOF4) of equal to or less than 300 measured in accordance with ISO 5659-2 on a 3 mm thick plaque at 50 kW/m$^2$, a maximum average heat release (MAHRE) of equal to or less than 60 kW/m$^2$ measured in accordance with ISO 5660-1 on a 3 mm thick plaque at 50 kW/m$^2$, and a ductility in multiaxial impact of 80% to 100%, measured at 23° C. at an impact speed of 4.4 m/second in accordance with ISO 6603 on 3.2 mm thick discs.

* * * * *